United States Patent
Taira et al.

(10) Patent No.: US 10,488,601 B2
(45) Date of Patent: Nov. 26, 2019

(54) OPTICAL CONNECTOR PLUG AND DUPLEX OPTICAL CONNECTOR PLUG

(71) Applicant: SEIKOH GIKEN CO., LTD., Chiba (JP)

(72) Inventors: Junji Taira, Chiba (JP); Masayuki Jibiki, Chiba (JP); Yohei Takaishi, Chiba (JP); Norimasa Arai, Chiba (JP)

(73) Assignee: SEIKOH GIKEN CO., LTD., Chiba (JP)

( * ) Notice: Subject to any disclaimer, the term of this patent is extended or adjusted under 35 U.S.C. 154(b) by 0 days.

(21) Appl. No.: 16/051,385

(22) Filed: Jul. 31, 2018

(65) Prior Publication Data
US 2019/0033531 A1 Jan. 31, 2019

(30) Foreign Application Priority Data

Jul. 31, 2017 (JP) .................................. 2017-148069
Dec. 12, 2017 (JP) .................................. 2017-237704

(51) Int. Cl.
*G02B 6/38* (2006.01)

(52) U.S. Cl.
CPC ......... *G02B 6/3869* (2013.01); *G02B 6/3825* (2013.01); *G02B 6/3879* (2013.01); *G02B 6/3893* (2013.01)

(58) Field of Classification Search
CPC .... G02B 6/381; G02B 6/3821; G02B 6/3825; G02B 6/3831; G02B 6/3869; G02B 6/389; G02B 6/3893
USPC ............................................. 385/60, 72, 78
See application file for complete search history.

(56) References Cited

U.S. PATENT DOCUMENTS

| | | | | |
|---|---|---|---|---|
| 5,883,995 A * | 3/1999 | Lu | ........................ | G02B 6/3807 385/60 |
| 6,821,024 B2 * | 11/2004 | Bates, III | ............. | G02B 6/3893 385/76 |
| 6,918,704 B2 | 7/2005 | Marrs et al. | | |
| 7,052,186 B1 * | 5/2006 | Bates | ................... | G02B 6/3879 385/139 |
| 7,255,485 B2 * | 8/2007 | Thaler et al. | ........ | G02B 6/3807 385/53 |

(Continued)

FOREIGN PATENT DOCUMENTS

| JP | 2004-234008 A | 8/2004 |
|---|---|---|
| JP | 4467322 B2 | 5/2010 |

*Primary Examiner* — Robert Tavlykaev
(74) *Attorney, Agent, or Firm* — Hauptman Ham, LLP

(57) ABSTRACT

Provided is an optical connector plug which, even when a predetermined load is applied to a plug frame and the plug frame is warped to a vertical upper side of a guide protrusion portion, prevents disengagement of an engagement head and an optical conductor adaptor. In an optical connector plug, an axial front end of an engagement head of an engagement latch is separated axially rearward from an axial rear end of a guide protrusion portion, and is close to the axial rear end of the guide protrusion portion. According to the optical connector plug, when a predetermined load is applied to a plug frame and the plug frame is warped to a vertical upper side of the guide protrusion portion, the axial front end of the engagement head is supported by the axial direction rear of the guide protrusion portion, so that the engagement head is prevented from moving vertically downward from the guide protrusion portion.

18 Claims, 60 Drawing Sheets

(56) References Cited

U.S. PATENT DOCUMENTS

| | | | |
|---|---|---|---|
| 8,152,384 B2 * | 4/2012 | de Jong | G02B 6/3893 |
| | | | 385/53 |
| 2010/0136809 A1 * | 6/2010 | Andres | G02B 6/389 |
| | | | 439/133 |
| 2013/0301994 A1 * | 11/2013 | Motofuji | G02B 6/36 |
| | | | 385/78 |

* cited by examiner

OPTICAL CONNECTOR PLUG AND DUPLEX OPTICAL CONNECTOR PLUG

RELATED APPLICATIONS

The present application claims priority to Japanese Patent Application No. 2017-148069 filed Jul. 31, 2017 and Japanese Application No. 2017-237704 filed Dec. 12, 2017, the disclosures of which are hereby incorporated by reference herein in their entirety.

FIELD

At least one embodiment of this disclosure relates to an optical connector plug and a duplex optical connector plug.

BACKGROUND

JP2004-234008 A describes an optical connector plug configured to rotate and center a ferrule assembly inside a housing of a connector under a state in which a centering arm and the ferrule assembly are engaged.

SUMMARY

According to at least one embodiment, there is provided an optical connector plug including a ferrule, which extends in an axial direction, and is configured to hold an optical fiber. The optical connector plug further includes a plug frame, which extends in the axial direction, and is configured to accommodate the ferrule. The optical connector plug further includes a stop ring to be engaged in the plug frame. The optical connector plug further includes a spring, which is disposed between the ferrule and the stop ring, and is configured to urge the ferrule axially forward. The optical connector plug further includes an engagement latch configured to couple the plug frame to an optical connector adaptor, the plug frame including a protrusion portion located on an axial front side of the plug frame, the engagement latch including: an arm, which extends in the axial direction from an axial rear side of the plug frame to the protrusion portion, and is elastically deformable in a vertical direction, and an engagement head, which is located on the axial front side of the arm, and is configured to disengageably engage with the optical connector adaptor when the plug frame is inserted into the optical connector adaptor.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DESCRIPTION OF THE EMBODIMENTS

Figure 1:
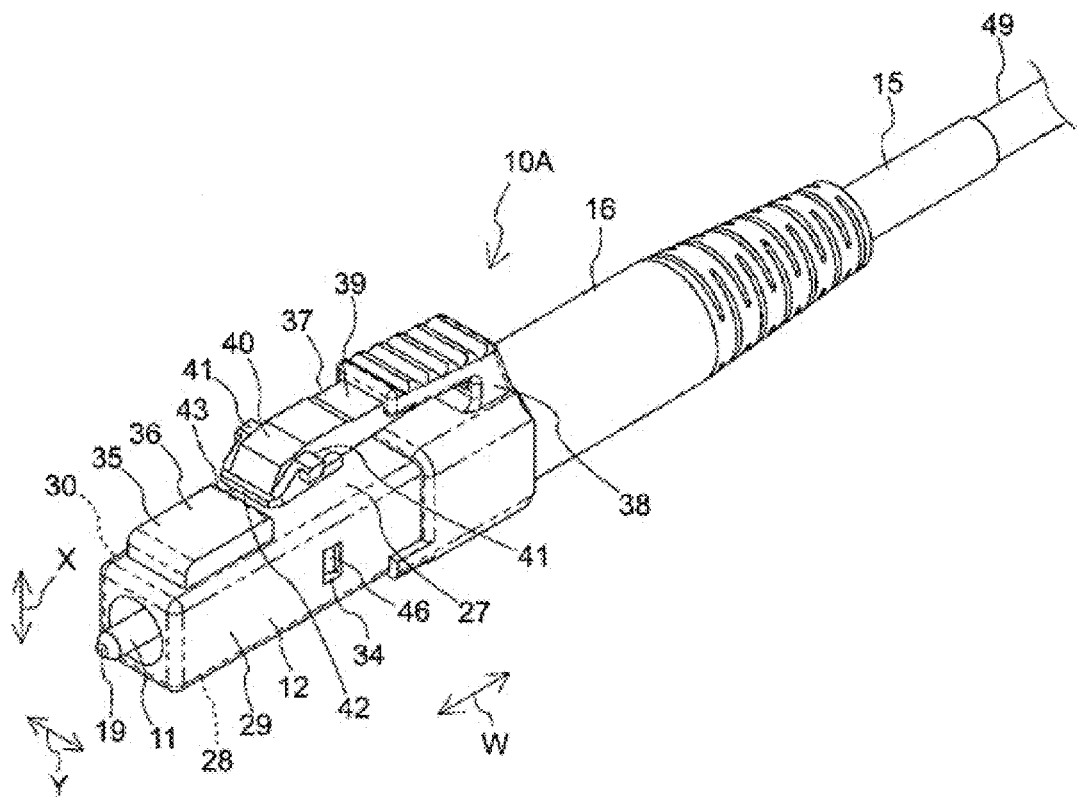
FIG. 1 is a perspective view of an optical connector plug according to at least one embodiment.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 2:
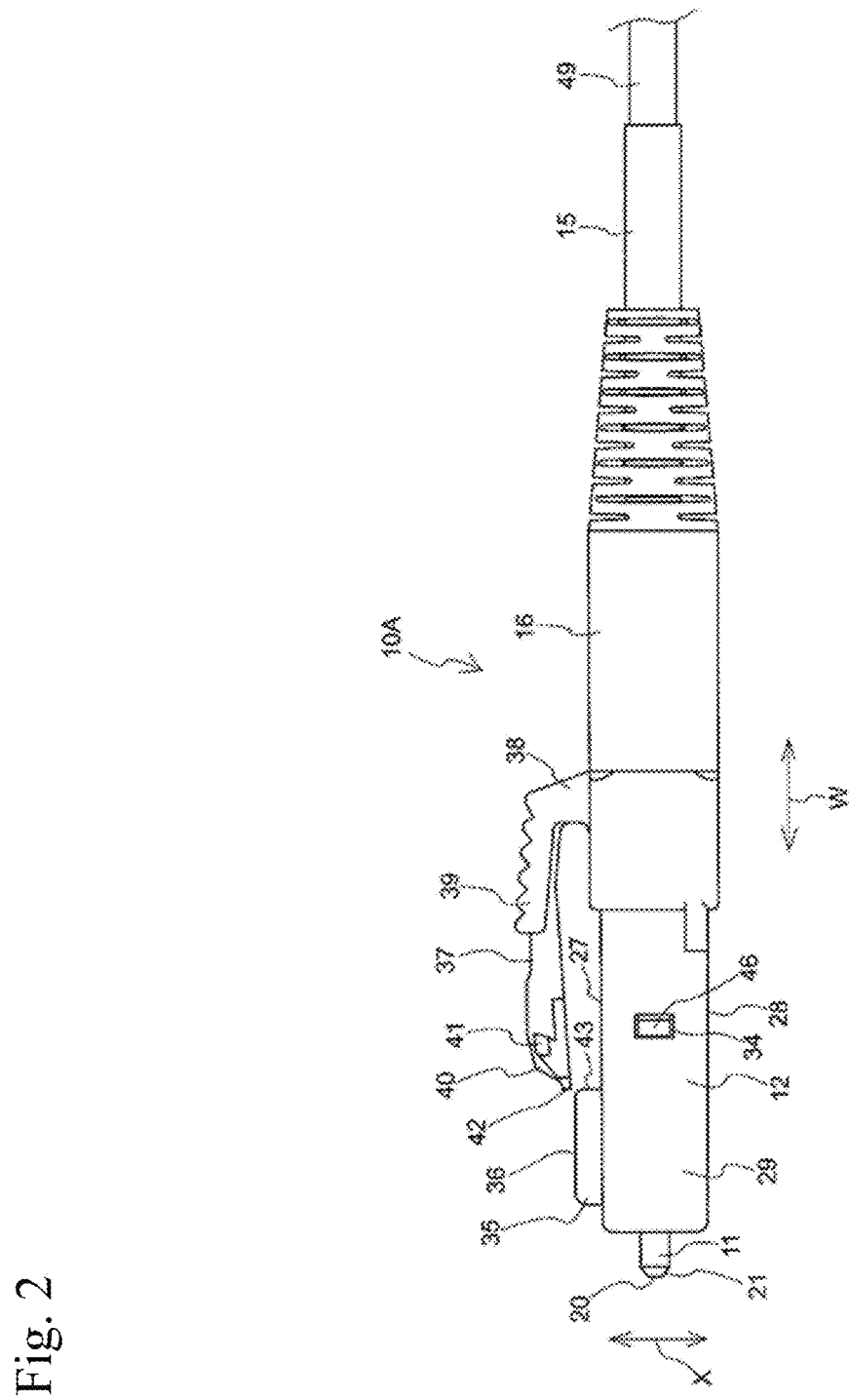
FIG. 2 is a side view of the optical connector plug according to at least one embodiment.
Figure 3:
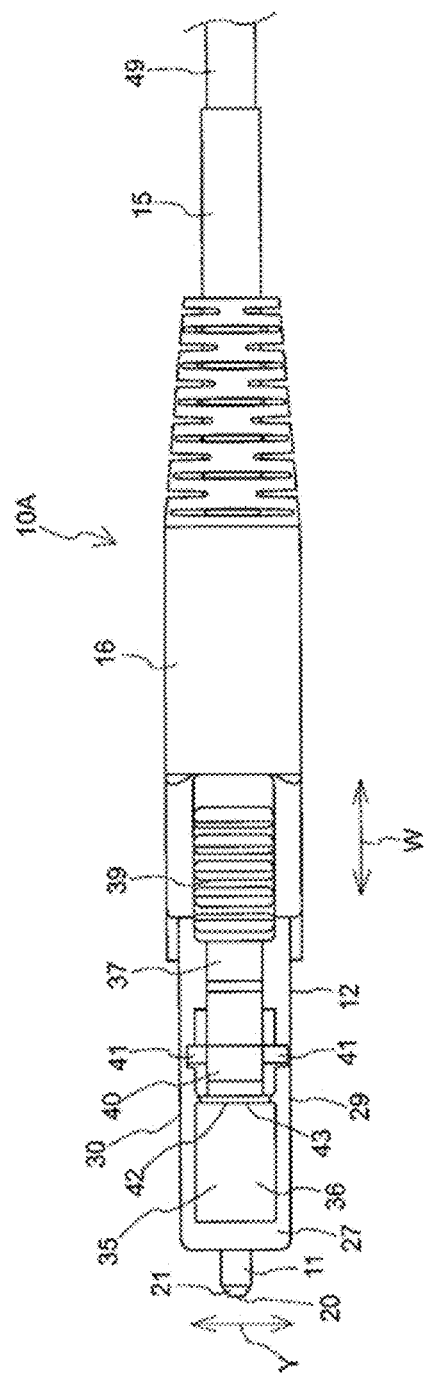
FIG. 3 is a top view of the optical connector plug according to at least one embodiment.
Figure 4:
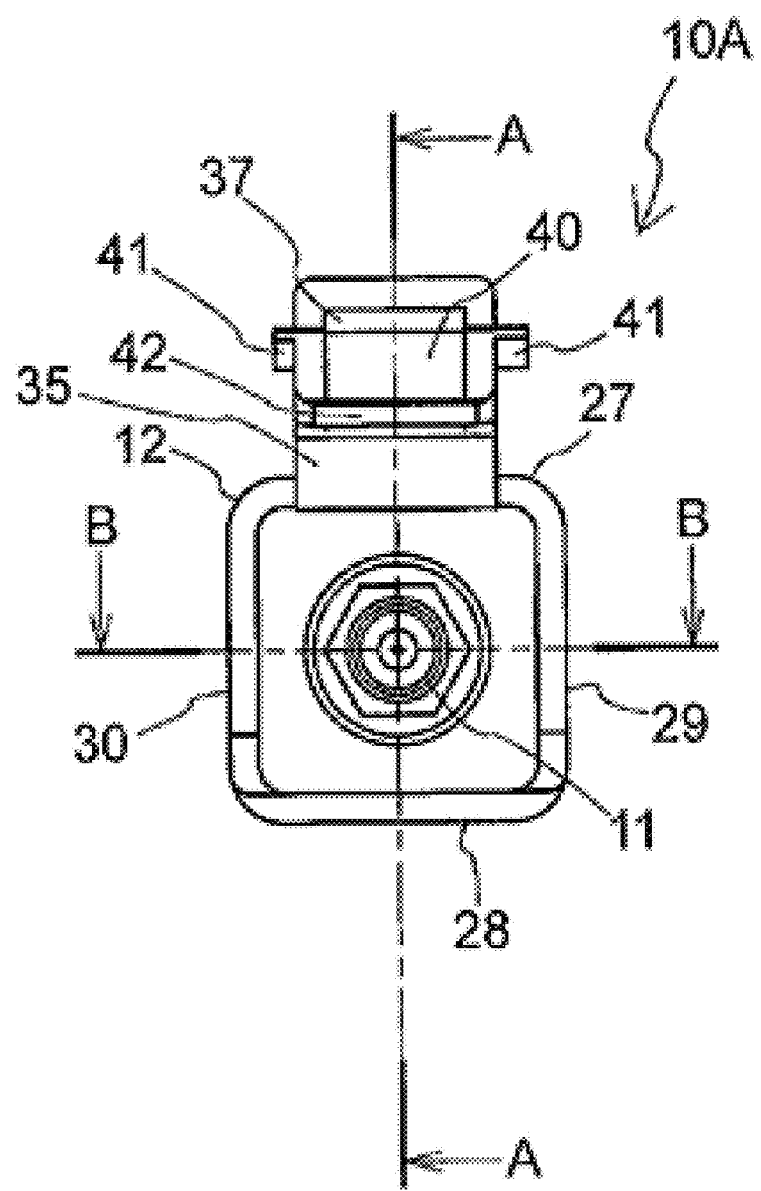
FIG. 4 is a front view of the optical connector plug according to at least one embodiment.
Figure 5:
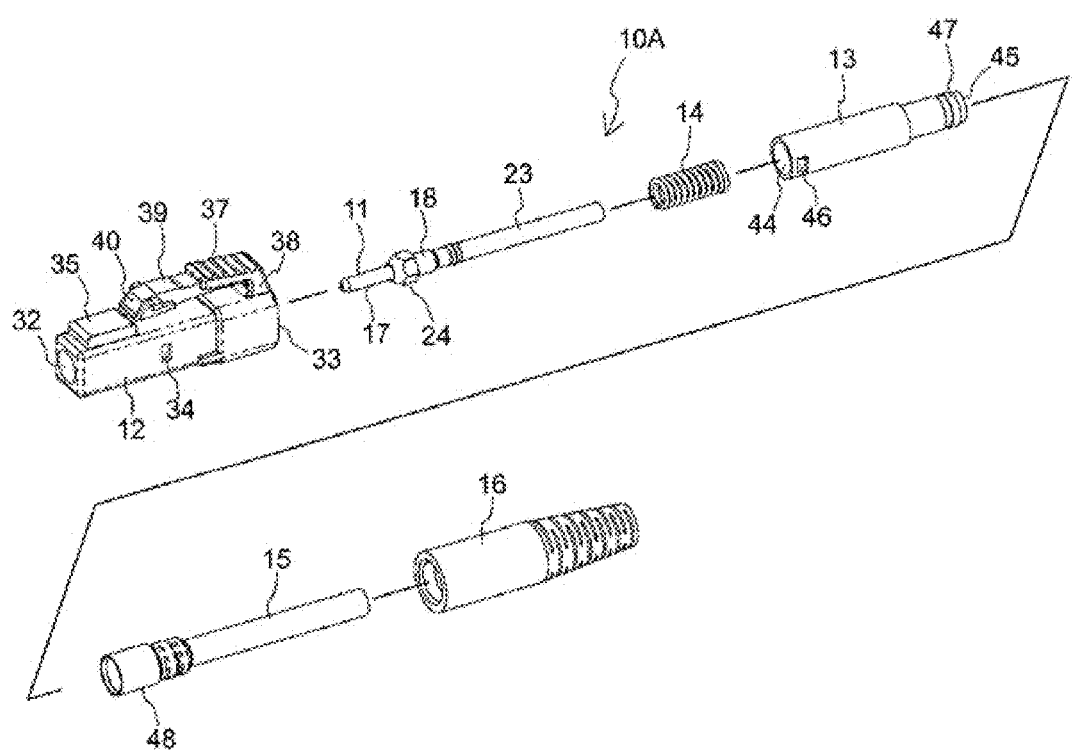
FIG. 5 is an exploded perspective view of the optical connector plug according to at least one embodiment.
Figure 6:
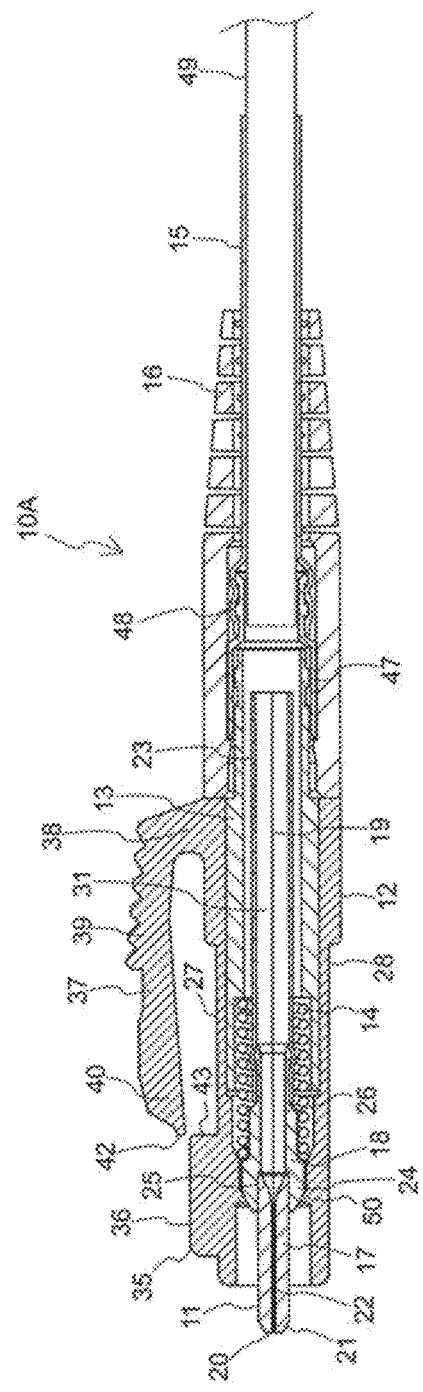
FIG. 6 is a sectional view as seen in a direction indicated by arrows of the line A-A in FIG. 4 according to at least one embodiment.
Figure 7:
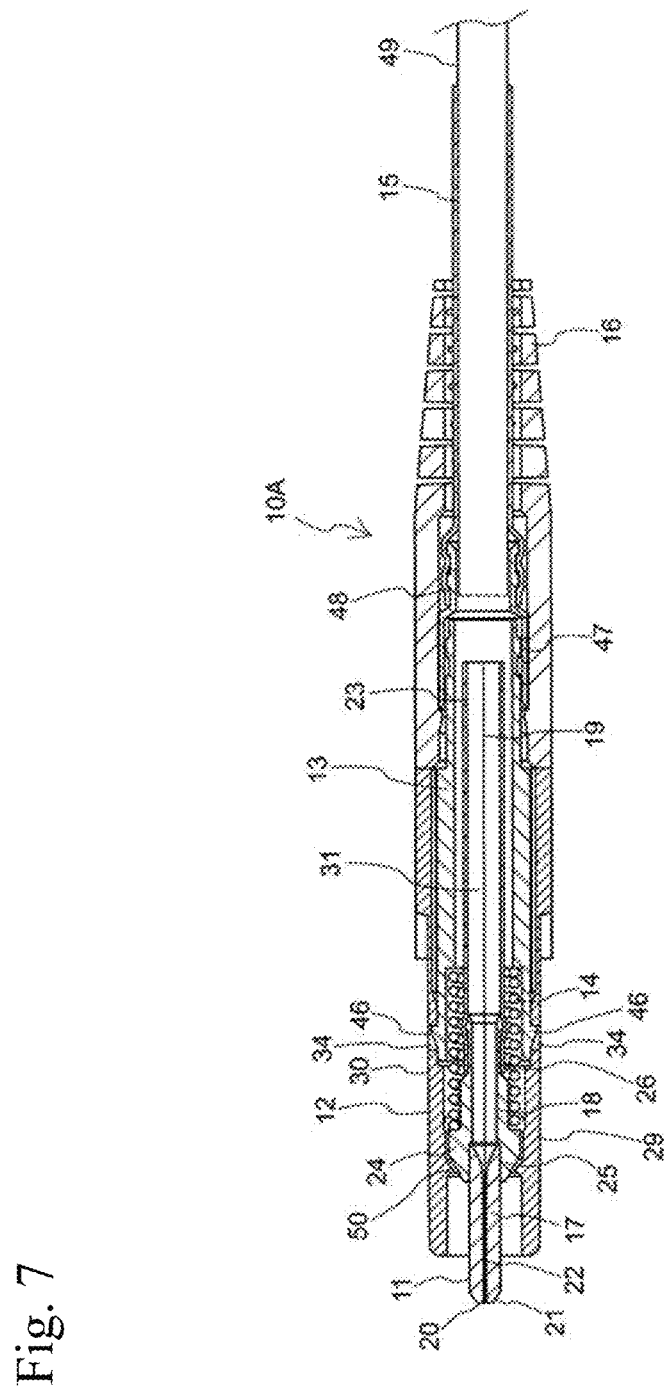
FIG. 7 is a sectional view as seen in a direction indicated by arrows of the line B-B in FIG. 4 according to at least one embodiment.

Now, a description is made of an optical connector plug according to this at least one embodiment of disclosure with reference to accompanying drawings such as FIG. 1 is a perspective view of an optical connector plug 10A according to at least one embodiment. FIG. 2 is a side view of the optical connector plug 10A. FIG. 3 is a top view of the optical connector plug 10A. FIG. 4 is a front view of the optical connector plug 10A. FIG. 5 is an exploded perspective view of the optical connector plug 10A. FIG. 6 is a sectional view as seen in a direction indicated by arrows of the line A-A in FIG. 4. FIG. 7 is a sectional view as seen in a direction indicated by arrows of the line B-B in FIG. 4. In FIG. 1 to FIG. 3, an axial direction is indicated by an arrow W. A vertical direction is indicated by an arrow X. A horizontal direction is indicated by an arrow Y.

The optical connector plug 10A is mountable to an optical connector adaptor 51 (see FIG. 8) to optically connect optical fibers. The optical connector plug 10A includes a ferrule 11 which extends in the axial direction, a plug frame 12 which is configured to accommodate the ferrule 11, a stop ring 13 to be engaged in the plug frame 12, a spring 14 (e.g., a coil spring), a caulking ring 15, and a boot 16. In the exploded perspective view of FIG. 5, the plug frame 12, the ferrule 11, the spring 14, the stop ring 13, the caulking ring 15, and the boot 16 are arrayed in the stated order from an axial front side to an axial rear side.

The ferrule 11 includes a capillary 17 which extends in the axial direction, and a sleeve 18 that has a cylindrical shape extending in the axial direction. In at least one embodiment, sleeve 18 has a shape other than a cylindrical shape, such as a polygonal shape. The capillary 17 holds at least one optical fiber 19. The capillary 17 has a substantially columnar shape that is elongated in the axial direction, and includes a distal end surface 20 and a chamfered portion 21. The distal end surface 20 has an axial distal end at which an end surface of the optical fiber 19 is exposed. The chamfered portion 21 is formed in an end surface radially outer region of the distal end surface 20. In this regard, the shape of the chamfered portion 21 may have a shape of an angular surface or a round surface, and any shape may be employed. The distal end surface 20 is a perpendicular surface that extends in a radial direction and is perpendicular to the axial direction. The chamfered portion 21 gradually inclines radially outward from the distal end surface 20 to the axial rear side.

The capillary 17 includes a ceramics material such as zirconia, a plastic material, or a glass material such as crystalized glass, borosilicate glass, or quartz. In at least one embodiment, a zirconia capillary made from zirconia is used for the capillary 17. The outer diameter of the capillary 17 is from 1.2485 millimeters (mm) to 1.2495 mm. The capillary 17 (ferrule 11) has, inside thereof, an optical fiber insertion hole 22 which extends in the axial direction. The optical fiber 19 is inserted into the optical fiber insertion hole 22 formed in the capillary 17.

The sleeve 18 is coupled to the axial rear side of the capillary 17 (ferrule 11). A core cover 23 (PTFE tube) that covers an entire outer circumference region of the optical fiber 19 and extends in the axial direction is coupled to the axial rear side of the sleeve 18. A polygonal tubular flange 24 having a diameter larger than those of the capillary 17 and the core cover 23 is integral with a front end of the sleeve 18. The sleeve 18 and the flange 24 include a metal material such as stainless steel, brass, or steel, or a synthetic resin material. The sleeve 18 has, inside thereof, a capillary insertion hole 25 and a core insertion hole 26. The capillary insertion hole 25 is configured to receive and hold the capillary 17 inserted thereinto. The core insertion hole 26 is configured to receive and hold an optical fiber core 111 including the built-in optical fiber 19 inserted there into.

A rear end portion of the capillary 17 is inserted into the capillary insertion hole 25 of the sleeve 18, and the rear end portion of the capillary 17 is fixed and held in the capillary insertion hole 25 of the sleeve 18. One end portion of the optical fiber core 111 is inserted into the core insertion hole 26 of the sleeve 18, and the one end portion of the optical fiber core 111 is fixed and held in the core insertion hole 26 of the sleeve 18. In addition, a shape of the sleeve 18 in the axial direction is not limited to a cylindrical shape, and may be a long square tubular shape that is elongated in the axial direction.

The plug frame 12 is made from a synthetic resin material, and is formed in a hollow and substantially quadrangular prism shape. The plug frame 12 includes a top wall 27 and a bottom wall 28 that are separated and face each other in a vertical direction and extend in the axial direction, and both side walls 29 and 30 that are separated and face each other in the horizontal direction and extend in the axial direction. In the plug frame 12, a ferrule accommodation space 31 surrounded by those walls 27 to 30 extending in the axial direction is defined. Moreover, a front end exposure opening 32 from which a distal end portion of the capillary 17 is exposed is opened, and a rear end insertion opening 33 in which the ferrule 11 is inserted is opened.

A contact portion 50 extends on the axial rear side of the front end exposure opening 32 of the plug frame 12, and radially inward from an inner circumferential surface of the ferrule accommodation space 31. The flange 24 of the sleeve 18 comes into contact with the contact portion 50. Contact of the flange 24 of the sleeve 18 with the contact portion 50 helps to prevent the sleeve 18 from further moving axially forward with respect to the plug frame 12.

Fitting holes 34 opened in the horizontal direction are formed in the both side walls 29 and 30 at an axial center of the plug frame 12. In the top wall 27 on the axial front side of the plug frame 12, a guide protrusion portion 35 (protrusion portion) which extends as a protrusion vertically upward from the top wall 27 in the axial direction is formed. The guide protrusion portion 35 includes a top surface 36 that flatly extends and has a predetermined area. An engagement latch 37 is on the top wall 27 of the plug frame 12.

The engagement latch 37 includes a base 38, an arm 39, and an engagement head 40. The base 38 is integral with the plug frame 12, is located on the axial rear side of the top wall 27 of the plug frame 12, and connects to the top wall 27. The arm 39 connects to the base 38. The engagement head 40 is located on the axial front side of the arm 39. The arm 39 is separated vertically upward from the top wall 27, and extends axially forward from the base 38 (the axial rear side of the plug frame 12) connected to the axial rear side of the top wall 27 to the guide protrusion portion 35. The arm 39 has elasticity, and is elastically deformable (swingable) in the vertical direction.

The engagement head 40 includes a pair of engagement protrusion portions 41 that project horizontally outward. The engagement protrusion portions 41 disengageably engage with locking portions 52 of the optical connector adaptor 51 when the plug frame 12 is inserted into the optical connector adaptor 51. The engagement head 40 has a larger horizontal dimension except the engagement protrusion portions 41 than that of the arm 39, and is substantially the same as a horizontal dimension of the top surface 36 of the guide protrusion portion 35. The engagement head 40 swings in the vertical direction as the arm 39 elastically deforms in the vertical direction.

In FIG. 2, the axial front end 42 of the engagement head 40 is slightly separated axially rearward from an axial rear end 43 of the guide protrusion portion 35, is slightly separated to the vertical upper side of the axial rear end 43 of the guide protrusion portion 35, is located near the axial rear end 43 of the guide protrusion portion 35, and is close to the axial rear end 43 of the guide protrusion portion 35. An axially rearward separation dimension of the axial front end 42 of the engagement head 40 from the axial rear end 43 of the guide protrusion portion 35 is in a range of from 0.01 mm to 0.2 mm. A vertically upward separation dimension of the axial front end 42 of the engagement head 40 from the axial rear end 43 of the guide protrusion portion 35 is in the range of from 0.01 mm to 0.4 mm.

In addition, in the optical connector plug 10A, the axial front end 42 of the engagement head 40 may not be separated to the vertical upper side of the axial rear end 43 of the guide protrusion portion 35, the axial front end 42 of the engagement head 40 may be slightly separated axially rearward from the axial rear end 43 of the guide protrusion portion 35, and the axial front end 42 may be located near the axial rear end 43 of the guide protrusion portion 35 and be close to the axial rear end 43 of the guide protrusion portion 35. In this case, an axially rearward separation dimension of the axial front end 42 of the engagement head 40 from the axial rear end 43 of the guide protrusion portion 35 is in a range of from 0.01 mm to 0.2 mm. In at least one embodiment, the axial front end 42 of the engagement head 40 is supported on a flat top surface of the guide protrusion portion 35. In at least one embodiment, the axial front end of the engagement head 40 is supported on a curved corner portion of the guide protrusion portion 35.

The stop ring 13 includes a metal material or a synthetic resin material, is in a substantially cylindrical shape, and extends in the axial direction. The optical fiber core 111 is inserted into the stop ring 13. A core exposure opening 44 from which the optical fiber core 111 is exposed is opened at a front end portion of the stop ring 13. A core insertion opening 45 in which the optical fiber core 111 is inserted is opened at a rear end portion of the stop ring 13. A pair of fitting protrusion portions 46 that protrude horizontally outward are formed on an outer circumferential surface (circumferential surface) of the front end portion of the stop ring 13. A fitting ring 47 that protrudes in a circumferential direction is formed on an outer circumferential surface (circumferential surface) of the rear end portion of the stop ring 13. The fitting ring 47 is fixed to a caulking portion 48 of the caulking ring 15.

The stop ring 13 is insertable into the ferrule accommodation space 31 of the plug frame 12. When the stop ring 13 is inserted into the ferrule accommodation space 31 of the plug frame 12, the fitting protrusion portions 46 of the stop ring 13 detachably fitted to the fitting holes 34 formed in the both side walls 29 and 30 of the plug frame 12, and the stop ring 13 is coupled to the plug frame 12.

The spring 14 is between the ferrule 11 and the stop ring 13, is inserted into the core cover 23, and extends in the axial direction. The spring 14 has a front end that is in contact with the flange 24 of the sleeve 18, and a rear end that is in contact with a front end of the stop ring 13. The spring 14 urges the ferrule 11 axially forward.

The caulking ring 15 includes a metal material or a synthetic resin material, is formed in a substantially cylindrical shape, and extends in the axial direction. A caulking portion 48 is at a front end portion of the caulking ring 15. When the fitting ring 47 of the stop ring 13 is fixed to the caulking portion 48 formed at the front end portion of the caulking ring 15, the stop ring 13 is coupled to the caulking ring 15. The boot 16 includes a metal material or a synthetic resin material, is formed in a substantially cylindrical shape, and extends in the axial direction. The caulking ring 15 is press-fitted in the boot 16, and, when an inner circumferential surface of the boot 16 and an outer circumferential surface of the front end portion of the caulking ring 15 closely adhere, the caulking ring 15 is coupled to the boot 16. In addition, an optical fiber cord 49 that coats the optical fiber core 111 is inserted into the caulking ring 15, and extends axially rearward from a rear end of the caulking ring 15.

Figure 8:
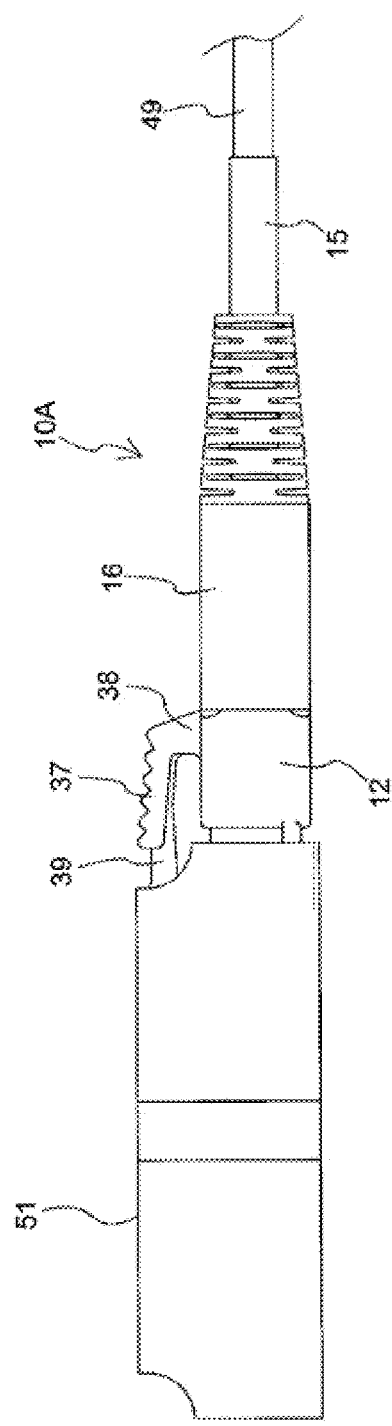
FIG. 8 is a side view of the optical connector plug in a state in which the optical connector plug is coupled to an optical connector adaptor according to at least one embodiment.
Figure 9:
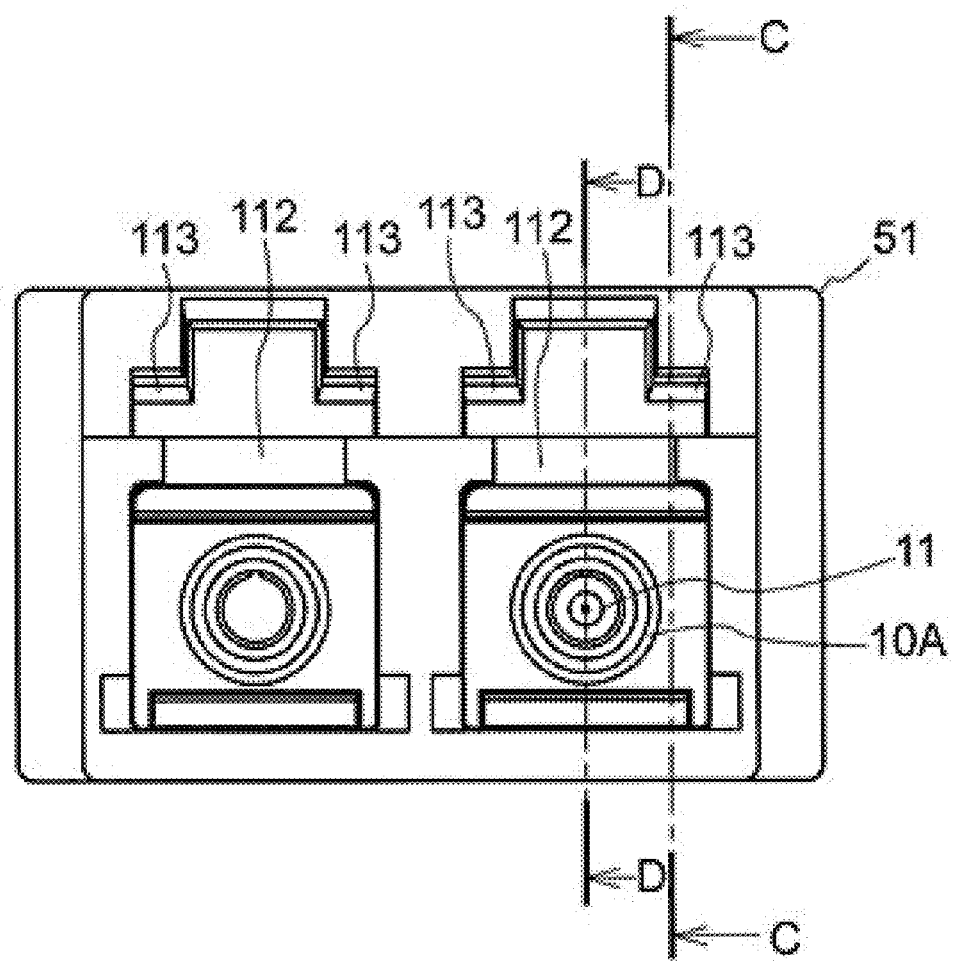
FIG. 9 is a front view of the optical connector plug in a state in which the optical connector plug is coupled to the optical connector adaptor according to at least one embodiment.
Figure 10:
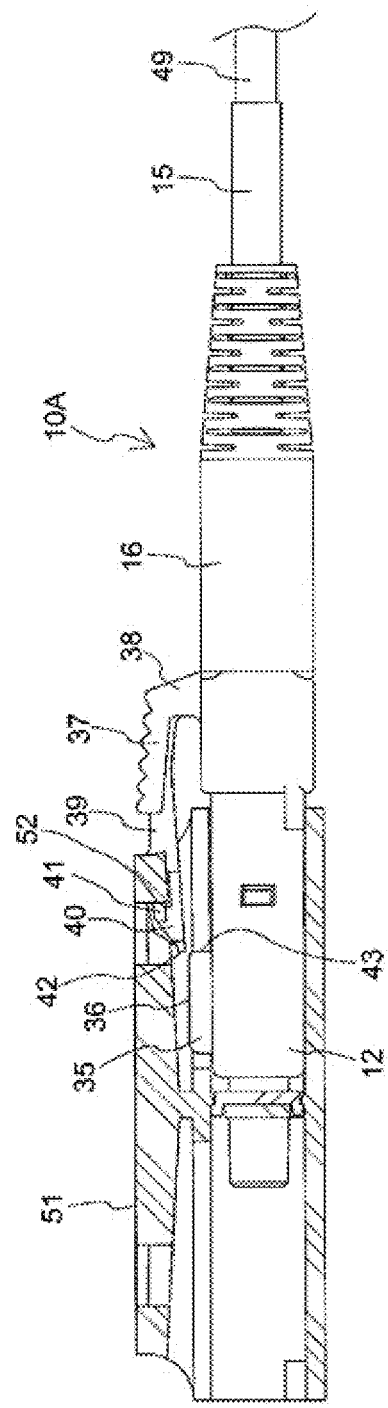
FIG. 10 is a sectional view as seen in a direction indicated by arrows of the line C-C in FIG. 9 according to at least one embodiment.
Figure 11:
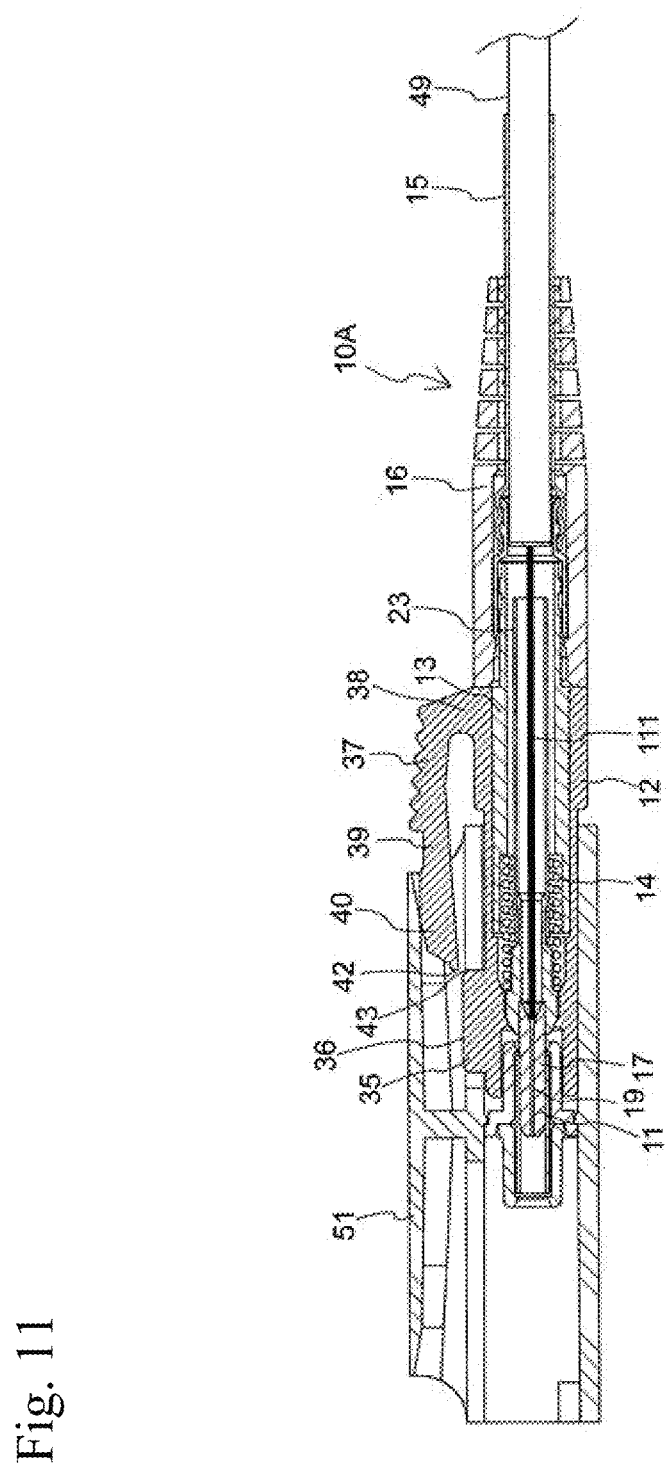
FIG. 11 is a sectional view as seen in a direction indicated by arrows of the line D-D in FIG. 9 according to at least one embodiment.
Figure 12:
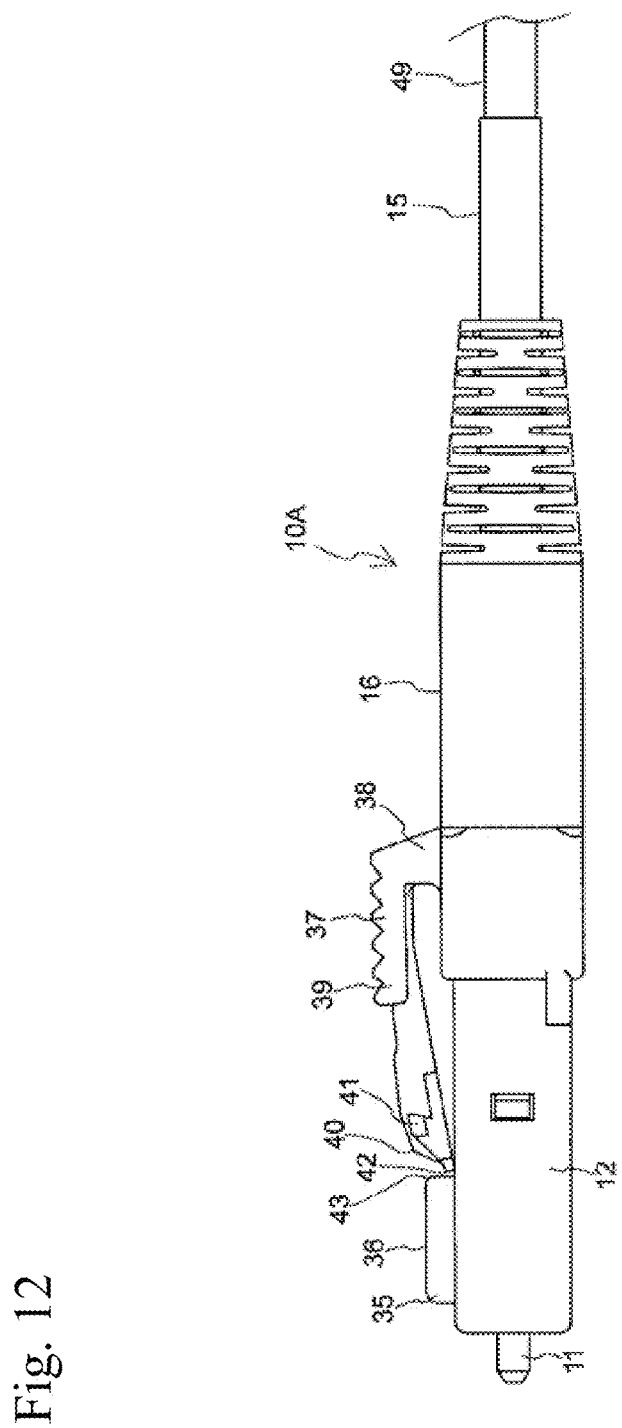
FIG. 12 is a side view of the optical connector plug in a case in which the optical connector adaptor and the optical connector plug are decoupled according to at least one embodiment.
Figure 13:
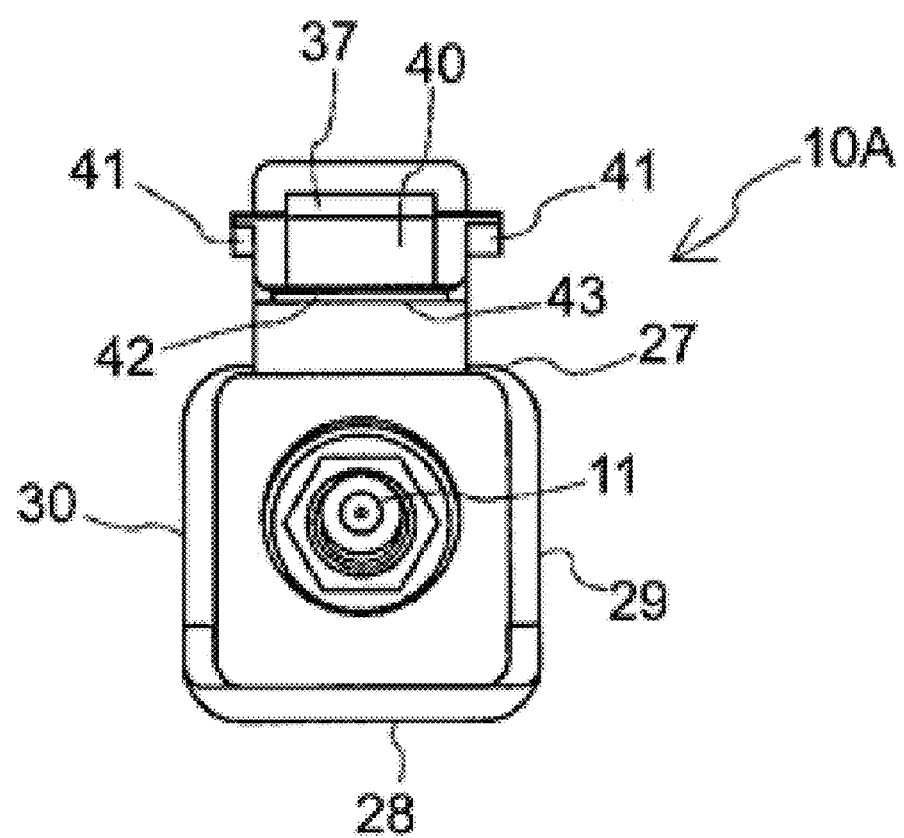
FIG. 13 is a front view of the optical connector plug in a state in which, while the optical connector adaptor and the optical connector plug are coupled, a plug frame is warped to a vertical upper side of a guide protrusion portion according to at least one embodiment.
Figure 14:
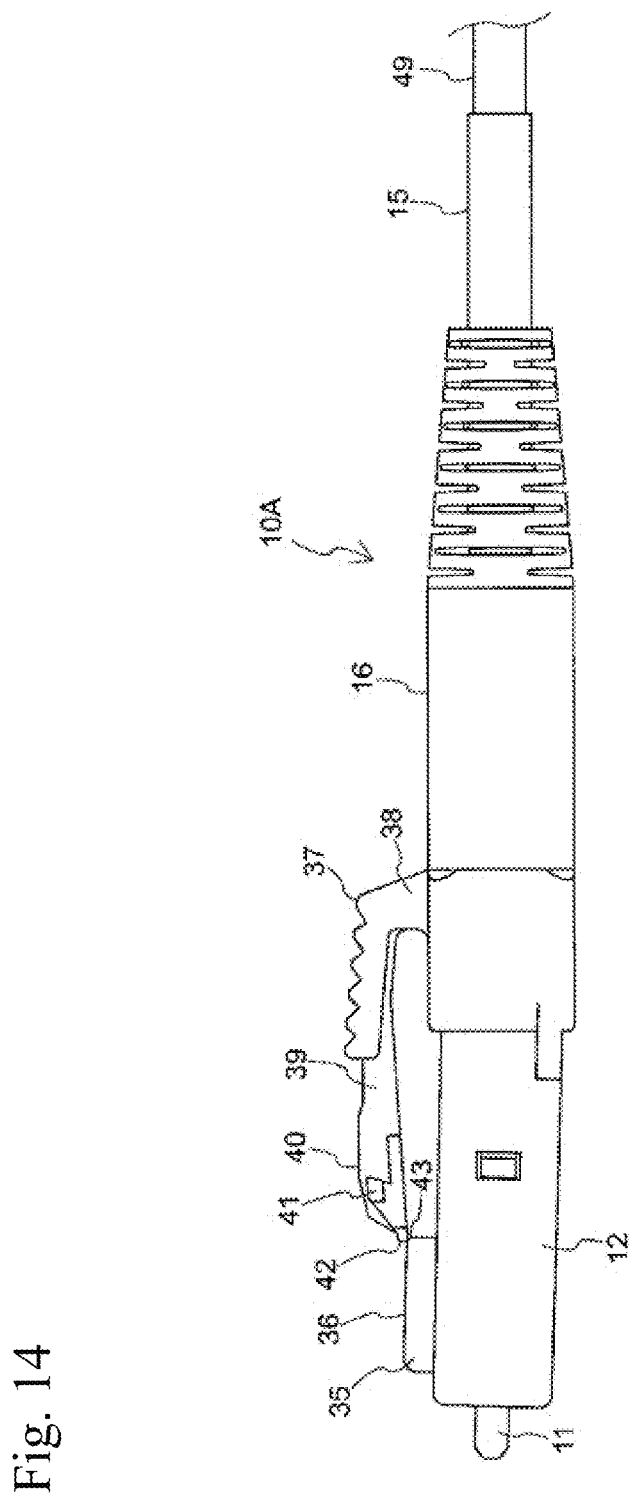
FIG. 14 is a side view of the optical connector plug in a state in which, while the optical connector adaptor and the optical connector plug are coupled, the plug frame is warped to the vertical upper side of the guide protrusion portion according to at least one embodiment.

FIG. 8 is a side view of the optical connector plug 10A in a state in which the optical connector plug 10A is coupled to the optical connector adaptor 51 according to at least one embodiment. FIG. 9 is a front view of the optical connector plug 10A in a state in which the optical connector plug 10A is coupled to the optical connector adaptor 51 according to at least one embodiment. FIG. 10 is a sectional view as seen in a direction indicated by arrows of the line C-C in FIG. 9. FIG. 11 is a sectional view as seen in a direction indicated by arrows of the line D-D in FIG. 9. FIG. 12 is a side view of the optical connector plug 10A in a case in which the optical connector adaptor 51 and the optical connector plug 10A are decoupled. FIG. 13 is a front view of the optical connector plug 10A in a state in which, while the optical connector adaptor 51 and the optical connector plug 10A are coupled, the plug frame 12 is warped to the vertical upper side of the guide protrusion portion 35. FIG. 14 is a side view of the optical connector plug 10A in a state in which, while the optical connector adaptor 51 and the optical connector plug 10A are coupled, the plug frame 12 is warped to the vertical upper side of the guide protrusion portion 35. In FIG. 12 and FIG. 14, the optical connector adaptor 51 is omitted for the sake of clarity.

The optical connector plug 10A is coupled to the optical connector adaptor 51 by pinching the plug frame 12, making the guide protrusion portion 35 of the plug frame 12 face guide rails 112 of the optical connector adaptor 51 face each other, and inserting the plug frame 12 into the optical connector adaptor 51 through the insertion opening of the optical connector adaptor 51. When the plug frame 12 is inserted into the optical connector adaptor 51, and the plug frame 12 is moved axially forward, the arm 39 of the engagement latch 37 gradually enters inside the optical connector adaptor 51, a top wall 113 of the optical connector adaptor 51 presses the engagement head 40 of the engagement latch 37 vertically downward, the arm 39 of the engagement latch 37 elastically deforms vertically downward, and the engagement head 40 is pushed vertically downward.

When the plug frame 12 is further moved axially forward, and the engagement head 40 is moved to the locking portions 52 of the optical connector adaptor 51, as in FIG. 10, the arm 39 elastically deforms vertically upward, the engagement protrusion portions 41 of the engagement head 40 engage with the locking portions 52 of the optical connector adaptor 51, and the optical connector plug 10A is coupled to the optical connector adaptor 51. The engagement protrusion portions 41 of the engagement head 40 engage with the locking portions 52 of the optical connector adaptor 51, so that an insertion state of the plug frame 12 in the optical connector adaptor 51 is maintained.

In a state in which a load does not act on the optical connector plug 10A, the optical connector plug 10A and the optical connector adaptor 51 are decoupled by pressing the arm 39 of the engagement latch 37 vertically downward, swinging the arm 39 vertically downward and moving the engagement head 40 of the engagement latch 37 to the lower side of the locking portions 52 of the optical connector adaptor 51 as in FIG. 12, and disengaging the engagement head 40 and the locking portions 52 of the optical connector adaptor 51. In this state, the plug frame 12 is pulled axially rearward to pull out the plug frame 12 from the optical connector adaptor 51.

When the optical fiber cord 49 extending axially rearward from the boot 16 is strongly pulled axially rearward, the optical fiber cord 49 is pulled vertically upward, and a predetermined load is applied to the plug frame 12 under a state in which the optical connector plug 10A is coupled to the optical connector adaptor 51, as in FIG. 13 and FIG. 14, the plug frame 12 is warped to the vertical upper side of the guide protrusion portion 35. Furthermore, when the optical fiber cord 49 is strongly pulled axially rearward, the optical fiber cord 49 is rotated drawing an arc, and the predetermined load is applied to the plug frame 12 in the state in which the optical connector plug 10A is coupled to the optical connector adaptor 51, the plug frame 12 is warped to the vertical upper side of the guide protrusion portion 35. In at least one embodiment, the coupling of the optical connector plug 10A with the optical connector adaptor 51 is tested according to the proof test under the Telecordia GR-326-CORE Issue 4 Generic Requirements for Singlemode Optical Connectors and Jumper Assemblies, and the optical fiber code was pulled up 90 degree in vertical direction while pulling by a force of 22.6N (2.3 kgf). However, the coupling was not decoupled (or released). Further, according to IEC 61300-2-35 Tests-Cable nutation, the optical fiber code was tested to rotate to draw an arch with an angle of 45 degree while pulling by a force of 10N (1.02 kgf) and 15N (1.53 kgf). However, the coupling was not decoupled (or released). Depending on the environment of using the optical connector, the operator may have the optical connector touch with his/her hand or arm when he/she pulls the optical fiber code with his/her foot or pull off the optical connector. Also, there may occur an incident where the operator trips over the optical fiber code inadvertently. For these circumstances, the predetermined pulling load applied in the transverse direction ranges from about 1.67N (0.17 kgf) to about 33.3N (3.4 kgf), which corresponds to the predetermined load above.

According to the optical connector plug 10A, when the predetermined load is applied to the plug frame 12, and the plug frame 12 is warped to the vertical upper side of the guide protrusion portion 35, the arm 39 of the engagement latch 37 is not warped, and a distance (separation dimension) between the engagement head 40 of the engagement latch 37 and the guide protrusion portion 35 shortens. Then, as in FIG. 14, the axial front end 42 of the engagement head 40 contacts (comes into contact with) the axial rear end 43 of the top surface 36 that flatly extends and has a predetermined area in the guide protrusion portion 35, and the axial front end 42 of the engagement head 40 is supported by the axial rear end 43 of the top surface 36 of the guide protrusion portion 35. According to the optical connector plug 10A, when the plug frame 12 is warped to the vertical upper side of the guide protrusion portion 35, the axial front end 42 of the engagement head 40 is supported by the axial rear end 43 of the guide protrusion portion 35, so that the engagement head 40 is prevented from moving to the vertical lower side of the guide protrusion portion 35.

Figure 59:
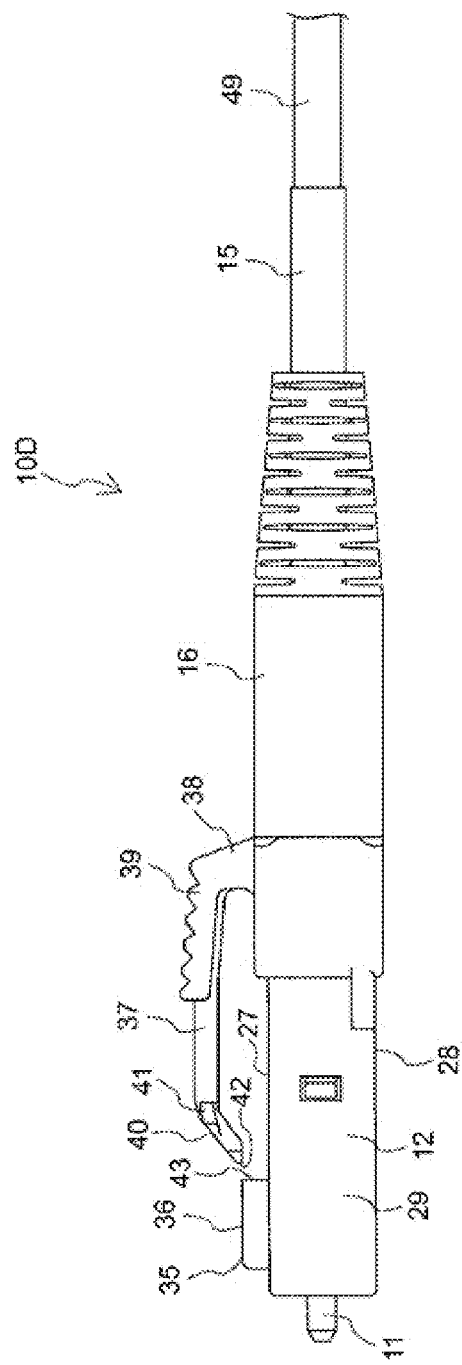
FIG. 59 is a side view of the optical connector plug in which an axial front end of the engagement head is far from an axial rear end of the guide protrusion portion and is spaced from the axial rear end of the guide protrusion portion according to at least one embodiment.
Figure 60:
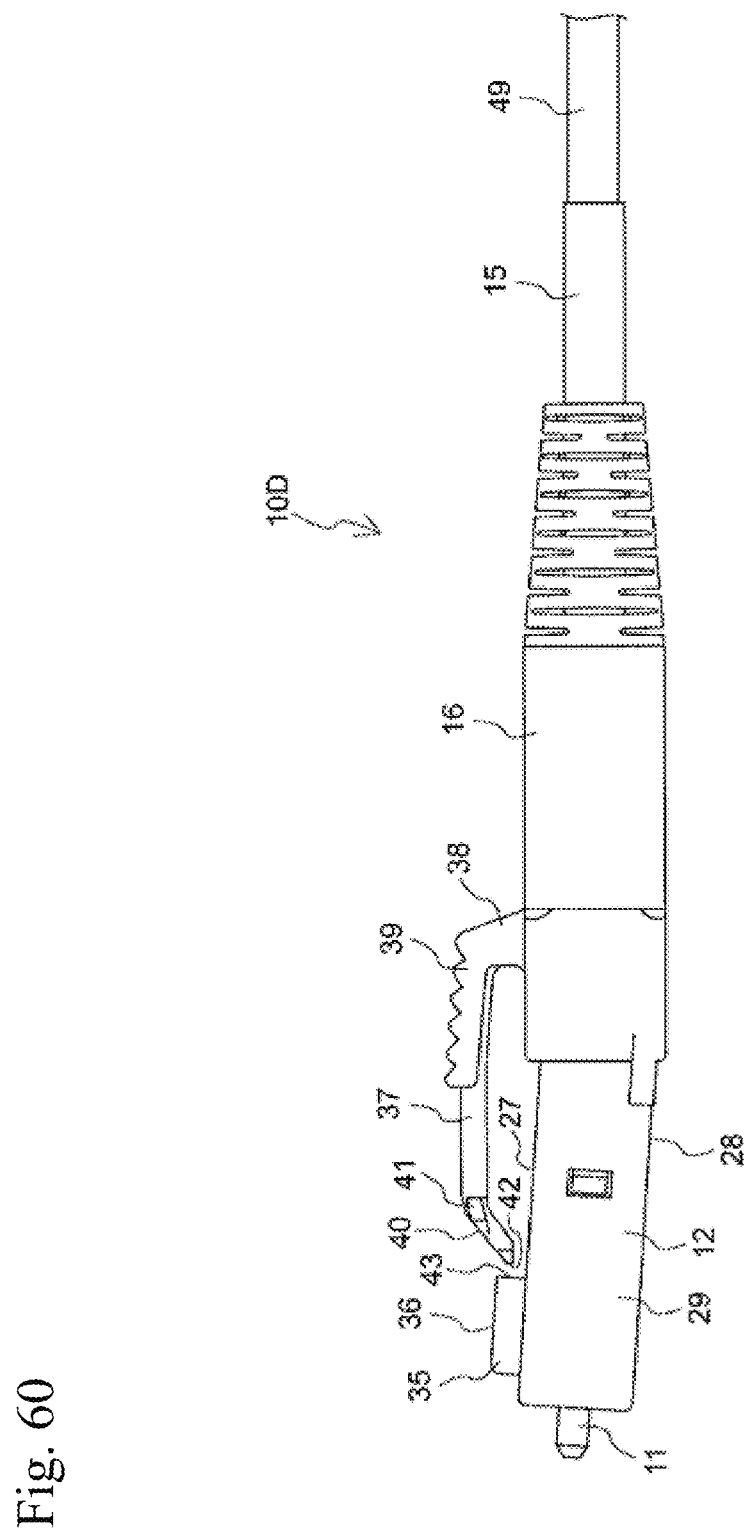
FIG. 60 is a side view of the optical connector plug in a state in which the engagement head moves (bows) to a vertical lower side of the guide protrusion portion according to at least one embodiment.

For example, similarly to an optical connector plug 10D in FIG. 59, there is a case in which the axial front end 42 of the engagement head 40 is not located near the axial rear end 43 of the guide protrusion portion 35, and the axial front end 42 is not close to the axial rear end 43 of the guide protrusion portion 35. In this case, when the plug frame 12 is warped to the vertical upper side of the guide protrusion portion 35, the axial front end 42 of the engagement head 40 of the engagement latch 37 is not supported by the axial rear end 43 of the guide protrusion portion 35 and, as in FIG. 60, the engagement head 40 moves (bows) to the vertical lower side of the guide protrusion portion 35. When the engagement head 40 moves to the vertical lower side of the guide protrusion portion 35, the engagement protrusion portions 41 of the engagement head 40 move to the lower side of the locking portions 52 of the optical connector adaptor 51, the engagement protrusion portions 41 are removed from the locking portions 52, and the optical connector plug 10D and the optical connector adaptor 51 are decoupled in some cases.

However, according to at least one embodiment of the optical connector plug 10A, the axial front end 42 of the engagement head 40 is separated axially rearward from the axial rear end 43 of the guide protrusion portion 35 and is close to the axial rear end 43 of the guide protrusion portion 35, and the axial front end 42 of the engagement head 40 is separated to the vertical upper side of the axial rear end 43 of the guide protrusion portion 35 and is close to the axial rear end 43 of the guide protrusion portion 35. Consequently, when the plug frame 12 is warped to the vertical upper side of the guide protrusion portion 35, the distance between the axial front end 42 of the engagement head 40 and the axial rear end 43 of the guide protrusion portion 35 shortens, and the axial front end 42 of the engagement head 40 contacts (comes into contact with) the axial rear end 43 of the top surface 36 that flatly extends and has the predetermined area in the guide protrusion portion 35, and the axial front end 42 of the engagement head 40 is supported by the axial rear end 43 of the top surface 36 of the guide protrusion portion 35. Consequently, the engagement head 40 is prevented from moving (bowing) vertically downward from the guide protrusion portion 35, to help prevent the engagement protrusion portions 41 of the engagement head 40 and the locking portions 52 of the optical connector adaptor 51 from being unintentionally disengaged, and maintain an optical connection state of the optical connector plug 10A and the optical connector adaptor 51.

Even when a predetermined load is applied to the plug frame 12 during use of the optical connector plug 10A, the optical connector plug 10A is able to help prevent a communication cutoff accident that the engagement protrusion portions 41 of the engagement head 40 of the engagement latch 37 and the locking portions 52 of the optical connector adaptor 51 are unintentionally disengaged.

There is a case in which the axially rearward separation dimension of the axial front end 42 of the engagement head 40 from the axial rear end 43 of the guide protrusion portion 35 is less than 0.01 mm, the vertically upward separation dimension of the axial front end 42 of the engagement head 40 from the axial rear end 43 of the guide protrusion portion 35 is less than 0.01 mm, and the plug frame 12 is pulled from the optical connector adaptor 51 in the normal state in which the load does not act on the optical connector plug 10A (the normal state in which the plug frame 12 is not warped). In this case, when the arm 39 of the engagement latch 37 is swung vertically downward, the axial front end 42 of the engagement head 40 of the engagement latch 37 contacts (comes into contact with) the axial rear end 43 of the top surface 36 of the guide protrusion portion 35, the engagement protrusion portions 41 of the engagement head 40 cannot be moved to the lower side of the locking portions 52 of the optical connector adaptor 51 in some cases, and the engagement protrusion portions 41 of the engagement head 40 and the locking portions 52 of the optical connector adaptor 51 cannot be disengaged in some cases.

There is a case in which the axially rearward separation dimension of the axial front end 42 of the engagement head 40 from the axial rear end 43 of the guide protrusion portion 35 exceeds 0.2 mm, and the vertically upward separation dimension of the axial front end 42 of the engagement head 40 from the axial rear end 43 of the guide protrusion portion 35 exceeds 0.4 mm. In this case, when the plug frame 12 is warped to the vertical upper side of the guide protrusion portion 35, the axial front end 42 of the engagement head 40 does not contact (come into contact with) the axial rear end 43 of the top surface 36 of the guide protrusion portion 35, the axial rear end 43 of the top surface 36 of the guide protrusion portion 35 does not support the axial front end 42 of the engagement head 40 in some cases. Therefore, preventing the engagement head 40 from moving vertically downward from the guide protrusion portion 35 is difficult or impossible, and the engagement protrusion portions 41 of the engagement head 40 and the locking portions 52 of the optical connector adaptor 51 are disengaged in some cases.

According to the optical connector plug 10A, the axially rearward separation dimension of the axial front end 42 of the engagement head 40 from the axial rear end 43 of the guide protrusion portion 35 is in the range of from 0.01 mm to 0.2 mm, and the vertically upward separation dimension of the axial front end 42 of the engagement head 40 from the axial rear end 43 of the guide protrusion portion 35 is in the range of from 0.01 mm to 0.4 mm Consequently, in the normal state in which the load does not act on the optical connector plug 10A (the state in which the plug frame 12 is not warped), the engagement protrusion portions 41 of the engagement head 40 are able to move to the lower side of the locking portions 52 of the optical connector adaptor 51, and reliably disengage the engagement protrusion portions 41 of the engagement head 40 and the locking portions 52 of the optical connector adaptor 51. Furthermore, when the plug frame 12 is warped to the vertical upper side of the guide protrusion portion 35, the axial front end 42 of the engagement head 40 is reliably supported by the axial rear end 43 of the top surface 36 of the guide protrusion portion 35. Consequently, the engagement head 40 is prevented from moving vertically downward from the guide protrusion portion 35, prevent the engagement protrusion portions 41 of the engagement head 40 and the locking portions 52 of the optical connector adaptor 51 from being unintentionally disengaged, and reliably maintain an optical connection state of the optical connector plug 10A and the optical connector adaptor 51.

Figure 15:
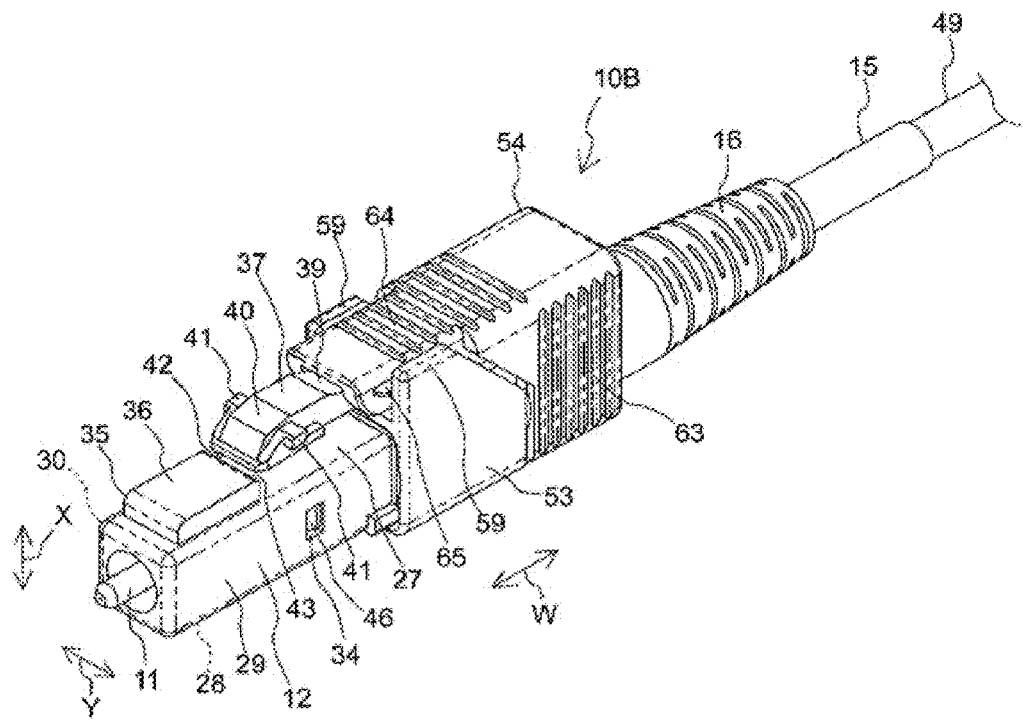
FIG. 15 is a perspective view of the optical connector plug according to at least one embodiment.
Figure 16:
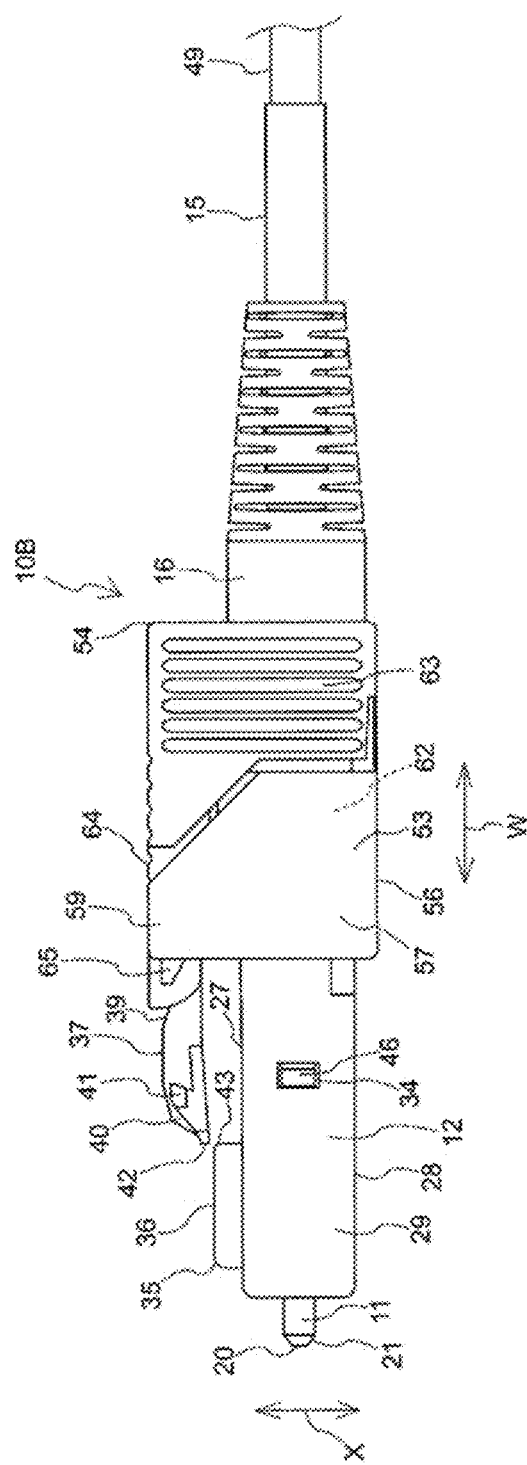
FIG. 16 is a side view of the optical connector plug according to at least one embodiment.
Figure 17:
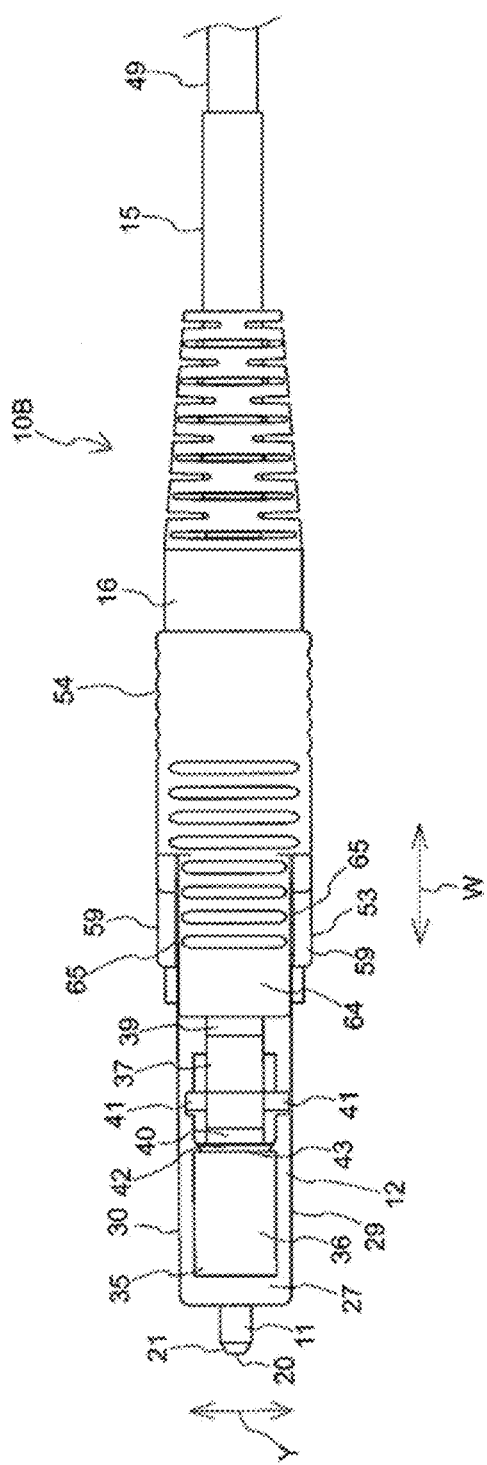
FIG. 17 is a top view of the optical connector plug according to at least one embodiment.
Figure 18:
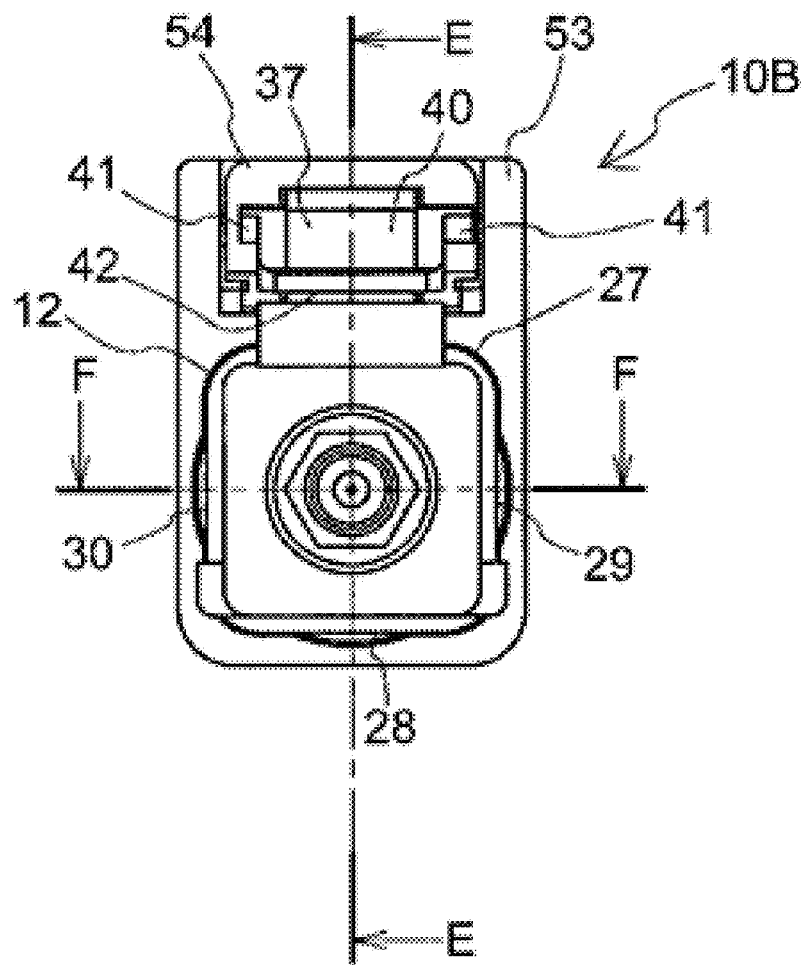
FIG. 18 is a front view of the optical connector plug according to at least one embodiment.
Figure 19:
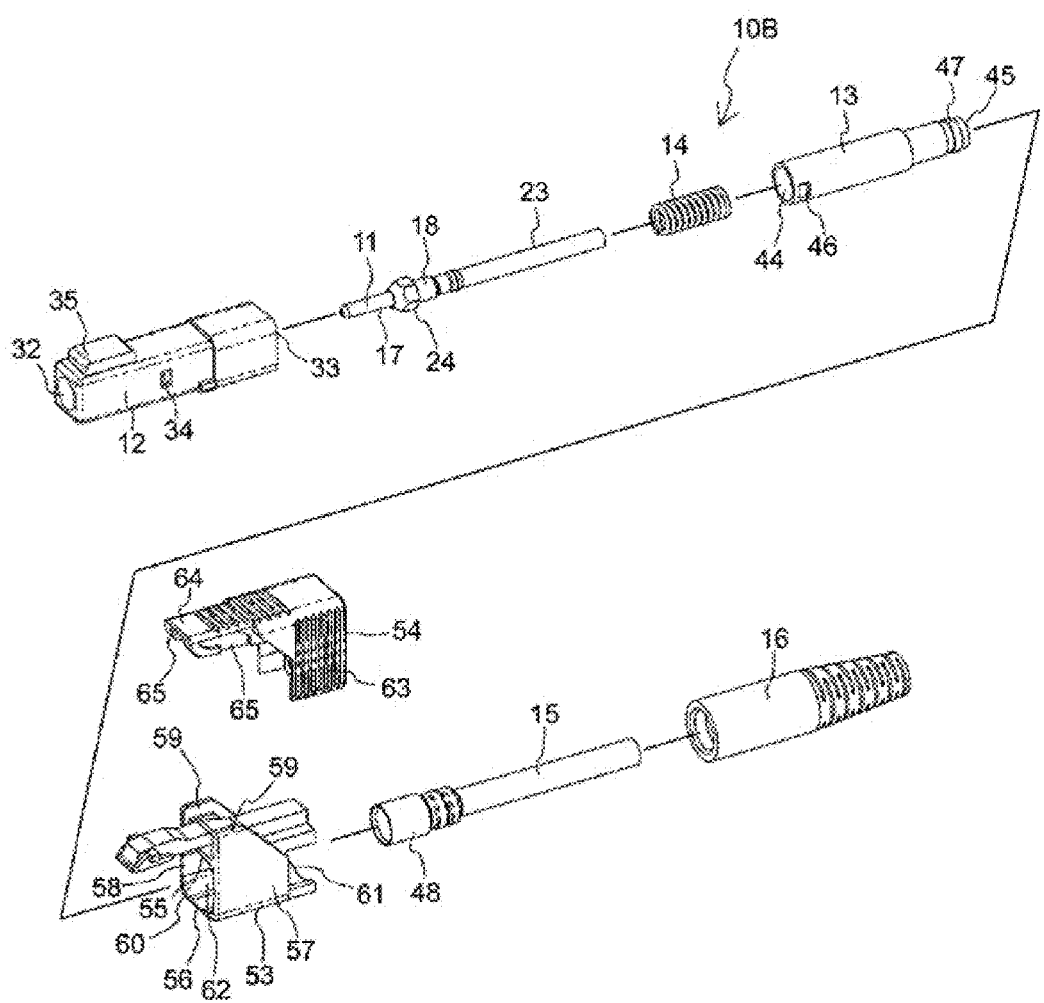
FIG. 19 is an exploded perspective view of the optical connector plug according to at least one embodiment.
Figure 20:
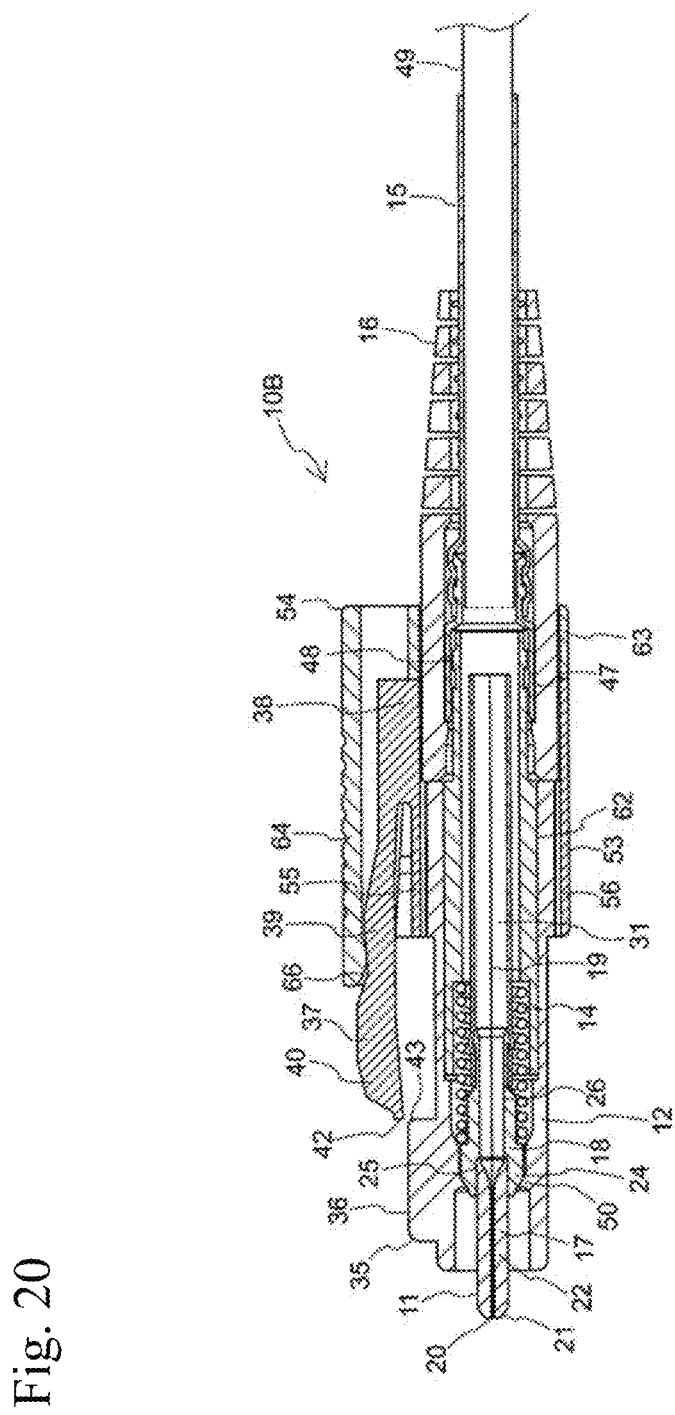
FIG. 20 is a sectional view as seen in a direction indicated by arrows of the line E-E in FIG. 18 according to at least one embodiment.
Figure 21:
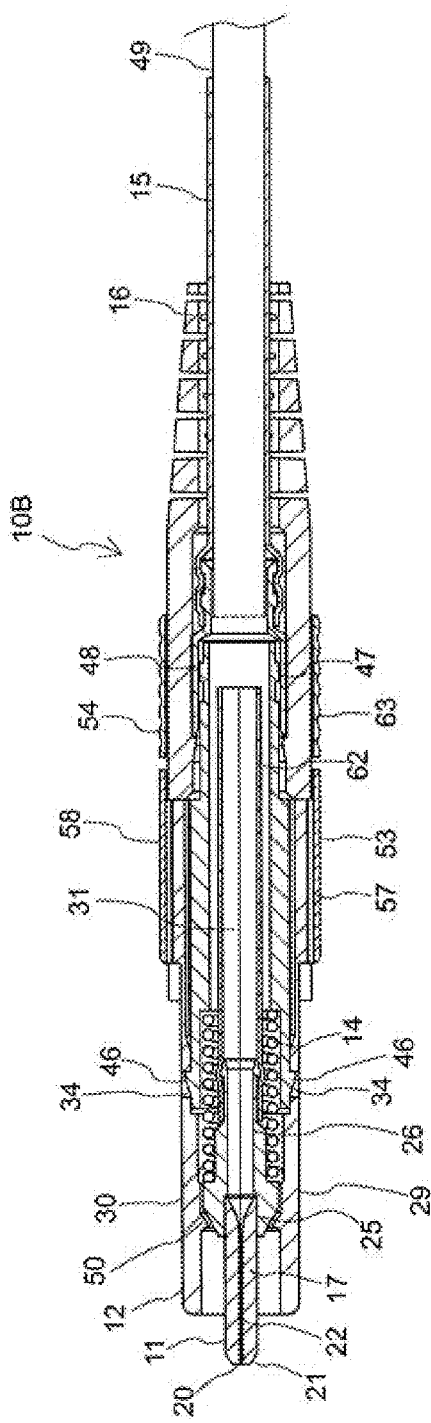
FIG. 21 is a sectional view as seen in a direction indicated by arrows of the line F-F in FIG. 18 according to at least one embodiment.

FIG. 15 is a perspective view of an optical connector plug 10B according to at least one embodiment. FIG. 16 is a side view of the optical connector plug 10B. FIG. 17 is a top view of the optical connector plug 10B. FIG. 18 is a front view of the optical connector plug 10B. FIG. 19 is an exploded perspective view of the optical connector plug 10B. FIG. 20 is a sectional view as seen in a direction indicated by arrows of the line E-E of FIG. 18. FIG. 21 is a sectional view as seen in a direction indicated by arrows of the line F-F of FIG. 18. In FIG. 15 to FIG. 17, the axial direction corresponds to the arrow W, the vertical direction to the arrow X, and the horizontal direction to the arrow Y.

The optical connector plug 10B is mountable to the optical connector adaptor 51 (see FIG. 22) to optically connect optical fibers. The optical connector plug 10B includes the ferrule 11 which extends in the axial direction, the plug frame 12 which is configured to accommodate the ferrule 11, the stop ring 13 engaged in the plug frame 12, the spring 14 (coil spring), a casing 53, a slider 54, the caulking ring 15, and the boot 16. In the exploded perspective view of FIG. 19, the plug frame 12, the ferrule 11, the spring 14, the stop ring 13, the casing 53, the slider 54, the caulking ring 15, and the boot 16 are arrayed in the stated order from the axial front side to the axial rear side.

The ferrule 11 is similar to that of the optical connector plug 10A in FIG. 1, and includes the capillary 17 which extends in the axial direction, and the sleeve 18 that is formed in the cylindrical shape extending in the axial direction. The capillary 17 holds at least one optical fiber 19. The capillary 17 and the sleeve 18 are similar to those of the optical connector plug 10A in FIG. 1.

The plug frame 12 includes the synthetic resin material, and is a hollow and substantially prism shape. The plug frame 12 includes the top wall 27 and the bottom wall 28 that are separated and face each other in the vertical direction and extend in the axial direction, and the both side walls 29 and 30 that are separated and face each other in the horizontal direction and extend in the axial direction. In the plug frame 12, the ferrule accommodation space 31 that is surrounded by those walls 27 to 30 and extends in the axial direction is defined. Moreover, the front end exposure opening 32 from which the distal end portion of the capillary 17 is exposed is opened, and the rear end insertion opening 33 in which the ferrule 11 is inserted is opened.

The contact portion 50 extends on the axial rear side of the front end exposure opening 32 of the plug frame 12, and extends radially inward from the inner circumferential surface of the ferrule accommodation space 31. The flange 24 of the sleeve 18 comes into contact with the contact portion 50. Contact of the flange 24 of the sleeve 18 with the contact portion 50 helps to prevent the sleeve 18 from further moving axially forward with respect to the plug frame 12. The fitting holes 34 opened in the horizontal direction are formed in the both side walls 29 and 30 at the axial center of the plug frame 12. In the top wall 27 on the axial front side of the plug frame 12, the guide protrusion portion 35 (protrusion portion) which extends as a protrusion vertically upward from the top wall 27 in the axial direction is formed. The guide protrusion portion 35 includes the top surface 36 that flatly extends and has a predetermined area.

The stop ring 13 is the same as that of the optical connector plug 10A in FIG. 1, and is insertable into the ferrule accommodation space 31 of the plug frame 12. When the stop ring 13 is inserted into the ferrule accommodation space 31 of the plug frame 12, the fitting protrusion portions 46 of the stop ring 13 detachably fitted to the fitting holes 34 formed in the both side walls 29 and 30 of the plug frame 12, and the stop ring 13 is coupled to the plug frame 12. The spring 14 is similar to that of the optical connector plug 10A in FIG. 1, and urges the ferrule 11 axially forward.

The casing 53 includes a synthetic resin material, and includes a top wall 55 and a bottom wall 56 that are separated and face each other in the vertical direction and extend in the axial direction, both side walls 57 and 58 that are separated and face each other in the horizontal direction and extend in the axial direction, and guide walls 59 that are located above the both side walls 57 and 58 and extend in the axial direction. In the casing 53, a front end opening 60 opened at a front end, a rear end opening 61 opened at a rear end, and a plug frame accommodation portion 62 which extends between the front end opening 60 and the rear end opening 61 are defined. The engagement latch 37 is formed on the top wall 55 of the casing 53. The rear end portion of the plug frame 12 is press-fitted in the plug frame accommodation portion 62 of the casing 53, and the plug frame 12 is coupled to the casing 53.

The engagement latch 37 includes the base 38, the arm 39, and the engagement head 40. The base 38 is formed integrally with the casing 53, is located on the axial rear side of the top wall 55 of the casing 53, and connects to the top wall 55. The arm 39 connects to the base 38. The engagement head 40 is located on the axial front side of the arm 39. The arm 39 is separated vertically upward from the top wall 55 of the casing 53, and extends axially forward from the base 38 (the axial rear side of the plug frame 12) connected to the axial rear side of the top wall 55 to the guide protrusion portion 35. The arm 39 has elasticity, and is elastically deformable (swingable) in the vertical direction.

The engagement head 40 includes a pair of engagement protrusion portions 41 that project horizontally outward. The engagement protrusion portions 41 disengageably engage with the locking portions 52 of the optical connector adaptor 51 when the plug frame 12 is inserted into the optical connector adaptor 51. The engagement head 40 has a larger horizontal dimension except the engagement protrusion portions 41 than the arm 39, and is substantially the same as the horizontal dimension of the top surface 36 of the guide protrusion portion 35. The engagement head 40 swings in the vertical direction as the arm 39 elastically deforms in the vertical direction.

In FIG. 15, the axial front end 42 of the engagement head 40 is slightly separated axially rearward from the axial rear end 43 of the guide protrusion portion 35, is slightly separated to the vertical upper side of the axial rear end 43 of the guide protrusion portion 35, is located near the axial rear end 43 of the guide protrusion portion 35, and is close to the axial rear end 43 of the guide protrusion portion 35. The axially rearward separation dimension of the axial front end 42 of the engagement head 40 from the axial rear end 43 of the guide protrusion portion 35 is in the range of from 0.01 mm to 0.2 mm. The vertically upward separation dimension of the axial front end 42 of the engagement head 40 from the axial rear end 43 of the guide protrusion portion 35 is in the range of from 0.01 mm to 0.4 mm.

In addition, according to the optical connector plug 10B, the axial front end 42 of the engagement head 40 may not be separated to the vertical upper side of the axial rear end 43 of the guide protrusion portion 35, the axial front end 42 of the engagement head 40 may be slightly separated axially rearward from the axial rear end 43 of the guide protrusion portion 35, and the axial front end 42 may be located near the axial rear end 43 of the guide protrusion portion 35 and be close to the axial rear end 43 of the guide protrusion portion 35. In this case, the axially rearward separation dimension of the axial front end 42 of the engagement head 40 from the axial rear end 43 of the guide protrusion portion 35 is in the range of from 0.01 mm to 0.2 mm.

The slider 54 includes a synthetic resin material, and includes a box 63 that is coupled to the casing 53, a sliding top wall 64 (sliding plate) which extends axially forward from a top portion of the box 63, and guide plates 65 (guide walls) which extend vertically downward from both sides of the sliding top wall 64 and extend in the axial direction. An inclined surface 66 is formed on a lower surface of a distal end portion of the sliding top wall 64.

In the slider 54, the guide plates 65 slidably fit to the guide walls 59 of the casing 53, and the box 63 is coupled to the casing 53 slidably in the axial direction under a state in which this box 63 is located on the axial rear side of the casing 53. In a state in which the slider 54 is coupled to the casing 53, the inclined surface 66 of the sliding top wall 64 of the slider 54 comes into contact with an upper surface of the arm 39 of the engagement latch 37. The slider 54 slides axially forward and rearward on the upper surface of the arm 39 of the engagement latch 37. When the slider 54 slides axially rearward with respect to the casing 53, the inclined surface 66 of the sliding top wall 64 of the slider 54 presses the arm 39 of the engagement latch 37 vertically downward, and the inclined surface 66 pushes the engagement latch 37 vertically downward.

The caulking ring 15 is similar to that of the optical connector plug 10A in FIG. 1, and, when the fitting ring 47 of the stop ring 13 is fixed to the caulking portion 48 formed at the front end portion of the caulking ring 15, the stop ring 13 is coupled to the caulking ring 15. The boot 16 is similar to that of the optical connector plug 10A in FIG. 1, and, when the inner circumferential surface of the boot 16 and the outer circumferential surface of the front end portion of the caulking ring 15 closely adhere, the caulking ring 15 is coupled to the boot 16. The optical fiber cord 49 that coats the optical fiber core 111 is inserted into the caulking ring 15, and extends axially rearward from the rear end of the caulking ring 15.

Figure 22:
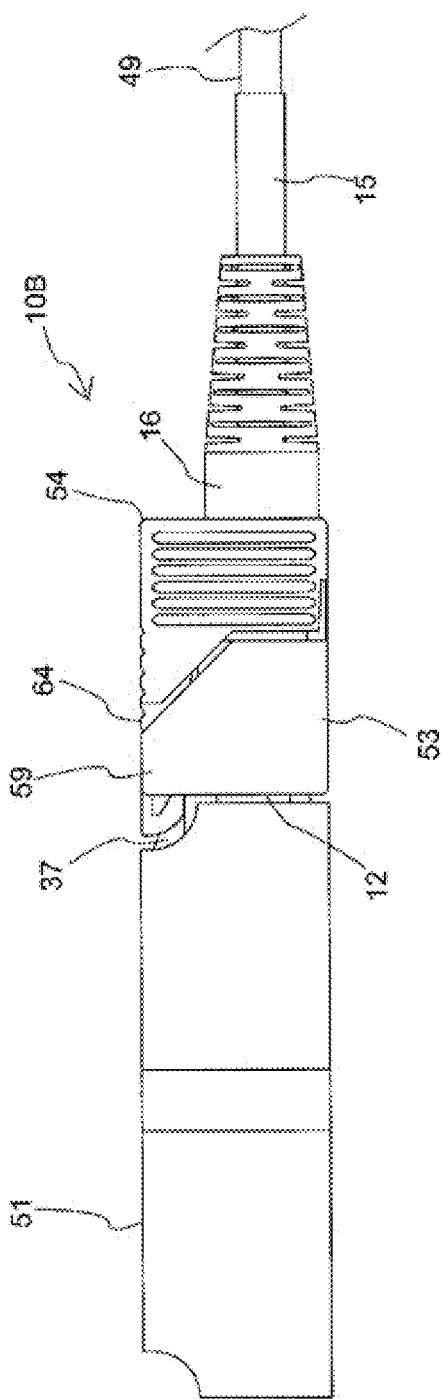
FIG. 22 is a side view of the optical connector plug in a state in which the optical connector plug is coupled to the optical connector adaptor according to at least one embodiment.
Figure 23:
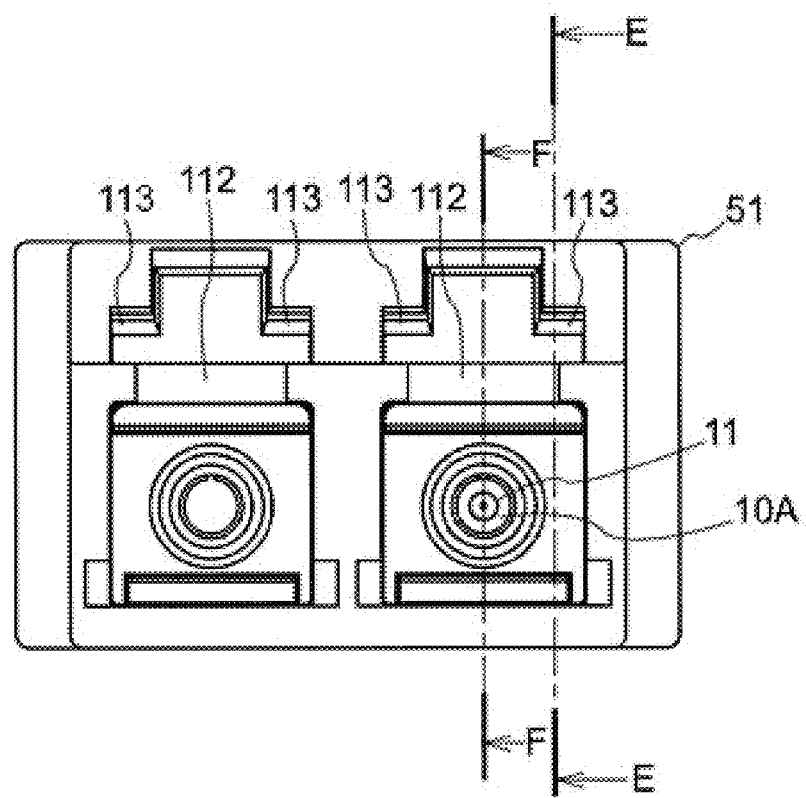
FIG. 23 is a front view of the optical connector plug in a state in which the optical connector plug is coupled to the optical connector adaptor according to at least one embodiment.
Figure 24:
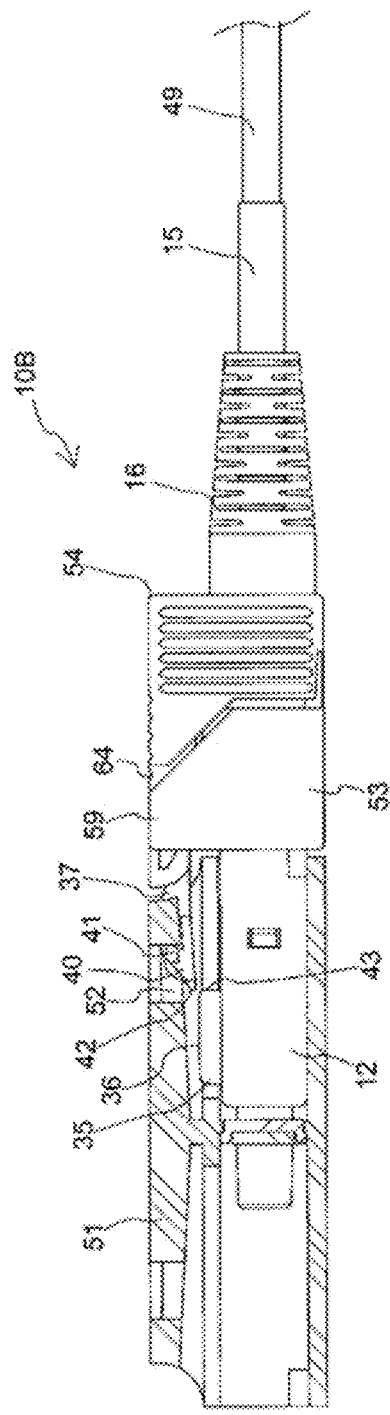
FIG. 24 is a sectional view as seen in a direction indicated by arrows of the line G-G in FIG. 23 according to at least one embodiment.
Figure 25:
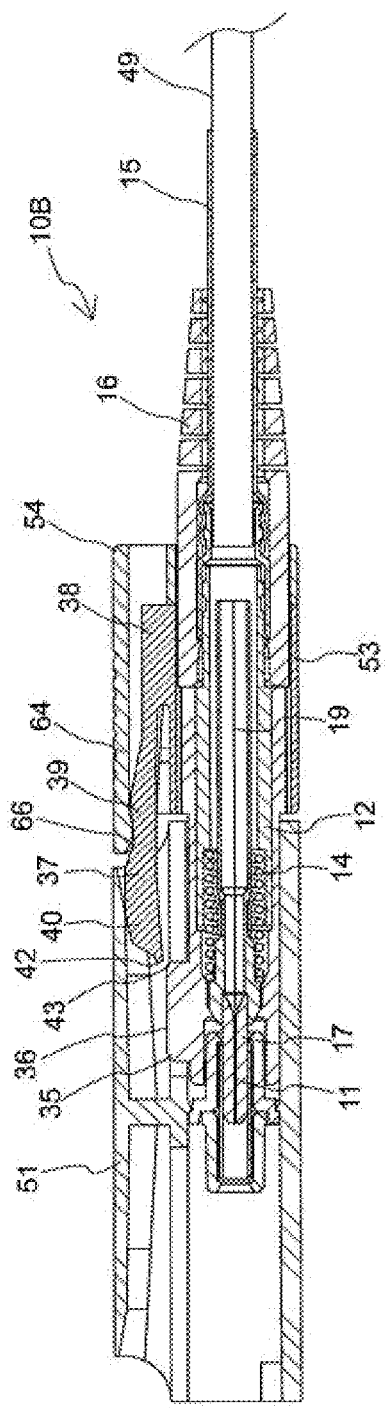
FIG. 25 is a sectional view as seen in a direction indicated by arrows of the line H-H in FIG. 23 according to at least one embodiment.
Figure 26:
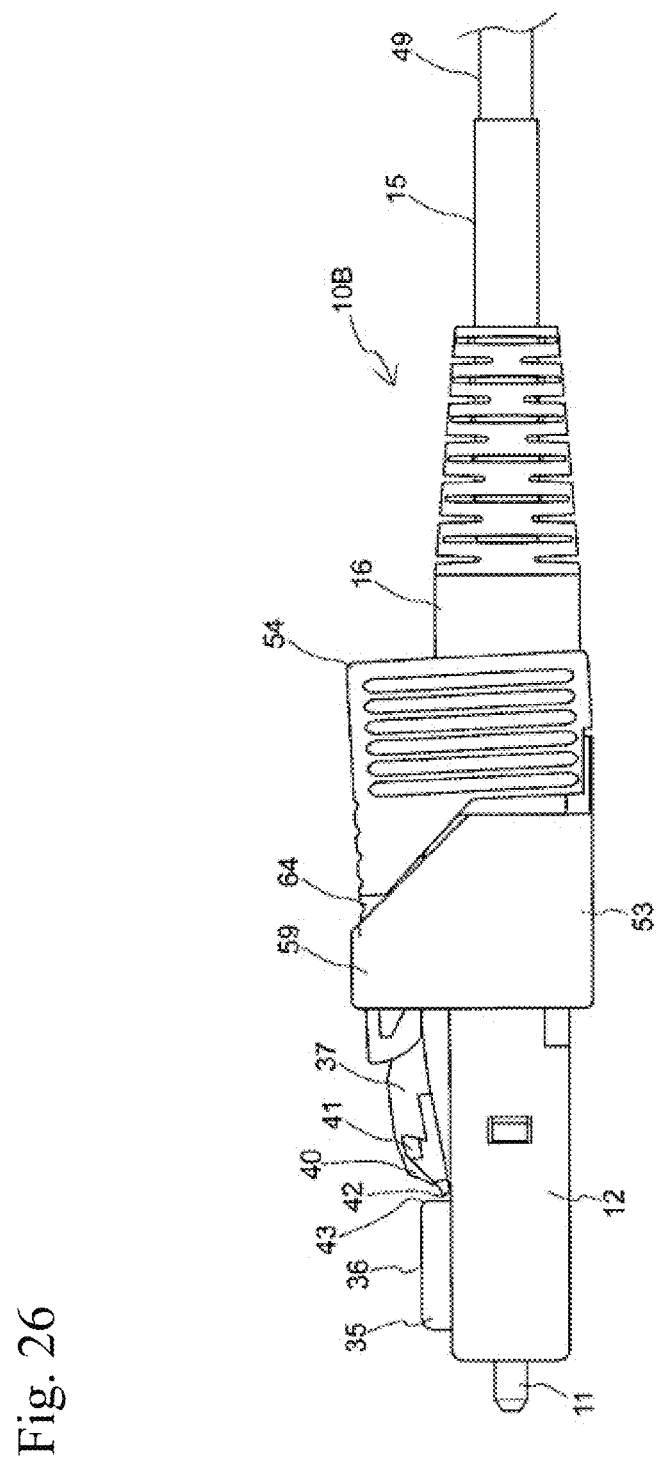
FIG. 26 is a side view of the optical connector plug in a case in which the optical connector adaptor and the optical connector plug are decoupled according to at least one embodiment.
Figure 27:
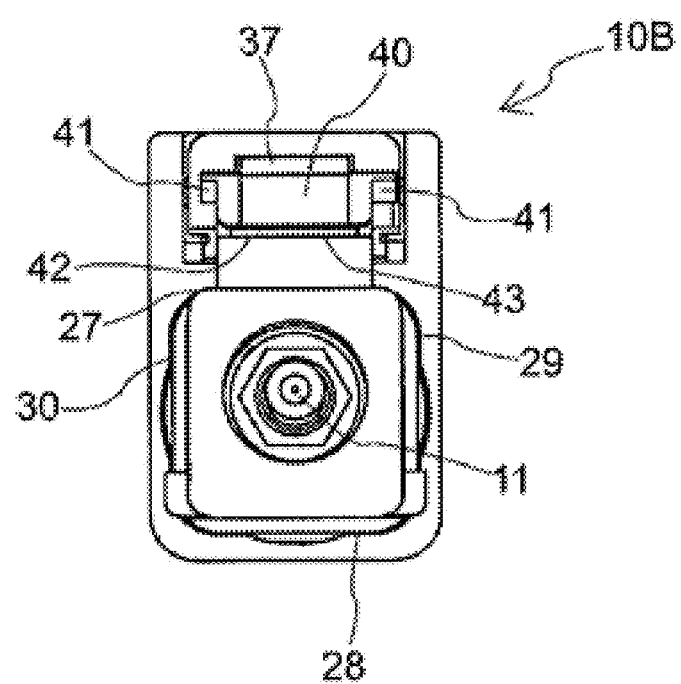
FIG. 27 is a front view of the optical connector plug in a state in which, while the optical connector adaptor and the optical connector plug are coupled, the plug frame is warped to the vertical upper side of the guide protrusion portion according to at least one embodiment.
Figure 28:
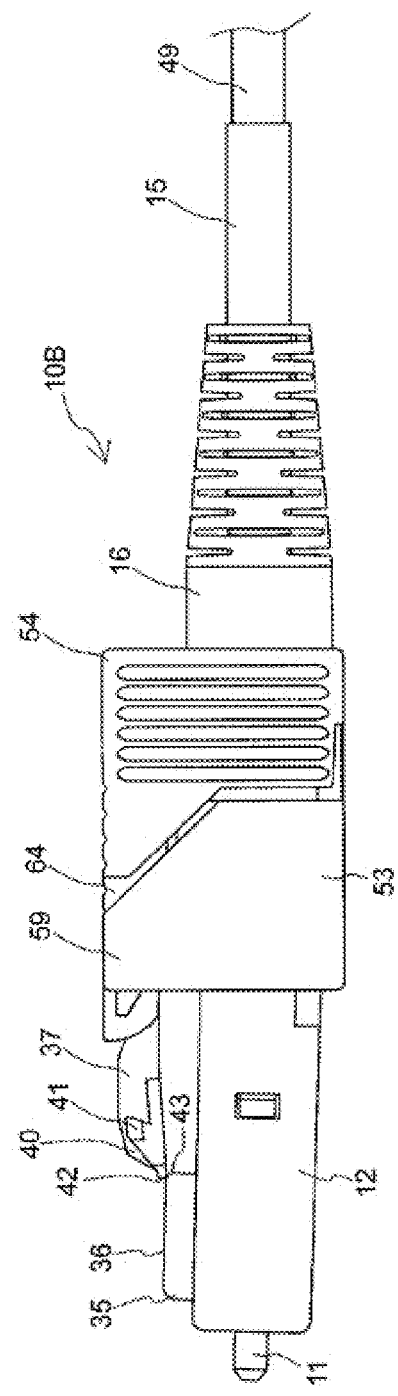
FIG. 28 is a side view of the optical connector plug in a state in which, while the optical connector adaptor and the optical connector plug are coupled, the plug frame is warped to the vertical upper side of the guide protrusion portion according to at least one embodiment.

FIG. 22 is a side view of the optical connector plug 10B in a state in which the optical connector plug 10B is coupled to the optical connector adaptor 51. FIG. 23 is a front view of the optical connector plug 10B in a state in which the optical connector plug 10B is coupled to the optical connector adaptor 51. FIG. 24 is a sectional view as seen in a direction indicated by arrows of the line G-G in FIG. 23. FIG. 25 is a sectional view as seen in a direction indicated by arrows of the line H-H in FIG. 23. FIG. 26 is a side view of the optical connector plug 10B in a case in which the optical connector adaptor 51 and the optical connector plug 10B are decoupled. FIG. 27 is a front view of the optical connector plug 10B for illustrating a state in which, while the optical connector adaptor 51 and the optical connector plug 10B are coupled, the plug frame 12 is warped to the vertical upper side of the guide protrusion portion 35. FIG. 28 is a side view of the optical connector plug 10B in a state in which, while the optical connector adaptor 51 and the optical connector plug 10B are coupled, the plug frame 12 is warped to the vertical upper side of the guide protrusion portion 35. In FIG. 26 and FIG. 28, the optical connector adaptor 51 is omitted for the sake of clarity.

The optical connector plug 10B is coupled to the optical connector adaptor 51 by pinching the plug frame 12, making the guide protrusion portion 35 of the plug frame 12 face guide rails 112 of the optical connector adaptor 51 face each other, and inserting the plug frame 12 into the optical connector adaptor 51 through the insertion opening of the optical connector adaptor 51. When the plug frame 12 is inserted into the optical connector adaptor 51, and the plug frame 12 is moved axially forward, the arm 39 of the engagement latch 37 gradually enters inside the optical connector adaptor 51, a top wall 113 of the optical connector adaptor 51 presses the engagement head 40 of the engagement latch 37 vertically downward, the arm 39 of the engagement latch 37 elastically deforms vertically downward, and the engagement head 40 is pushed vertically downward.

When the plug frame 12 is further moved axially forward, and the engagement head 40 is moved to the locking portions 52 of the optical connector adaptor 51, as illustrated in FIG. 24, the arm 39 elastically deforms vertically upward, the engagement protrusion portions 41 of the engagement head 40 engage with the locking portions 52 of the optical connector adaptor 51, and the optical connector plug 10B is coupled to the optical connector adaptor 51. The engagement protrusion portions 41 of the engagement head 40 engage with the locking portions 52 of the optical connector adaptor 51, so that an insertion state of the plug frame 12 in the optical connector adaptor 51 is maintained.

In the state in which a load does not act on the optical connector plug 10B, the optical connector adaptor 51 and the optical connector plug 10B are decoupled by applying a force for pushing down the sliding top wall 64 of the slider 54 and moving the slider 54 axially rearward. When the slider 54 moves axially rearward, as in FIG. 26, the inclined surface 66 of the sliding top wall 64 of the slider 54 presses the arm 39 of the engagement latch 37 vertically downward, the arm 39 elastically deforms vertically downward, and thereby the engagement head 40 of the engagement latch 37 moves vertically downward. When the engagement head 40 moves vertically downward, the engagement protrusion portions 41 of the engagement head 40 and the locking portions 52 of the optical connector adaptor 51 are disengaged, and the plug frame 12 is pulled axially rearward in this state to pull out the plug frame 12 from the optical connector adaptor 51.

When the optical fiber cord 49 extending axially rearward from the boot 16 is strongly pulled axially rearward, the optical fiber cord 49 is pulled vertically upward, and a predetermined load is applied to the plug frame 12 under a state in which the optical connector plug 10B is coupled to the optical connector adaptor 51, as in FIG. 27 and FIG. 28, the plug frame 12 is warped to the vertical upper side of the guide protrusion portion 35. Furthermore, when the optical fiber cord 49 is strongly pulled axially rearward, the optical fiber cord 49 is rotated drawing an arc, and the predetermined load is applied to the plug frame 12 in the state in which the optical connector plug 10B is coupled to the optical connector adaptor 51, the plug frame 12 is warped to the vertical upper side of the guide protrusion portion 35.

According to the optical connector plug 10B, when the predetermined load is applied to the plug frame 12, and the plug frame 12 is warped to the vertical upper side of the guide protrusion portion 35, the arm 39 of the engagement latch 37 is not warped, and a distance (separation dimension) between the engagement head 40 of the engagement latch 37 and the guide protrusion portion 35 shortens. Then, as in FIG. 28, the axial front end 42 of the engagement head 40 contacts (comes into contact with) the axial rear end 43 of the top surface 36 that flatly extends and has a predetermined area in the guide protrusion portion 35, and the axial front end 42 of the engagement head 40 is supported by the axial rear end 43 of the top surface 36 of the guide protrusion portion 35. According to the optical connector plug 10B, when the plug frame 12 is warped to the vertical upper side of the guide protrusion portion 35, the axial front end 42 of the engagement head 40 is supported by the axial rear end 43 of the guide protrusion portion 35, so that the engagement head 40 is prevented from moving to the vertical lower side of the guide protrusion portion 35.

When the plug frame 12 is warped to the vertical upper side of the guide protrusion portion 35, and the axial front end 42 of the engagement head 40 of the engagement latch 37 is not supported by the axial rear end 43 of the guide protrusion portion 35 and the engagement head 40 moves (bows) to the vertical lower side of the guide protrusion portion 35, the engagement protrusion portions 41 of the engagement head 40 are removed from the locking portions 52 of the optical connector adaptor 51, and the optical connector plug 10B and the optical connector adaptor 51 are decoupled in some cases. However, according to the optical connector plug 10B, the axial front end 42 of the engagement head 40 is separated axially rearward from the axial rear end 43 of the guide protrusion portion 35, and is close to the axial rear end 43 of the guide protrusion portion 35, and the axial front end 42 of the engagement head 40 is separated to the vertical upper side of the axial rear end 43 of the guide protrusion portion 35, and is close to the axial rear end 43 of the guide protrusion portion 35. Therefore, when the plug frame 12 is warped to the vertical upper side of the guide protrusion portion 35, the distance between the axial front end 42 of the engagement head 40 and the axial rear end 43 of the guide protrusion portion 35 shortens, the axial front end 42 of the engagement head 40 contacts (comes into contact with) the axial rear end 43 of the top surface 36 that flatly extends and has the predetermined area in the guide protrusion portion 35, and the axial front end 42 of the engagement head 40 is supported by the axial rear end 43 of the top surface 36 of the guide protrusion portion 35. Consequently, the engagement head 40 is prevented from moving (bowing) vertically downward from the guide protrusion portion 35, the engagement protrusion portions 41 of the engagement head 40 and the locking portions 52 of the optical connector adaptor 51 are prevented from being unintentionally disengaged, and an optical connection state of the optical connector plug 10B and the optical connector adaptor 51 is maintained.

Even when a predetermined load is applied to the plug frame 12 during use of the optical connector plug 10B, the optical connector plug 10B can help to prevent an accident that the engagement protrusion portions 41 of the engagement head 40 of the engagement latch 37 and the locking portions 52 of the optical connector adaptor 51 are unintentionally disengaged, and save an effort for coupling the optical connector plug 10B and the optical connector adaptor 51 again when the optical connector plug 10B and the optical connector adaptor 51 are unintentionally decoupled.

There is a case in which the axially rearward separation dimension of the axial front end 42 of the engagement head 40 from the axial rear end 43 of the guide protrusion portion 35 is less than 0.01 mm, the vertically upward separation dimension of the axial front end 42 of the engagement head 40 from the axial rear end 43 of the guide protrusion portion 35 is less than 0.01 mm, and the plug frame 12 is pulled from the optical connector adaptor 51 in the normal state in which the load does not act on the optical connector plug 10B (the normal state in which the plug frame 12 is not warped). In this case, when the arm 39 of the engagement latch 37 is swung vertically downward, the axial front end 42 of the engagement head 40 of the engagement latch 37 contacts (comes into contact with) the axial rear end 43 of the top surface 36 of the guide protrusion portion 35, the engagement protrusion portions 41 of the engagement head 40 cannot be moved to the lower side of the locking portions 52 of the optical connector adaptor 51 in some cases, and the engagement protrusion portions 41 of the engagement head 40 and the locking portions 52 of the optical connector adaptor 51 cannot be disengaged in some cases.

There is a case in which the axially rearward separation dimension of the axial front end 42 of the engagement head 40 from the axial rear end 43 of the guide protrusion portion 35 exceeds 0.2 mm, and the vertically upward separation dimension of the axial front end 42 of the engagement head 40 from the axial rear end 43 of the guide protrusion portion 35 exceeds 0.4 mm. In this case, when the plug frame 12 is warped to the vertical upper side of the guide protrusion portion 35, the axial front end 42 of the engagement head 40 does not contact (come into contact with) the axial rear end 43 of the top surface 36 of the guide protrusion portion 35, the axial rear end 43 of the top surface 36 of the guide protrusion portion 35 cannot support the axial front end 42 of the engagement head 40 in some cases. Therefore, the engagement head 40 is not prevented from moving vertically downward from the guide protrusion portion 35, and the engagement protrusion portions 41 of the engagement head 40 and the locking portions 52 of the optical connector adaptor 51 are disengaged in some cases.

According to the optical connector plug 10B, the axially rearward separation dimension of the axial front end 42 of the engagement head 40 from the axial rear end 43 of the guide protrusion portion 35 is in the range described above, and the vertically upward separation dimension of the axial front end 42 of the engagement head 40 from the axial rear end 43 of the guide protrusion portion 35 is in the range described above. Consequently, in the normal state in which the load does not act on the optical connector plug 10B (the normal state in which the plug frame 12 is not warped), the engagement protrusion portions 41 of the engagement head 40 are movable to the lower side of the locking portions 52 of the optical connector adaptor 51, and the engagement protrusion portions 41 of the engagement head 40 and the locking portions 52 of the optical connector adaptor 51 are able to be reliably disengaged. Furthermore, when the plug frame 12 is warped to the vertical upper side of the guide protrusion portion 35, the axial front end 42 of the engagement head 40 is reliably supported by the axial rear end 43 of the top surface 36 of the guide protrusion portion 35. Consequently, the engagement head 40 is prevented from moving vertically downward from the guide protrusion portion 35, prevent the engagement protrusion portions 41 of the engagement head 40 and the locking portions 52 of the optical connector adaptor 51 from being unintentionally disengaged, and reliably maintain an optical connection state of the optical connector plug 10B and the optical connector adaptor 51.

Figure 29:
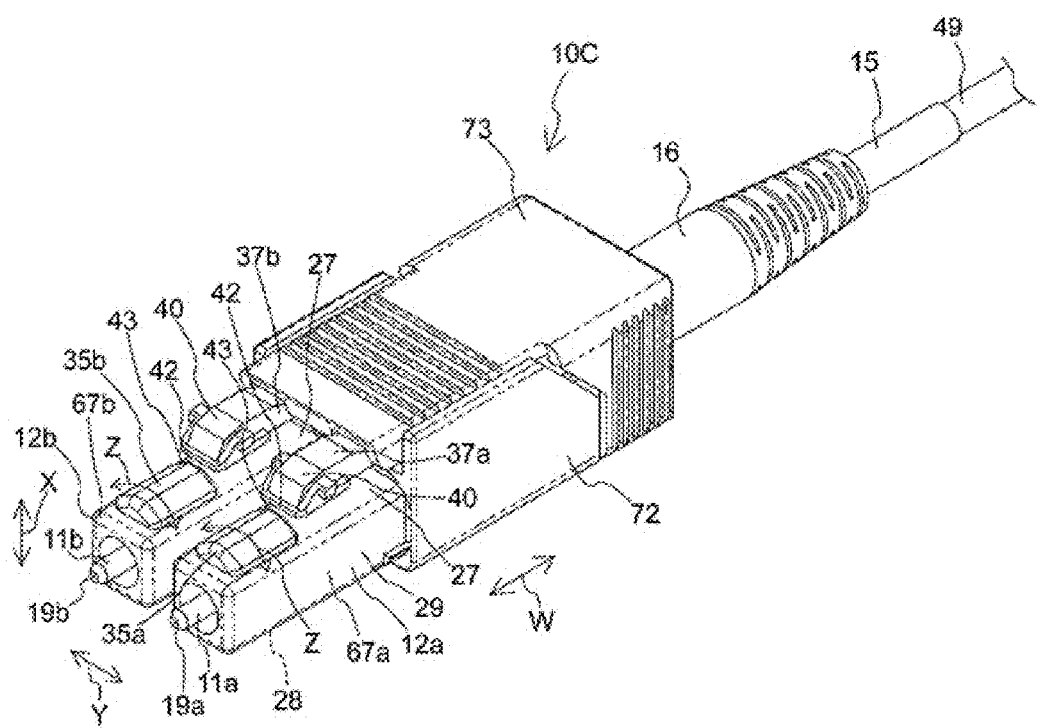
FIG. 29 is a perspective view of a duplex optical connector plug according to at least one embodiment.
Figure 30:
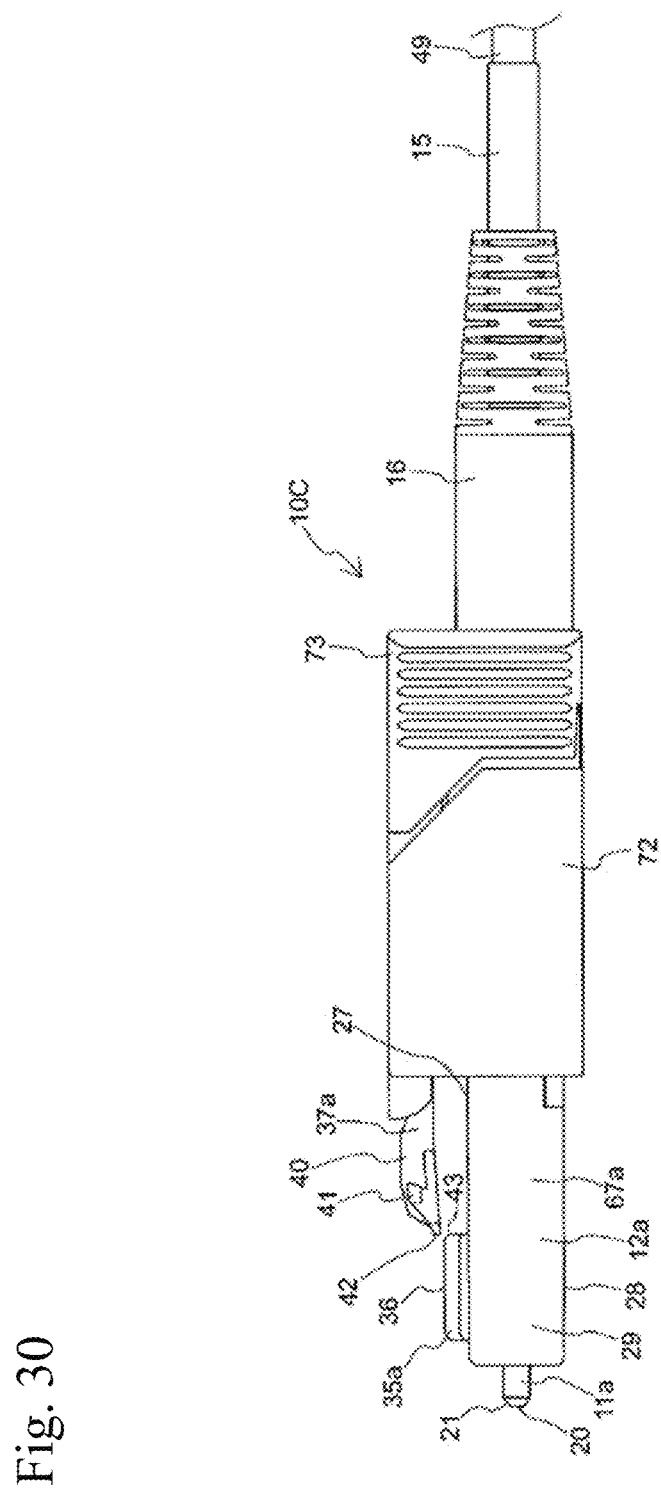
FIG. 30 is a side view of the duplex optical connector plug according to at least one embodiment.
Figure 31:
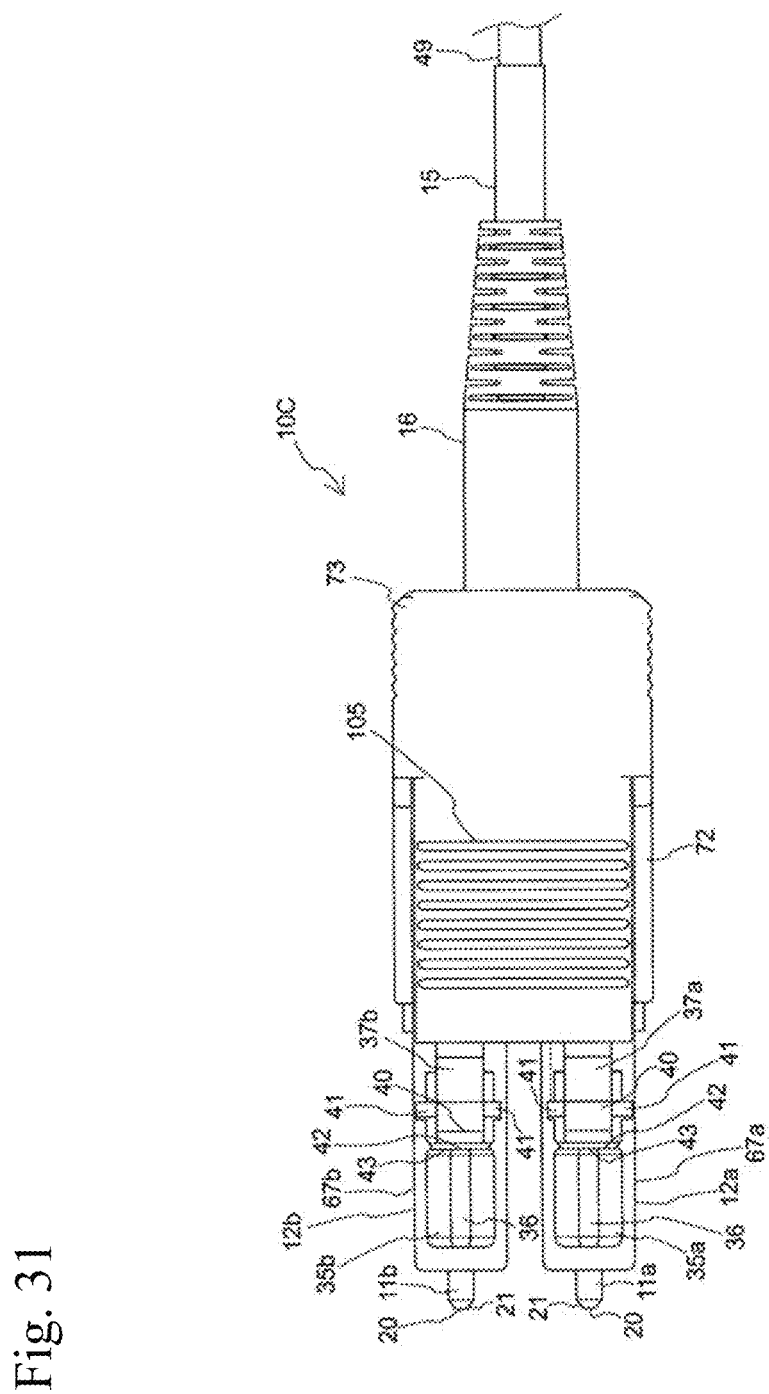
FIG. 31 is a top view of the duplex optical connector plug according to at least one embodiment.
Figure 32:
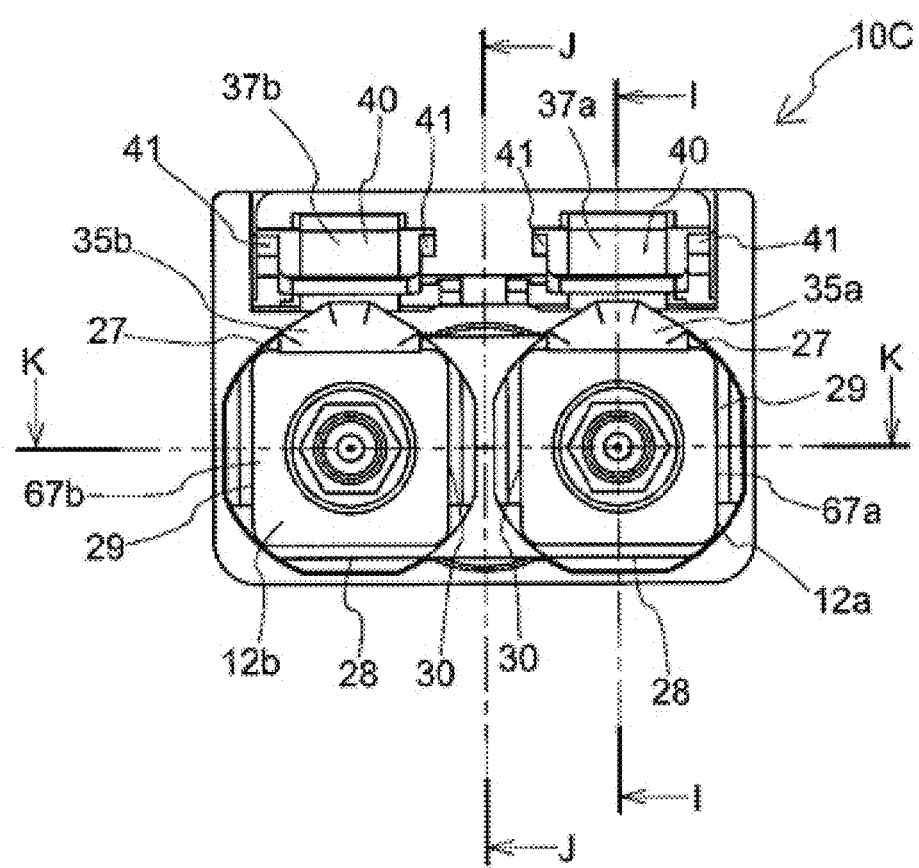
FIG. 32 is a front view of the duplex optical connector plug according to at least one embodiment.
Figure 33:
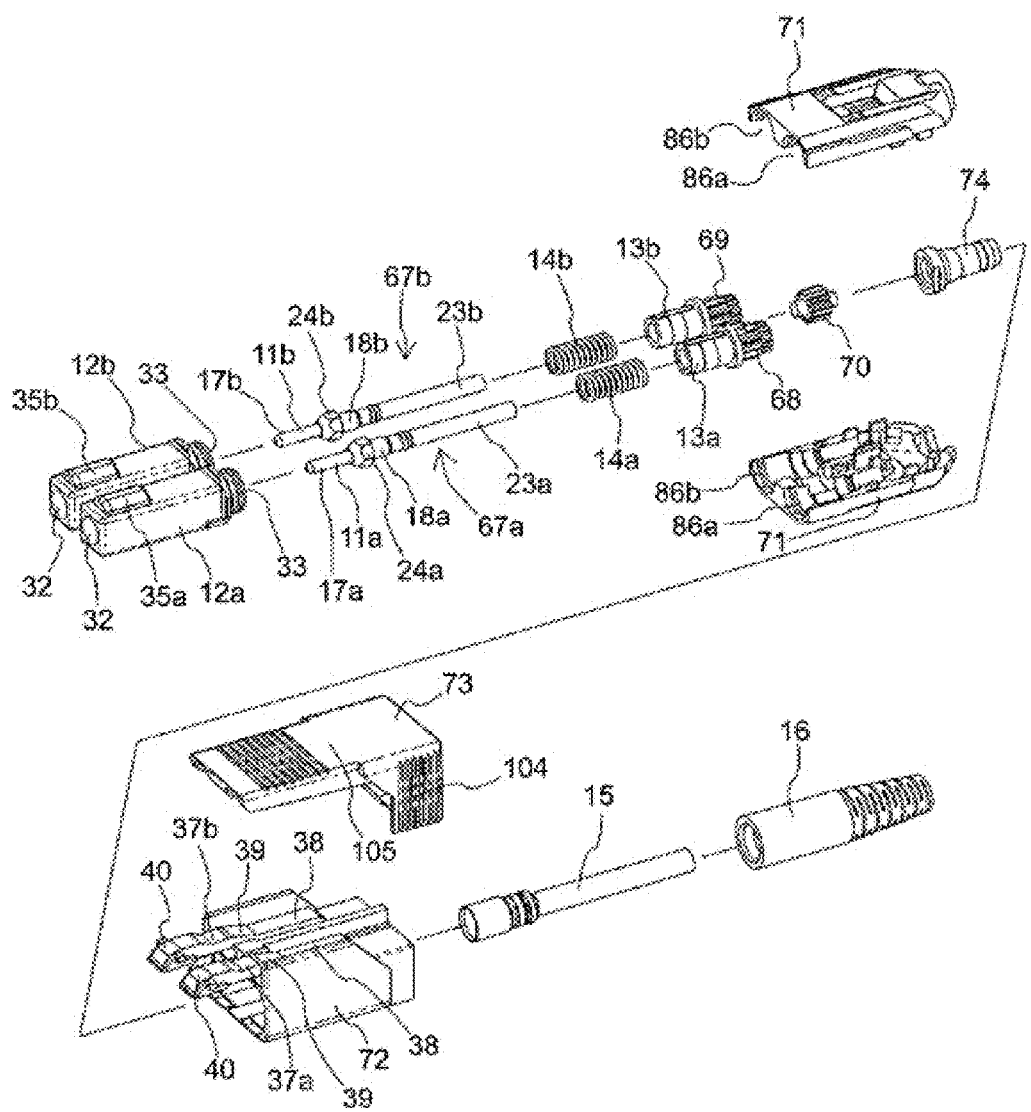
FIG. 33 is an exploded perspective view of the duplex optical connector plug according to at least one embodiment.
Figure 34:
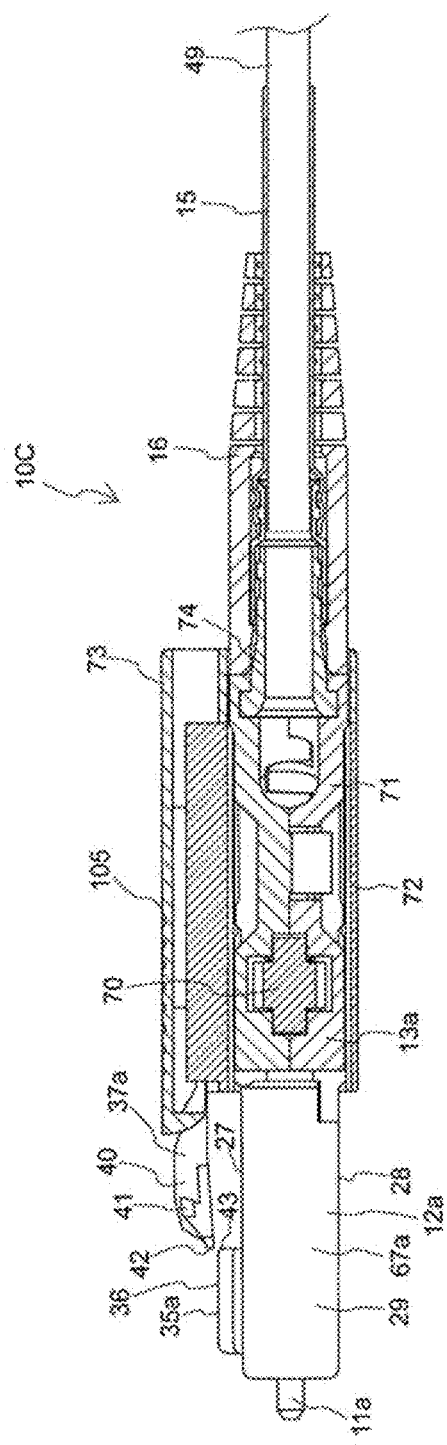
FIG. 34 is a sectional view as seen in a direction indicated by arrows of the line I-I in FIG. 32 according to at least one embodiment.
Figure 35:
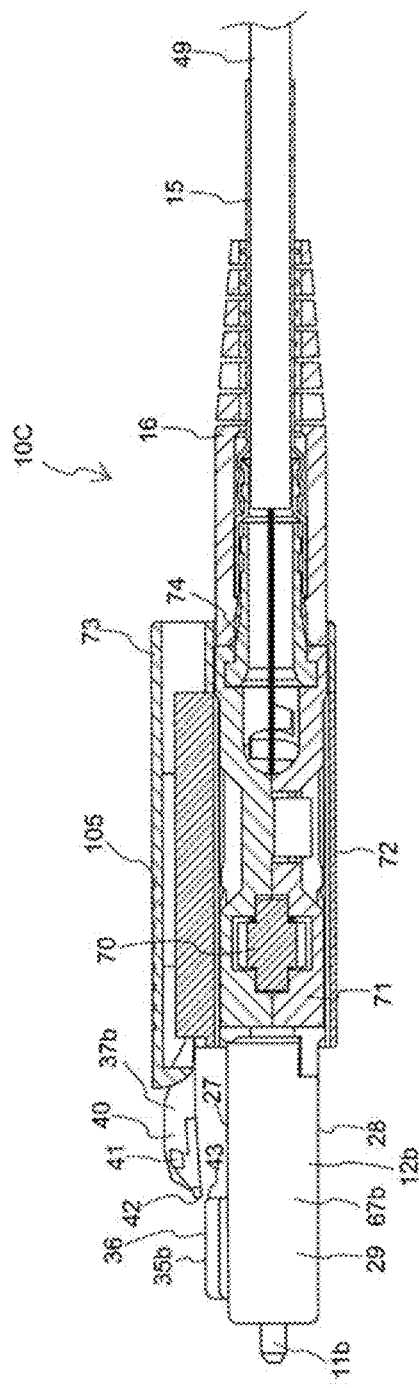
FIG. 35 is a sectional view as seen in a direction indicated by arrows of the line J-J in FIG. 32 according to at least one embodiment.
Figure 36:
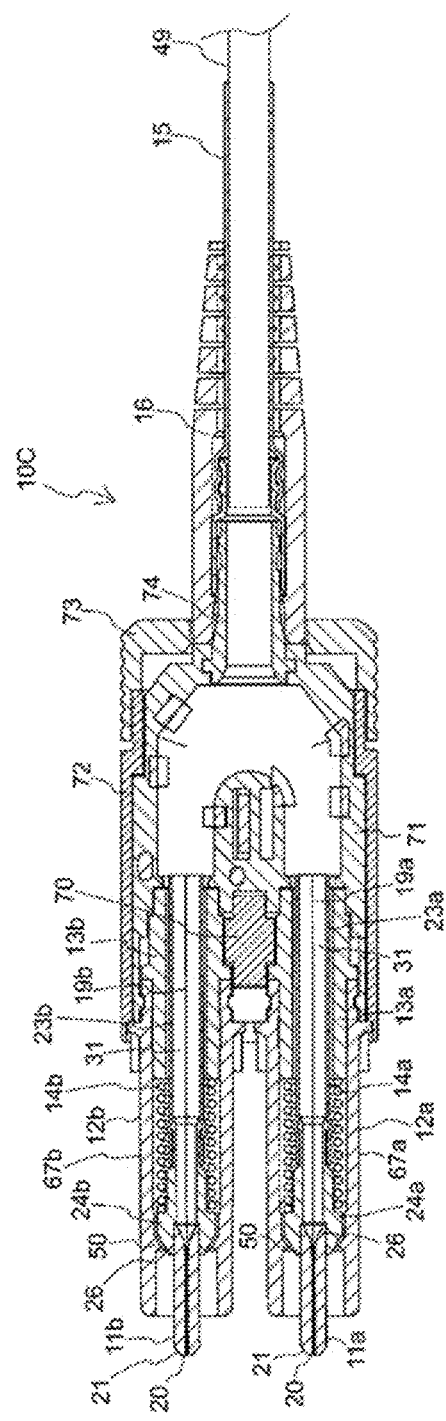
FIG. 36 is a sectional view as seen in a direction indicated by arrows of the line K-K in FIG. 32 according to at least one embodiment.

A duplex optical connector plug according to this disclosure is described in detail as follows with reference to accompanying drawings such as FIG. 29 that is a perspective view of a duplex optical connector plug 10C according to at least one embodiment. In addition, FIG. 30 is a side view of the duplex optical connector plug 10C. FIG. 31 is a top view of the duplex optical connector plug 10C. FIG. 32 is a front view of the duplex optical connector plug 10C according to at least one embodiment. FIG. 33 is an exploded perspective view of the duplex optical connector plug 10C. FIG. 34 is a sectional view as seen in a direction indicated by arrows of the line I-I in FIG. 32. FIG. 35 is a sectional view as seen in a direction indicated by arrows of the line J-J in FIG. 32. FIG. 36 is a sectional view as seen in a direction indicated by arrows of the line K-K in FIG. 32. In FIG. 29 to FIG. 31, the axial direction corresponds to the arrow W, the vertical direction to the arrow X, and the horizontal direction to the arrow Y.

The duplex optical connector plug 10C is mountable to the optical connector adaptor 51 (see FIG. 52) to optically connect optical fibers. The optical connector plug 10C includes a first optical connector assembly 67a, a second optical connector assembly 67b, a first gear 68, a second gear 69, an intermediate gear 70, a first casing 71, a second casing 72, a slider 73, the caulking ring 15, the boot 16 and a pipe 74. In the exploded perspective view of FIG. 33, the first optical connector assembly 67a, the second optical connector assembly 67b, the first casing 71, the pipe 74, the second casing 72, the slider 73, the caulking ring 15, and the boot 16 are arrayed in the stated order from the axial front side to the axial rear side.

The first optical connector assembly 67a includes a first ferrule 11a which extends in the axial direction, a first plug frame 12a which is configured to accommodate the first ferrule 11a, a first stop ring 13a to be engaged in the first plug frame 12a, and a first spring 14a (coil spring). The first ferrule 11a includes a first capillary 17a which extends in the axial direction, and a first sleeve 18a that is formed in a cylindrical shape extending in the axial direction. The first capillary 17a holds at least one first optical fiber 19a.

The first capillary 17a is in the substantially columnar shape that is elongated in the axial direction, and includes the distal end surface 20 and the chamfered portion 21. The distal end surface 20 has the axial distal end at which an end surface of the first optical fiber 19a is exposed. The chamfered portion 21 is in the end surface radially outer region of the distal end surface 20. In this regard, the shape of the chamfered portion 21 may have the shape of an angular surface or a round surface, any shape may be employed. The distal end surface 20 is a perpendicular surface that extends in a radial direction and is perpendicular to the axial direction. The chamfered portion 21 gradually inclines radially outward from the distal end surface 20 to the axial rear side.

The first capillary 17a includes a ceramics material such as zirconia, a plastic material, or a glass material such as crystalized glass, borosilicate glass, or quartz. In at least one embodiment, a zirconia capillary including zirconia is used for the illustrated first capillary 17a. The outer diameter of the first capillary 17a is from 1.2485 mm to 1.2495 mm. The first capillary 17a (first ferrule 11a) has, inside thereof, a first optical fiber insertion hole 22a extending in the axial direction. The first optical fiber 19a is inserted into the first optical fiber insertion hole 22a formed in the first capillary 17a.

The first sleeve 18a is coupled to the axial rear side of the first capillary 17a (first ferrule 11a). a first core cover 23a (PTFE tube) that covers an entire outer circumference region of the first optical fiber 19a and extends in the axial direction is coupled to the axial rear side of the first sleeve 18a, and a polygonal tubular first flange 24a having a diameter larger than those of the first capillary 17a and the first core cover 23a is formed integrally with a front end of the first sleeve 18a. The first sleeve 18a and the first flange 24a include a metal material such as stainless steel, brass, or steel, or a synthetic resin material. The first sleeve 18a has, inside thereof, the capillary insertion hole 25 and the core insertion hole 26. The capillary insertion hole 25 is configured to receive and hold the first capillary 17a inserted there into. The core insertion hole 26 is configured to receive and hold the first optical fiber core 111 including the built-in first optical fiber 19a inserted there into.

A rear end portion of the first capillary 17a is inserted into the capillary insertion hole 25 of the first sleeve 18a, and the rear end portion of the first capillary 17a is fixed and held in the capillary insertion hole 25 of the first sleeve 18a. One end portion of the first optical fiber core 111 is inserted into the core insertion hole 26 of the first sleeve 18a, and the one end portion of the first optical fiber core 111 is fixed and held in the core insertion hole 26 of the first sleeve 18a. In addition, a shape of the first sleeve 18a in the axial direction is not limited to a cylindrical shape, and may be a long square tubular shape that is elongated in the axial direction.

The second optical connect or assembly 67b is adjacent to the first optical connector assembly 67a, and extends in the axial direction in parallel to the first optical connector assembly 67a. The second optical connector assembly 67b includes a second ferrule 11b which extends in the axial direction, a second plug frame 12b which is configured to accommodate the second ferrule 11b, a second stop ring 13b to be engaged in the second plug frame 12b, and a second spring 14b (coil spring). The second ferrule 11b includes a second capillary 17b which extends in the axial direction, and a second sleeve 18b that is formed in a cylindrical shape extending in the axial direction. The second capillary 17b holds at least one second optical fiber 19b.

The second capillary 17b is adjacent in the horizontal direction of the first capillary 17a, and extends in the axial direction in parallel to the first capillary 17a. The second capillary 17b is in the substantially columnar shape that is elongated in the axial direction, and includes the distal end surface 20 and the chamfered portion 21. The distal end surface 20 has the axial distal end at which an end surface of the second optical fiber 19b is exposed. The chamfered portion 21 is in the end surface radially outer region of the distal end surface 20. The distal end surface 20 is a perpendicular surface that extends in a radial direction and is perpendicular to the axial direction, and is the same as that of the first capillary 17a. The second capillary 17b (second ferrule 11b) has, inside thereof, a second optical fiber insertion hole 22b extending in the axial direction. The second optical fiber 19b is inserted into the optical fiber insertion hole 22b in the second capillary 17b. A material and the outer diameter of the second capillary 17b are similar to those of the first capillary 17a.

The second sleeve 18b is coupled to the axial rear side of the second capillary 17b (second ferrule 11b). A second core cover 23b (PTFE tube) that covers an entire outer circumference region of the second optical fiber 19b and extends in the axial direction is coupled to the axial rear side of the second sleeve 18b. The second core cover 23b is adjacent in the horizontal direction of the first core cover 23a, and extends in the axial direction in parallel to the first core cover 23a.

A polygonal tubular second flange 24b having a diameter larger than those of the second capillary 17b and the second core cover 23b is formed integrally with a front end of the second sleeve 18b. The second flange 24b is adjacent in the horizontal direction of the first flange 24a. The second sleeve 18b and the second flange 24b include a metal material such as stainless steel, brass, or steel, or a synthetic resin material similar to the first sleeve 18a and the first flange 24a. The second sleeve 18b has, inside thereof, the capillary insertion hole 25 and the core insertion hole 26. The capillary insertion hole 25 is configured to receive and hold the second capillary 17b inserted there into. The core insertion hole 26 is configured to receive and hold the second optical fiber core 111 including the built-in second optical fiber 19b inserted there into.

A rear end portion of the second capillary 17b is inserted into the capillary insertion hole 25 of the second sleeve 18b, and the rear end portion of the second capillary 17b is fixed and held in the capillary insertion hole 25 of the second sleeve 18b. One end portion of the second optical fiber core 111 is inserted into the core insertion hole 26 of the second sleeve 18b, and the one end portion of the second optical fiber core 111 is fixed and held in the core insertion hole 26 of the second sleeve 18b. In addition, a shape of the second sleeve 18b in the axial direction is not limited to a cylindrical shape, and may be a long square tubular shape that is elongated in the axial direction.

Figure 37:
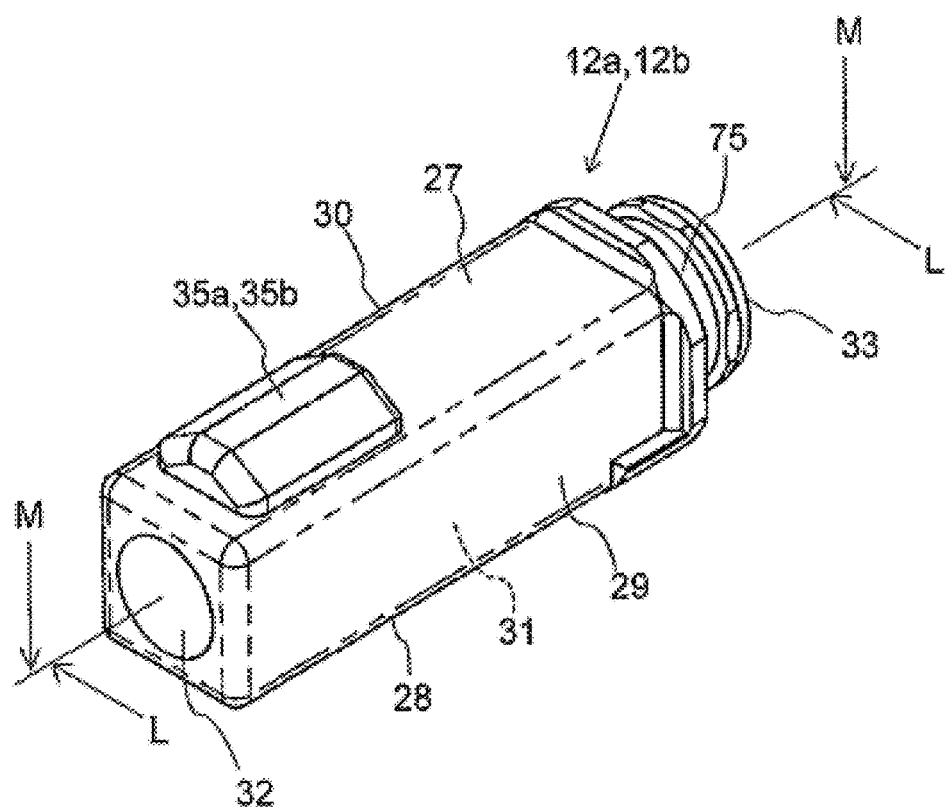
FIG. 37 is a perspective view of first and second plug frames according to at least one embodiment.
Figure 38:
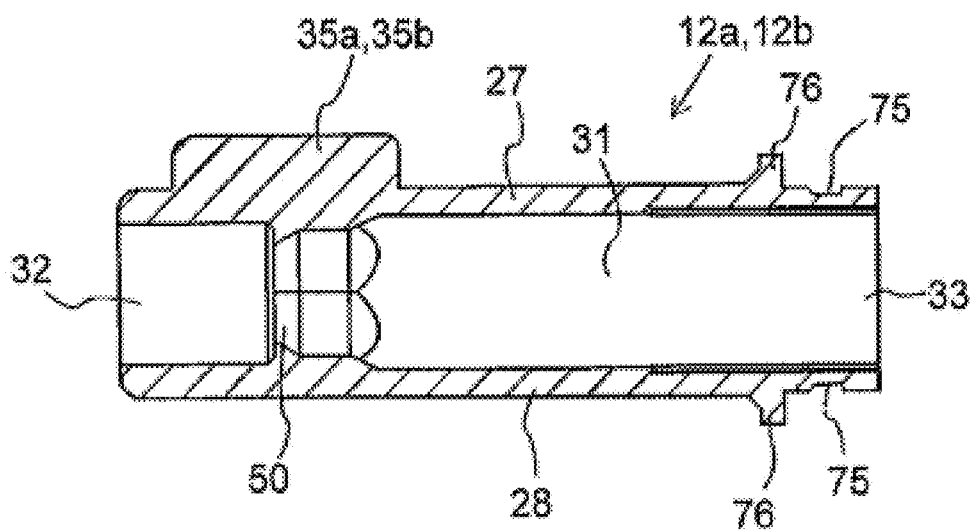
FIG. 38 is a sectional view as seen in a direction indicated by arrows of the line L-L in FIG. 37 according to at least one embodiment.
Figure 39:
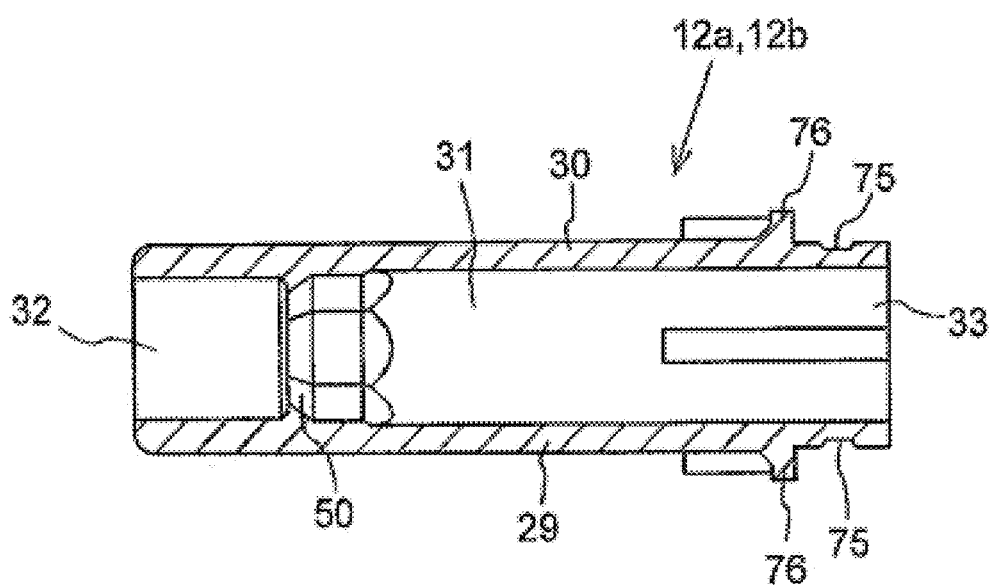
FIG. 39 is a sectional view as seen in a direction indicated by arrows of the line M-M in FIG. 37 according to at least one embodiment.

FIG. 37 is a perspective view of the first and second plug frames 12a and 12b according to at least one embodiment. FIG. 38 is a sectional view as seen in a direction indicated by arrows of the line L-L in FIG. 37. FIG. 39 is a sectional view as seen in a direction indicated by arrows of the line M-M in FIG. 37. The first plug frame 12a includes a synthetic resin material, and is formed in a hollow and substantially quadrangular prism shape. The first plug frame 12a includes the top wall 27 and the bottom wall 28 that are separated and face each other in the up-and-down directions and extend in the axial direction, and the both side walls 29 and 30 that are separated and face each other in the horizontal direction and extend in the axial direction.

A first guide protrusion portion 35a (first protrusion portion) which extends as a protrusion vertically upward from the top wall 27 in the axial direction is formed in the top wall 27 on the axial front side of the first plug frame 12a. In each of the walls 27 to 30 on the axial rear side of the first plug frame 12a, a fitting recess portion 75 to which an opening protrusion portion 88 formed in a first opening 86a of the first casing 71 described below fits is formed.

In the first plug frame 12a, the ferrule accommodation space 31 surrounded by those walls 27 to 30 and extending in the axial direction is defined. Moreover, the front end exposure opening 32 from which a distal end portion of the first capillary 17a is exposed is opened, and the rear end insertion opening 33 in which the first ferrule 11a is inserted is opened. The contact portion 50 extends on the axial rear side of the front end exposure opening 32 of the first plug frame 12a, and extends radially inward from the inner circumferential surface of the ferrule accommodation space 31.

The first flange 24a of the first sleeve 18a comes into contact with the contact portion 50. Contact of the first flange 24a of the first sleeve 18a with the contact portion 50 prevents the first sleeve 18a from further moving axially forward with respect to the first plug frame 12a. On those walls 27 to 30 near the rear end insertion opening 33 of the first plug frame 12a, contact flanges 76 that protrude radially outward from those walls 27 to 30 are formed. The contact flanges 76 come into slidable contact with a front end rim of the first opening 86a of the first casing 71.

The second plug frame 12b is adjacent in the horizontal direction of the first plug frame 12a, and extends in the axial direction in parallel to the first plug frame 12a. The second plug frame 12b includes a synthetic resin material, and is in a hollow and substantially quadrangular prism shape similar to the first plug frame 12a. The second plug frame 12b includes the top wall 27 and the bottom wall 28 that are separated and face each other in the up-and-down directions and extend in the axial direction, and the both side walls 29 and 30 that are separated and face each other in the horizontal direction and extend in the axial direction. A second guide protrusion portion 35b (second protrusion portion) which extends as a protrusion vertically upward from the top wall 27 in the axial direction is formed in the top wall 27 on the axial front side of the second plug frame 12b. In each of the walls 27 to 30 on the axial rear side of the second plug frame 12b, the fitting recess portion 75 to which the opening protrusion portion 88 formed in a second opening 86b of the first casing 71b described below fits is formed.

In the second plug frame 12b, the ferrule accommodation space 31 surrounded by those walls 27 to 30 and extending in the axial direction is defined. Moreover, the front end exposure opening 32 from which a distal end portion of the second capillary 17b is exposed is opened, and the rear end insertion opening 33 in which the first ferrule 11a is inserted is opened. The contact portion 50 extends on the axial rear side of the front end exposure opening 32 of the second plug frame 12b, and extends radially inward from the inner circumferential surface of the ferrule accommodation space 31.

The second flange 24b of the second sleeve 18b comes into contact with the contact portion 50. Contact of the second flange 24b of the second sleeve 18b with the contact portion 50 prevents the second sleeve 18b from further moving axially forward with respect to the second plug frame 12b. On those walls 27 to 30 near the rear end insertion opening 33 of the second plug frame 12b, contact flanges 76 that protrude radially outward from those walls 27 to 30 are formed. The contact flanges 76 come into slidable contact with a front end rim of the second opening 86b of the first casing 71.

Figure 40:
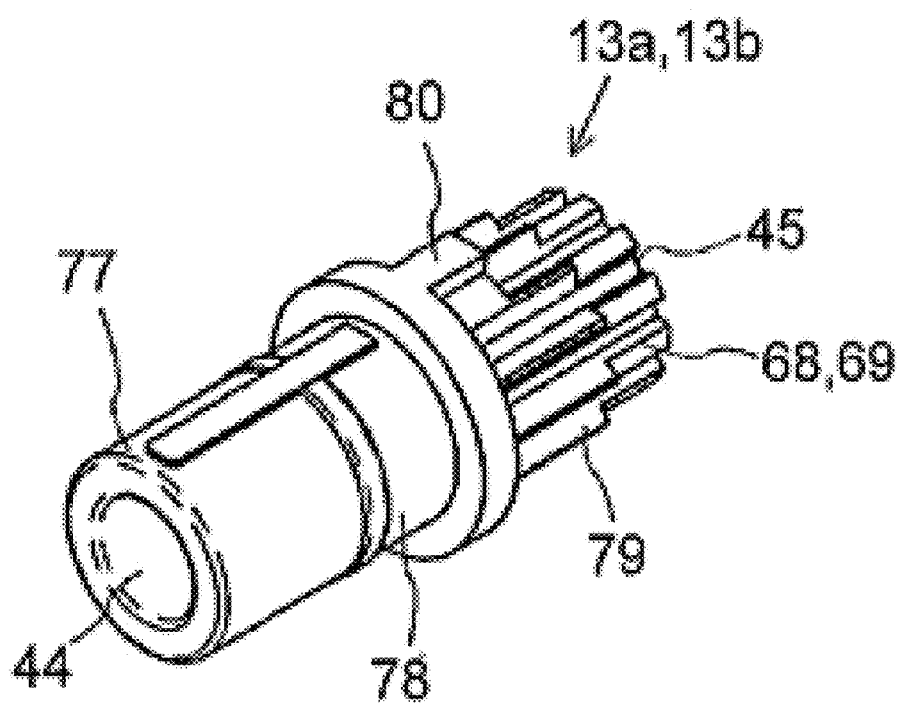
FIG. 40 is a perspective view of first and second stop rings according to at least one embodiment.
Figure 41:
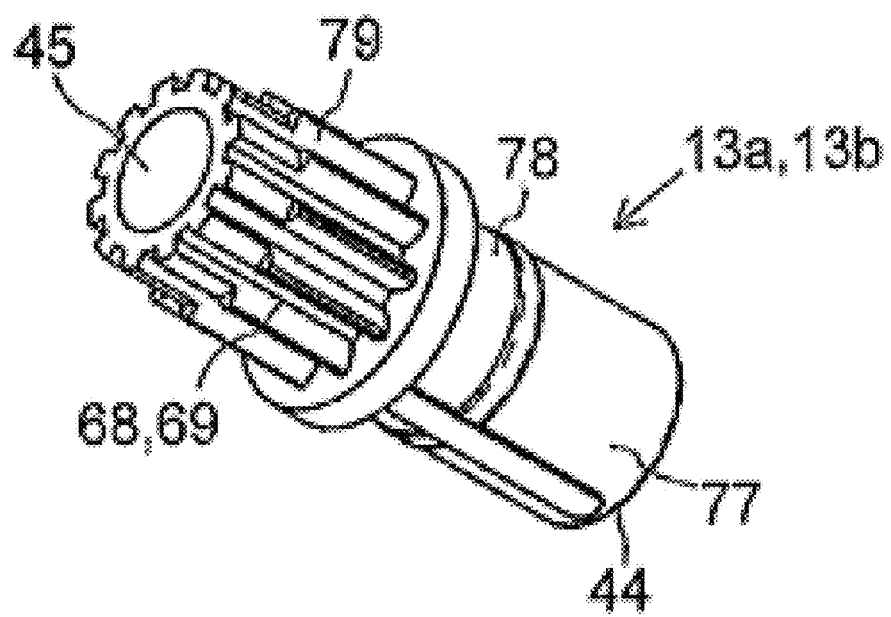
FIG. 41 is a perspective view of the first and second stop rings as seen in another direction according to at least one embodiment.

FIG. 40 is a perspective view of the first and second stop rings 13a and 13b according to at least one embodiment. FIG. 41 is a perspective view of the first and second stop rings 13a and 13b as seen in another direction with respect to FIG. 40. The first stop ring 13a includes a metal material or a synthetic resin material, is in a substantially cylindrical shape, and extends in the axial direction. The first stop ring 13a includes a front end portion 77 (front end cylindrical portion) that is located on the axial front side, a rear end portion 79 (rear end cylindrical portion) that is located on the axial rear side, and an intermediate portion 78 (intermediate cylindrical portion) which extends between the front end portion 77 and the rear end portion 79. The core exposure opening 44 from which the first optical fiber core 111 is exposed is opened at the front end portion 77 of the first stop ring 13a. The core insertion opening 45 in which the first optical fiber core 111 is inserted is opened at the rear end portion 79 of the first stop ring 13a.

The front end portion 77 and the intermediate portion 78 of the first stop ring 13a are press-fitted inside the first plug frame 12a through the rear end insertion opening 33 of the first plug frame 12, and outer circumferential surfaces of the front end portion 77 and the intermediate portion 78 closely adhere to an inner circumferential surface of the first plug frame 12a. The first stop ring 13a is unremovably (securely) connected to the first plug frame 12a, and rotates together with rotation of the first plug frame 12a.

The first spring 14a is installed between the first ferrule 11a and the first stop ring 13a, is inserted into the first core cover 23a, and extends in the axial direction. The first spring 14a has a front end that is in contact with the first flange 24a of the first sleeve 18a, and a rear end that is in contact with the front end portion 77 of the first stop ring 13a. The first spring 14a urges the first ferrule 11a axially forward. The first gear 68 is at the rear end portion 79 of the first stop ring 13a, and extends in the axial direction. A contact protrusion portion 80 (rotation regulating means) that protrudes radially outward is formed on the first gear 68. The contact protrusion portion 80 protrudes radially outward compared to teeth of the first gear 68.

The second stop ring 13b is adjacent in the horizontal direction of the first stop ring 13a, and extends in the axial direction in parallel to the first stop ring 13a. The second stop ring 13b includes a metal material or a synthetic resin material, is in a substantially cylindrical shape, and extends in the axial direction similar to the first stop ring 13a. The second stop ring 13b includes the front end portion 77 (front end cylindrical portion) that is located on the axial front side, the rear end 79 (rear end cylindrical portion) that is located on the axial rear side, and the intermediate portion 78 (intermediate cylindrical portion) which extends between the front end portion 77 and the rear end portion 79. The core exposure opening 44 from which the second optical fiber core 111 is exposed is opened at the front end portion 77 of the second stop ring 13b. The core insertion opening 45 in which the second optical fiber core 111 is inserted is opened at the rear end portion 79 of the second stop ring 13b.

The front end portion 77 and the intermediate portion 78 of the second stop ring 13b are press-fitted inside the second plug frame 12b through the rear end insertion opening 33 of the second plug frame 12, and outer circumferential surfaces of the front end portion 77 and the intermediate portion 78 closely adhere to an inner circumferential surface of the second plug frame 12b. The second stop ring 13b is unremovably (securely) connected to the second plug frame 12b, and rotates together with rotation of the second plug frame 12b.

The second spring 14b is installed between the second ferrule 11b and the second stop ring 13b, is inserted into the second core cover 23b, and extends in the axial direction. The second spring 14b has a front end that is in contact with the second flange 24b of the second sleeve 18b, and a rear end that is in contact with the front end portion 77 of the second stop ring 13b. The second spring 14b urges the second ferrule 11b axially forward. The second gear 69 is formed at the rear end portion 79 of the second stop ring 13b, and extends in the axial direction. A contact protrusion portion 80 (rotation regulating means) that protrudes radially outward is formed on the second gear 69. The contact protrusion portion 80 protrudes radially outward compared to teeth of the second gear 69.

Figure 42:
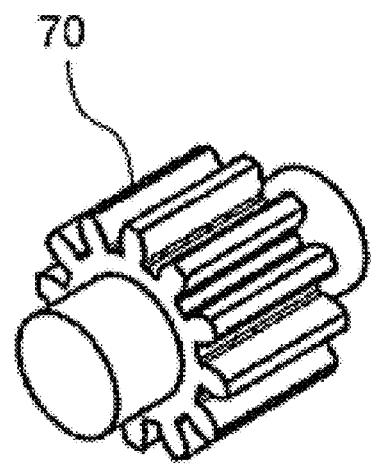
FIG. 42 is a perspective view of an intermediate gear according to at least one embodiment.

FIG. 42 is a perspective view of the intermediate gear 70 according to at least one embodiment. The intermediate gear 70 is interposed between the first gear 68 and the second gear 69, and extends in the axial direction. The intermediate gear 70 comes into external contact with the first and second gears 68 and 69, a rotation force of one gear among the first and second gears 68 and 69 is transmitted to another gear, and the another gear is rotated in the same direction as that of the one gear. In addition, a gear ratio of the first gear 68, the second gear 69, and the intermediate gear 70 is 1. Therefore, when the first gear 68 rotates once in a clockwise direction, the intermediate gear 70 rotates once in a counterclockwise direction, and the second gear 69 rotates once in the clockwise direction. Meanwhile, when the first gear 68 rotates once in the counterclockwise direction, the intermediate gear 70 rotates once in the clockwise direction, and the second gear 69 rotates once in the counterclockwise direction.

Figure 43:
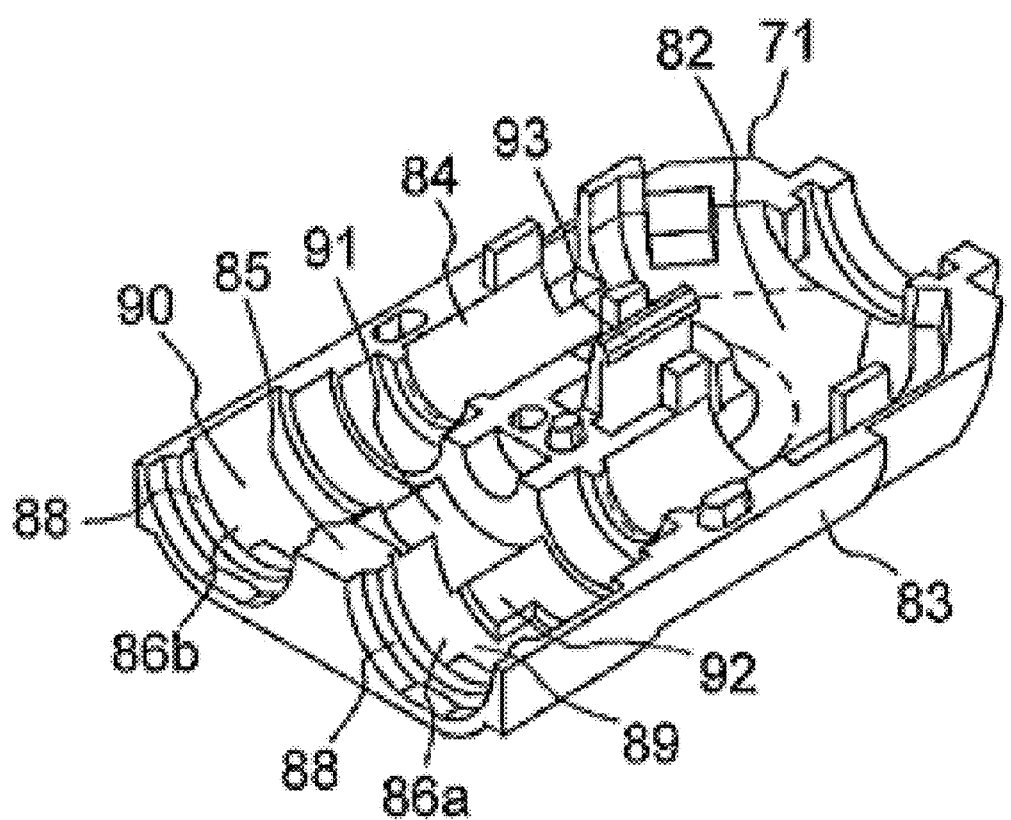
FIG. 43 is a perspective view of a first casing in a state in which the first casing is divided into two according to at least one embodiment.
Figure 44:
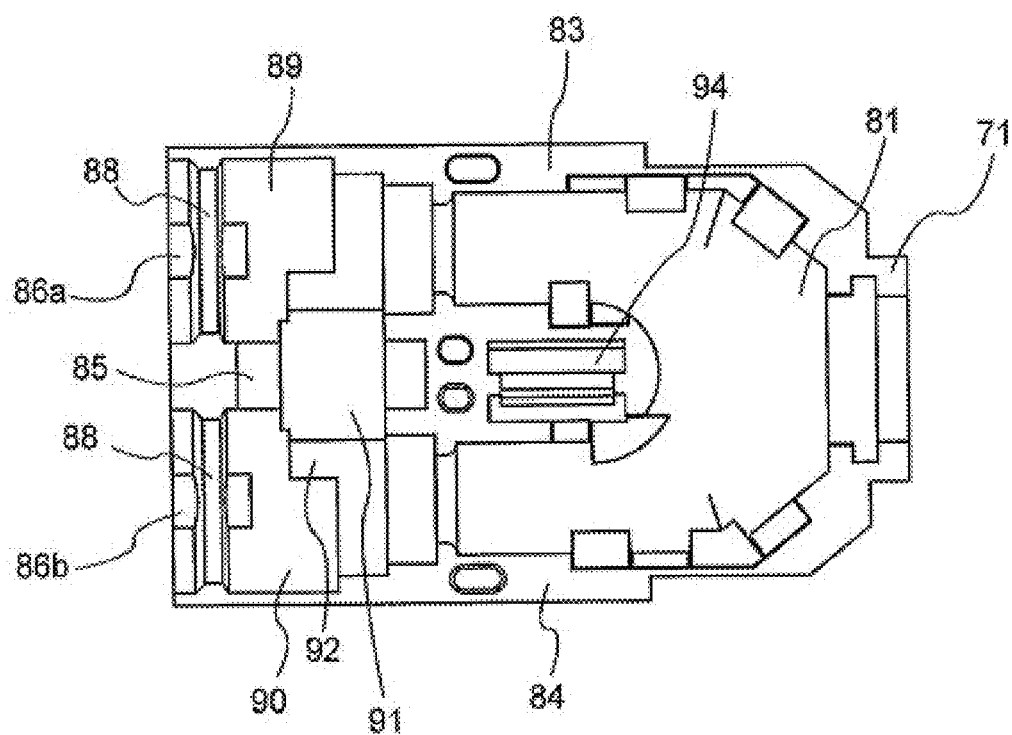
FIG. 44 is an inner surface view of the first casing in a state in which the first casing is divided into two according to at least one embodiment.
Figure 45:
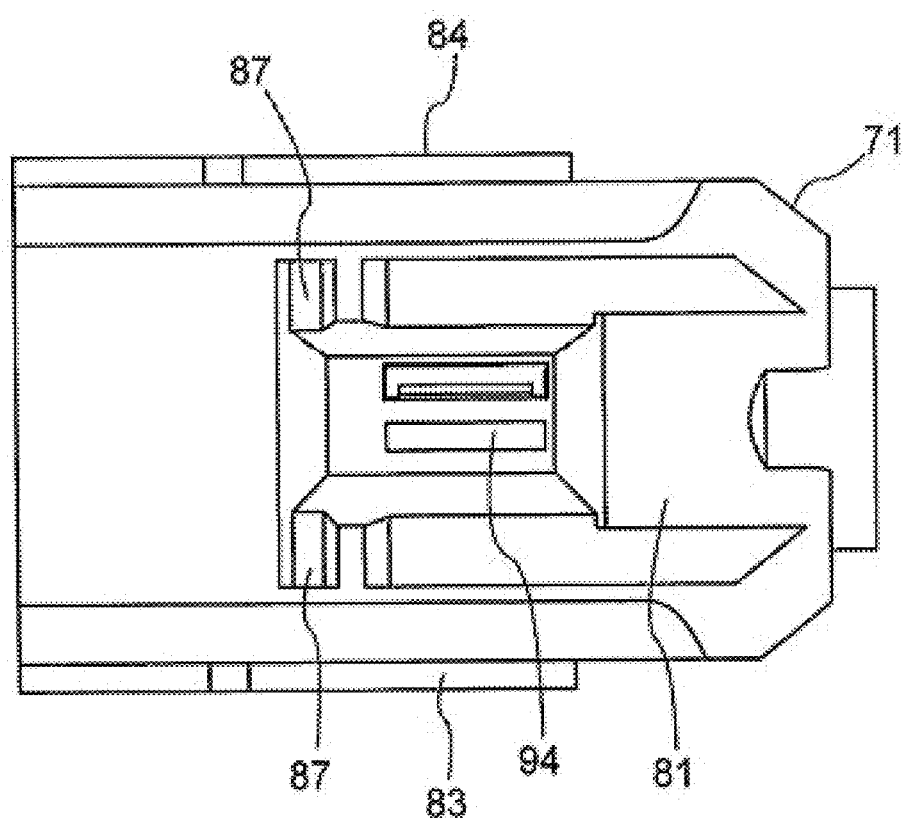
FIG. 45 is an outer surface view of a top wall 81 of the first casing 71 according to at least one embodiment.

FIG. 43 is a perspective view of the first casing 71 in a state in which the first casing 71 is divided into two. FIG. 44 is an inner surface view of the first casing 71 in a state in which the first casing 71 is divided into two. FIG. 45 is an outer surface view of a top wall 81 of the first casing 71. In addition, an outer surface view of a bottom wall 82 of the first casing 71 is similar to FIG. 45. The first casing 71 includes a synthetic resin material, and is formed in a hollow shape. The first casing 71 includes the top wall 81 and the bottom wall 82 that are separated and face each other in the up-and-down directions and extend in the axial direction, both side walls 83 and 84 that are separated and face each other in the horizontal direction and extend in the axial direction, and a partition wall 85, and includes the first opening 86*a* that is opened at a front end and in which the first stop ring 13*a* is inserted, and includes the second opening 86*b* that is opened at a front end and in which the second stop ring 13*b* is inserted.

At a substantially center of the top wall 81 of the first casing 71, engagement protrusion portions 102 formed at a substantially center of a top wall 95 of the second casing 72 described below, and engagement recess portions 87 in which the engagement protrusion portions 102 formed at the substantially center of a bottom wall 96 of the second casing 72 engage are formed. At a substantially center of the top wall 81 of the first casing 71, the engagement protrusion portions 102 formed at the substantially center of the top wall 95 of the second casing 72 described below, and the engagement recess portions 87 in which the engagement protrusion portions 102 formed at the substantially center of the bottom wall 96 of the second casing 72 engage are formed (see FIG. 48).

The opening protrusion portion 88 that protrudes to a radially inner side of the first opening 86*a* is formed in the first opening 86*a* of the first casing 71, and the opening protrusion portion 88 that protrudes to the radially inner side of the second opening 86*b* is formed in the second opening 86*b*. The first casing 71 has a first gear accommodation portion 89, a second gear accommodation portion 90, and an intermediate gear accommodation portion 91, which are defined inside. The first gear accommodation portion 89 is surrounded by those walls 81 to 84 and the partition wall 85. The second gear accommodation portion 90 is surrounded by those walls 81 to 84 and the partition wall 85. The intermediate gear accommodation portion 91 is surrounded by the partition wall 85, and is located between the first and second gear accommodation portions 89 and 90.

The first gear 68 at the rear end portion 79 of the first stop ring 13*a* is rotatably accommodated in the first gear accommodation portion 89. The second gear 69 at the rear end portion 79 of the second stop ring 13*b* is rotatably accommodated in the second gear accommodation portion 90. The intermediate gear 70 is rotatably accommodated in the intermediate gear accommodation portion 91. The first and second gears 68 and 69 and the intermediate gear 70 are accommodated in the first and second gear accommodation portions 89 and 90 and the intermediate gear accommodation portion 91 in the first casing 71, so that these gears 68 to 70 are arrayed in the horizontal direction, the first gear 68 and the intermediate gear 70 come into external contact and the second gear 69 and the intermediate gear 70 come into external contact.

In the first gear accommodation portion 89 (an inner circumferential surface of the first casing 71), a rotation regulation protrusion portion 92 (rotation angle regulation means) that protrudes to the radially inner side of the first gear accommodation portion 89 is formed. Contact of the contact protrusion portion 80 formed on the first gear 68 with the rotation regulation protrusion portion 92 of the first gear accommodation portion 89 prevents rotation of the first stop ring 13*a* (first plug frame 12*a*). In the second gear accommodation portion 90 (the inner circumferential surface of the first casing 71), the rotation regulation protrusion portion 92 (rotation angle regulation means) that protrudes to the radially inner side of the second gear accommodation portion 90 is formed. Contact of the contact protrusion portion 80 formed on the second gear 69 with the rotation regulation protrusion portion 92 of the second gear accommodation portion 90 helps to prevent rotation of the second stop ring 13*b* (second plug frame 12*b*).

Rotation angles of the first and second optical connector assemblies 67*a* and 67*b* (first and second stop rings 13*a* and 13*b*) are determined according to positions of the rotation regulation protrusion portions 92 in the first gear accommodation portion 89 and the second gear accommodation portion 90. In the optical connector plug 10C, rotation ranges from rotation start points to rotation end points of the first and second optical connector assemblies 67*a* and 67*b* are regulated to half rotation (the rotation angle is 180 degrees).

The first casing 71 is made by being coupled with each casing 71 divided into two in the vertical direction. When each casing 71 is coupled, a fitting claw 93 formed on the lower casing 71 fits to a fitting hole 94 formed in the upper casing 71 to integrally form the casing 71. The pipe 74 has a front end portion fitted to a rear end portion of the first casing 71.

Figure 46:
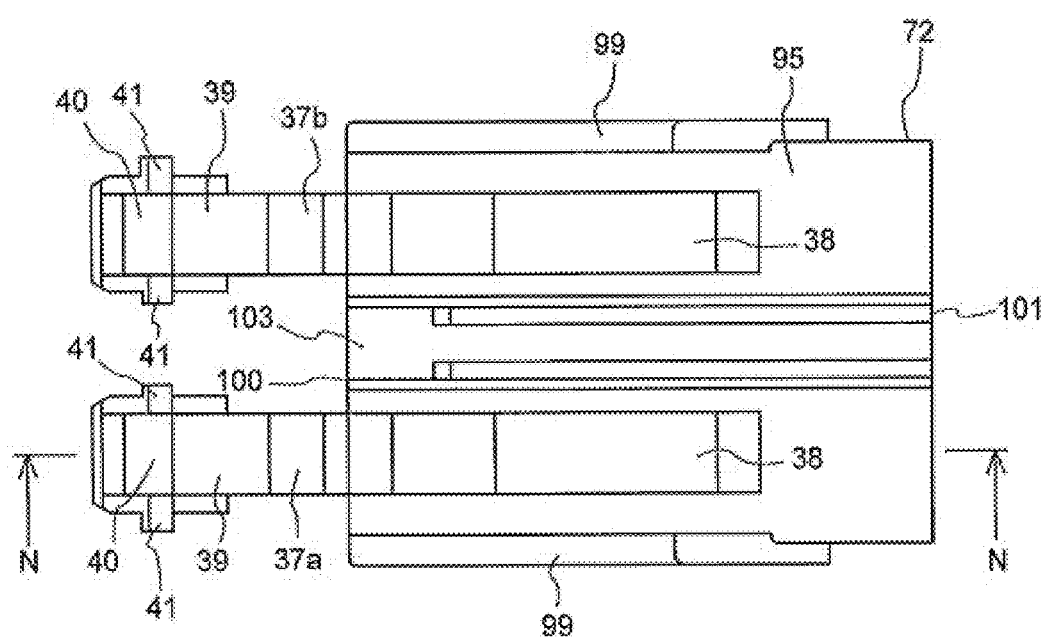
FIG. 46 is a top view of a second casing according to at least one embodiment.
Figure 47:
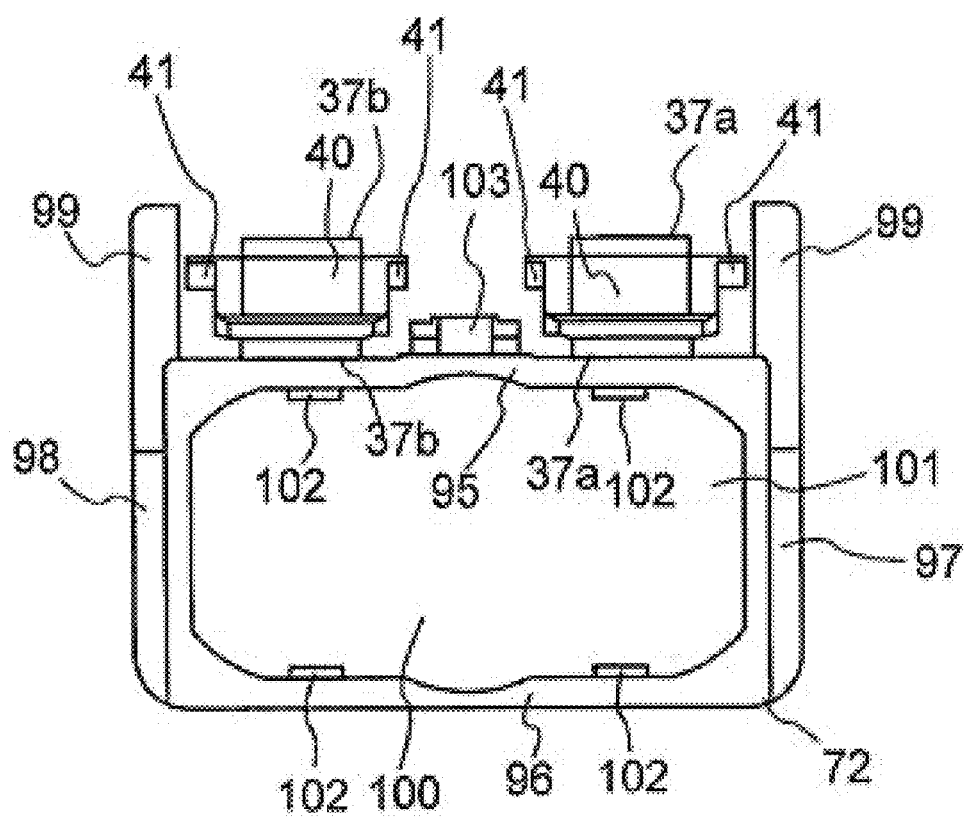
FIG. 47 is a front view of the second casing according to at least one embodiment.
Figure 48:
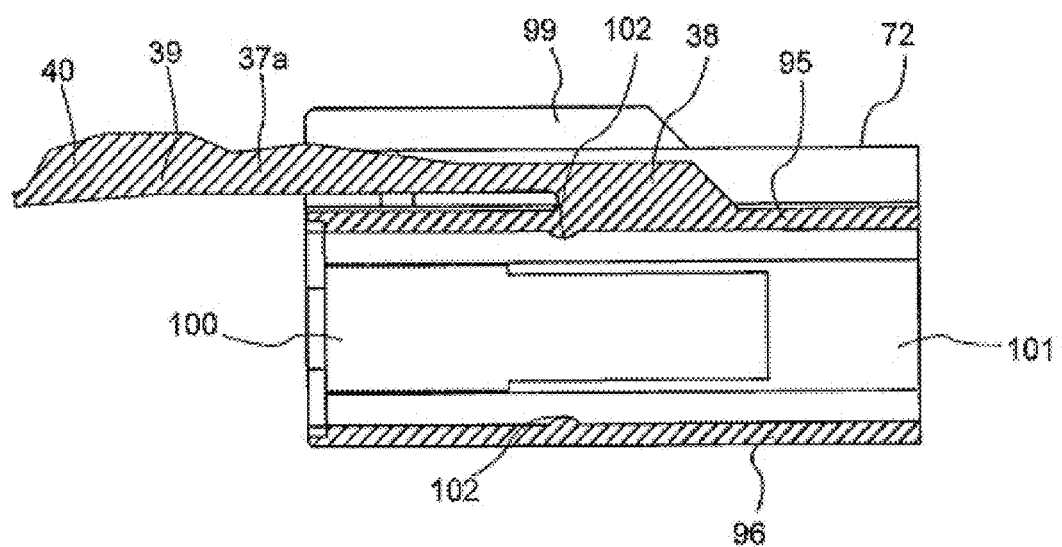
FIG. 48 is a sectional view as seen in a direction indicated by arrows of the line N-N in FIG. 46 according to at least one embodiment.

FIG. 46 is a top view of the second casing 72 according to at least one embodiment. FIG. 47 is a front view of the second casing 72 according to at least one embodiment. FIG. 48 is a sectional view as seen in a direction indicated by arrows of the line N-N in FIG. 46. The second casing 72 includes a synthetic resin material, and includes the top wall 95 and the bottom wall 96 that are separated and face each other in the up-and-down directions and extend in the axial direction, both side walls 97 and 98 that are separated and face each other in the horizontal direction and extend in the axial direction, and guide walls 99 which extend upward from the both side walls 97 and 98 in the axial direction.

The second casing 72 includes a front end opening 100 that is opened at a front end, a rear end opening 101 that is opened at a rear end, and a pair of first and second engagement latches 37*a* and 37*b* that are located on the top wall 95. The engagement protrusion portions 102 that protrude radially inward from the inner circumferential surface are formed at a substantially center of the top wall 95 of the second casing 72, and the engagement protrusion portions 102 that protrude radially inward from the inner circumferential surface are formed at a substantially center of the bottom wall 96 of the second casing 72. An engagement key 103 which extends in the axial direction is formed at a center distal end of the top wall 95 of the second casing 72.

The first and second engagement latches 37*a* and 37*b* are integral with the second casing 72, are separated by a predetermined dimension in the horizontal direction, and linearly extend in the axial direction in parallel to each other. These engagement latches 37*a* and 37*b* include the bases 38 that are located at an axial center of the top wall 95 of the second casing 72 and connect to the top wall 95, the arms 39 that connect to the bases 38, and the engagement heads 40 that are located on the axial front side of the arms 39. The arms 39 are separated vertically upward from the top wall 95 of the second casing 72, and extends axially forward from the bases 38 (the axial rear sides of the first and second plug frames 12*a* and 12*b*) mounted to the axial center of the top wall 95 to the first and second guide protrusion portions 35*a* and 35*b*. The arms 39 have flexibility, and are elastically deformable (swingable) in the vertical direction.

These engagement head 40 includes pairs of engagement protrusion portions 41 that project horizontally outward. The engagement protrusion portions 41 disengageably engage with the locking portions 52 of the optical connector adaptor 51 when the plug frames 12*a* and 12*b* are inserted into the optical connector adaptor 51. The engagement heads 40 have a larger horizontal dimension, except the engagement protrusion portions 41, than the arms 39, and are substantially the same as the horizontal dimension of the top surfaces 36 of the first and second guide protrusion portions 35a and 35b. The engagement heads 40 is configured to swing in the vertical direction as the arms 39 elastically deform in the vertical direction.

In FIG. 30, the axial front end 42 of the engagement head 40 of the first engagement latch 37a is slightly separated axially rearward from the axial rear end 43 of the first guide protrusion portion 35a, is slightly separated to the vertical upper side of the axial rear end 43 of the first guide protrusion portion 35a, is located near the axial rear end 43 of the first guide protrusion portion 35a, and is close to the axial rear end 43 of the first guide protrusion portion 35a. The axial front end 42 of the engagement head 40 of the second engagement latch 37b is slightly separated axially rearward from the axial rear end 43 of the second guide protrusion portion 35b, is slightly separated to the vertical upper side of the axial rear end 43 of the second guide protrusion portion 35b, is located near the axial rear end 43 of the second guide protrusion portion 35b, and is close to the axial rear end 43 of the second guide protrusion portion 35b.

An axially rearward separation dimension of the axial front end 42 of the engagement head 40 of the first engagement latch 37a from the axial rear end 43 of the first guide protrusion portion 35a is in a range of from 0.01 mm to 0.2 mm. A vertically upward separation dimension of the axial front end 42 of the engagement head 40 of the first engagement latch 37a from the axial rear end 43 of the first guide protrusion portion 35a is in a range of from 0.01 mm to 0.2 mm. An axially rearward separation dimension of the axial front end 42 of the engagement head 40 of the second engagement latch 37b from the axial rear end 43 of the second guide protrusion portion 35b is in a range of from 0.01 mm to 0.2 mm. A vertically upward separation dimension of the axial front end 42 of the engagement head 40 of the second engagement latch 37b from the axial rear end 43 of the second guide protrusion portion 35b is in a range of from 0.01 mm to 0.2 mm.

In addition, in the optical connector plug 10C, the axial front end 42 of the engagement head 40 of the first engagement latch 37a may not be separated to the vertical upper side of the axial rear end 43 of the first guide protrusion portion 35a, the axial front end 42 of the engagement head 40 of the first engagement latch 37a may be slightly separated axially rearward from the axial rear end 43 of the first guide protrusion portion 35a, and the axial front end 42 may be located near the axial rear end 43 of the first guide protrusion portion 35a and be close to the axial rear end 43 of the first guide protrusion portion 35a. In at least one embodiment, an axially rearward separation dimension of the axial front end 42 of the engagement head 40 of the first engagement latch 37a from the axial rear end 43 of the first guide protrusion portion 35a is in a range of from 0.01 mm to 0.2 mm.

Further, in the optical connector plug 10C, the axial front end 42 of the engagement head 40 of the second engagement latch 37b may not be separated to the vertical upper side of the axial rear end 43 of the second guide protrusion portion 35b, the axial front end 42 of the engagement head 40 of the second engagement latch 37b may be slightly separated axially rearward from the axial rear end 43 of the second guide protrusion portion 35b, and the axial front end 42 may be located near the axial rear end 43 of the second guide protrusion portion 35b and be close to the axial rear end 43 of the second guide protrusion portion 35b. In at least one embodiment, an axially rearward separation dimension of the axial front end 42 of the engagement head 40 of the second engagement latch 37b from the axial rear end 43 of the second guide protrusion portion 35b is in a range of from 0.01 mm to 0.2 mm.

The second casing 72 can accommodate the first casing 71 under a state in which the top wall 81 of the first casing 71 faces the top wall 95 and the bottom wall 82 of the first casing 71 faces the bottom wall 96. By contrast with this, the second casing 72 can accommodate the first casing 71 under a state in which the bottom wall 82 of the first casing 71 faces the top wall 95 and the top wall 81 of the first casing 71 faces the bottom wall 96. The second casing 72 can accommodate the first casing 71 under a state where the first casing 71 is turned upside down.

Figure 49:
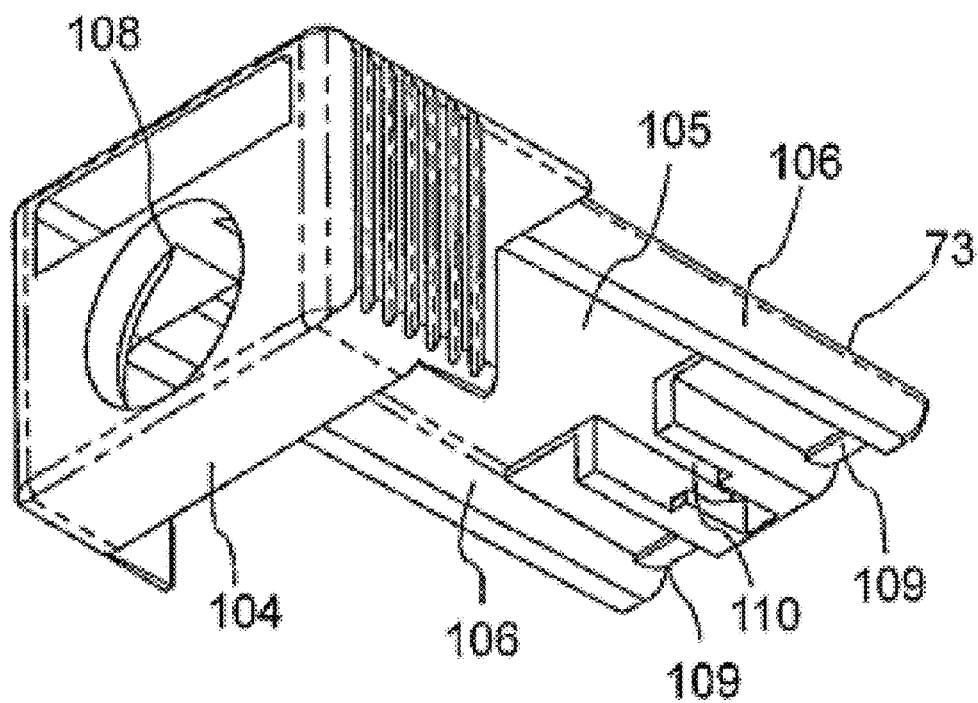
FIG. 49 is a perspective view of a slider according to at least one embodiment.
Figure 50:
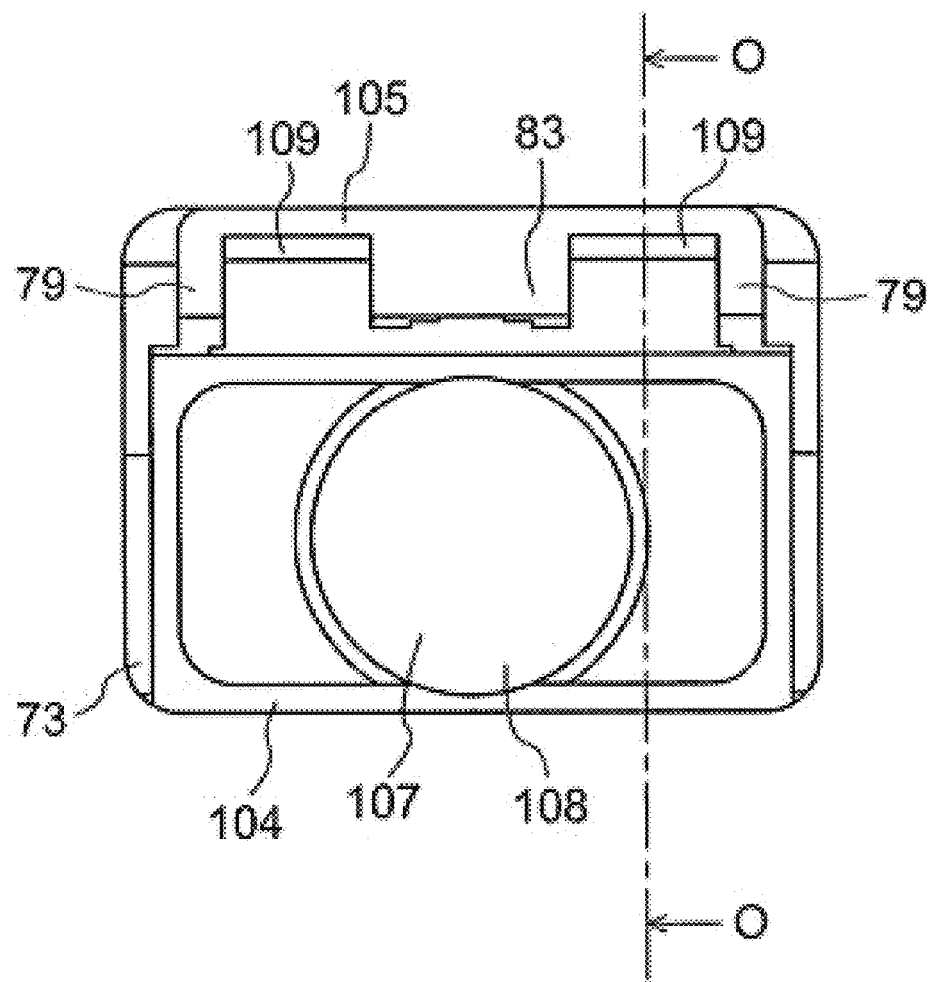
FIG. 50 is a front view of the slider according to at least one embodiment.
Figure 51:
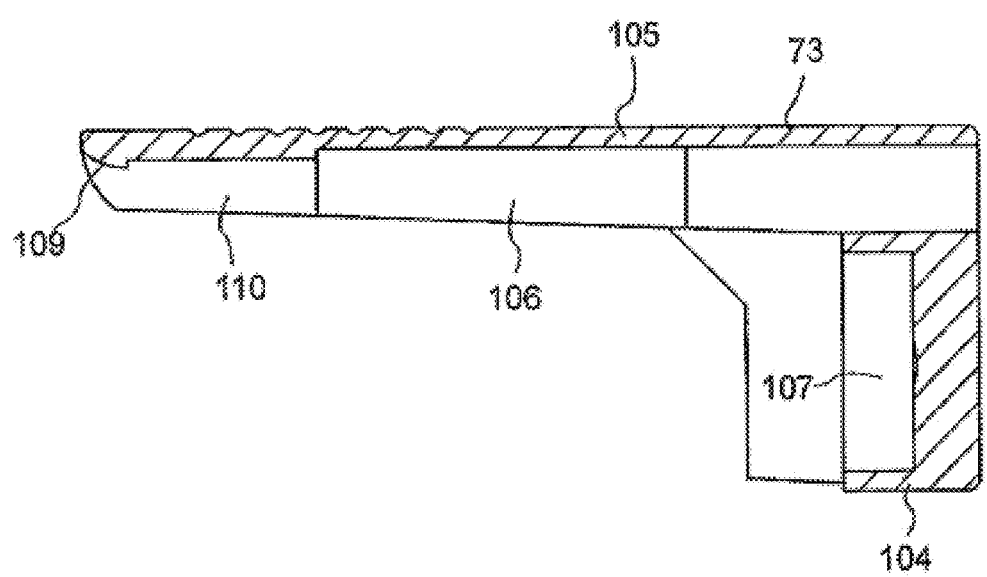
FIG. 51 is a sectional view as seen in a direction indicated by arrows of the line O-O in FIG. 50 according to at least one embodiment.

FIG. 49 is a perspective view of the slider 73 according to at least one embodiment. FIG. 50 is a front view of the slider 73 according to at least one embodiment. FIG. 51 is a sectional view as seen in a direction indicated by arrows of the line O-O in FIG. 49. The slider 73 includes a synthetic resin material, and includes a box 104 that is coupled to a rear end portion of the second casing 72, a sliding plate 105 (sliding top wall) which extends axially forward from a top portion of the box 104, and guide plates 106 (guide walls) which extend downward from both sides of the sliding plate 105 and extend in the axial direction. The slider 73 includes a front end opening 107 that is opened at a front end of the box 104, and a rear end opening 108 that is opened at a rear end of the box 104. Inclined surfaces 109 are on both sides of a lower surface of a distal end portion of the sliding plate 105. At a lower surface center of a distal end portion of the sliding plate 105, a key engagement portion 110 in which the engagement key 103 of the top wall 95 of the second casing 72 engages is formed.

The slider 73 is located on the axial rear side of the second casing 72, and the box 104 is located on the axial rear side of a rear end portion of the second casing 72, and is coupled to the second casing 72 slidably in the axial direction. In a state in which the slider 73 is coupled to the second casing 72, the guide plates 106 of the slider 73 are located on inner sides of the guide walls 99 of the second casing 72, the engagement key 103 of the second casing 72 is engaged in the key engagement portion 110 of the sliding plate 105 of the slider 73, and the inclined surfaces 109 of the guide plates 106 of the slider 73 come into contact with the upper surfaces of the arms 39 of the engagement latches 37a and 37b.

The slider 73 slides axially forward and axially rearward on the upper surfaces of the arms 39 of the engagement latches 37a and 37b. When the slider 73 is slid axially rearward from the second casing 72, the inclined surfaces 109 of the sliding plate 105 of the slider 73 press the arms 39 of the engagement latches 37a and 37b vertically downward, and the inclined surfaces 109 press the engagement heads 40 of the engagement latches 37a and 37b vertically downward.

The caulking ring 15 is located on the axial rear side of the pipe 74 fitted to a rear end portion of the first casing 71, and a front end portion of the caulking ring 15 is fixed to the rear end portion of the pipe 74 and is inserted into the boot 16 such that an inner circumferential surface of the caulking ring 15 closely adheres to an outer circumferential surface of the pipe 74. An inner circumferential surface of the front end portion of the boot 16 closely adheres to the outer circumferential surface of the front end portion of the caulking ring 15, and is coupled to the first casing 71 via the pipe 74 and the caulking ring 15. In addition, the first optical fiber core 111 including the built-in first optical fiber 19a and the second optical fiber core 111 including the built-in second optical fiber 19b are bundled as one in the first casing 71 to form the optical fiber cord 49, and this optical fiber cord 49 is inserted into the caulking ring 15 and extends axially rearward from the rear end of the caulking ring 15.

A process of rotating the first and second optical connector assemblies 67a and 67b of the optical connector plug 10C, according to at least one embodiment, is as follows. While the second casing 72 is supported, the first casing 71 is pressed axially forward, the engagement recess portions 87 formed in the top wall 81 and the bottom wall 82 of the first casing 71, and the engagement protrusion portions 102 formed in the top wall 95 and the bottom wall 96 of the second casing 72 are disengaged, and the first casing 71 is drawn axially forward from the second casing 72. After the first casing 71 is drawn from the second casing 72, for example, the first optical connector assembly 67a (one optical connector assembly) is rotated in the clockwise direction.

According to the optical connector plug 10C, when the first optical connector assembly 67a (one optical connector assembly) is rotated about an axis of the first optical connector assembly 67a in the clockwise direction, the first gear 68 (one gear) rotates in the clockwise direction, and the rotation of the first gear 68 rotates the intermediate gear 70 in the counterclockwise direction. The intermediate gear 70 transmits a rotation force (rotation) of the first gear 68 to the second gear 69 (another gear), the second gear 69 interlocks with the first gear 68 and rotates about the axis of the second gear 69 in the same clockwise direction (same direction) as the first gear 68, and thereby the second optical connector assembly 67b rotates in the clockwise direction.

In at least one embodiment, the gear ratio of these gears 68 to 70 is 1. Therefore, when the first optical connector assembly 67a is rotated in the clockwise direction, the second optical connector assembly 67b (another optical connector assembly) is rotated in the clockwise direction at the same rotation angle as that of the first optical connector assembly 67a. The optical connector plug 10C can simultaneously rotate another optical connector assembly 67a or 67b in the same direction as that of the one optical connector assembly 67a or 67b by using these gears 68 to 70. Furthermore, in at least one embodiment, the gear ratio of these gears 68 to 70 is 1. Consequently, the rotation ranges from rotation start points to rotation end points of the first and second optical connector assemblies 67a and 67b are the same, and rotation of another optical connector assembly 67a or 67b to the same position as that of the one optical connector assembly 67a or 67b by rotating the one optical connector assembly 67a or 67b is possible.

When the first and second optical connector assemblies 67a and 67b are rotated half (180 degrees) in the clockwise direction (half rotation from the rotation start point to the rotation end point), the contact protrusion portions 80 (rotation angle regulation means) formed on the first and second gears 68 and 69 come into contact with the rotation regulation protrusion portions 92 (rotation angle regulation means) formed on the first and second gear accommodation portions 89 and 90 of the first casing 71, and the first and second optical connector assemblies 67a and 67b stop rotating in the clockwise direction.

After the first and second optical connector assemblies 67a and 67b are rotated half (180 degrees) in the clockwise direction, the second casing 72 (including the slider 73) is rotated half (180 degrees) in the clockwise direction (or the counterclockwise direction). When the second casing 72 is rotated half (180 degrees), the top wall 95 of the second casing 72 is located on a side of the bottom wall 82 of the first casing 71, and the bottom wall 96 of the second casing 72 is located on a side of the top wall 81 of the first casing 71.

Next, the second casing 72 is moved longitudinally forward toward the first casing 71, the first casing 71 is accommodated (press-fitted) inside the casing 72 such that the bottom wall 82 of the first casing 71b faces the top wall 95 of the second casing 72 and the top wall 81 of the first casing 71 faces the bottom wall 96 of the second casing 72, and the engagement protrusion portions 102 of the top wall 95 and the bottom wall 96 of the second casing 72 are engaged in the engagement recess portions 87 of the top wall 81 and the bottom wall 82 of the first casing 71. Through simultaneous rotation of the first and second optical connector assemblies 67a and 67b half (180 degrees) in the clockwise direction, the polarity of the duplex optical connector plug 10C is invertable.

After the polarity of the duplex optical connector plug 10C is inverted, the engagement recess portions 87 and the engagement protrusion portions 102 are disengaged, the first casing 71 is drawn axially forward from the second casing 72, and the second optical connector assembly 67b (one optical connector assembly) is rotated in the counterclockwise direction. When the second optical connector assembly 67b (one optical connector assembly) rotates about the axis of the second optical connector assembly 67b in the counterclockwise direction, the second gear 69 (one gear) rotates in the counterclockwise direction, and the rotation of the second gear 69 rotates the intermediate gear 70 in the clockwise direction. The intermediate gear 70 transmits the rotation force (rotation) of the second gear 69 to the first gear 68 (another gear), the first gear 68 interlocks with the second gear 69 and rotates about the axis of the first gear 68 in the same counterclockwise direction as that of the second gear 69, and thereby the first optical connector assembly 67a rotates in the counterclockwise direction.

In at least one embodiment, the gear ratio of these gears 68 to 70 is 1. Therefore, when the second optical connector assembly 67b is rotated in the counterclockwise direction, the first optical connector assembly 67a rotates in the counterclockwise direction at the same rotation angle as that of the second optical connector assembly 67b. When the first and second optical connector assemblies 67a and 67b are rotated half (180 degrees) in the counterclockwise direction (half rotation from the rotation start point to the rotation end point), the contact protrusion portions 80 (rotation angle regulation means) come into contact with the rotation regulation protrusion portions 92 (rotation angle regulation means), and the first and second optical connector assemblies 67a and 67b stop rotating in the counterclockwise direction.

After the first and second optical connector assemblies 67a and 67b are rotated half (180 degrees) in the counterclockwise direction, the second casing 72 (including the slider 73) is rotated half (180 degrees) in the counterclockwise direction (or the clockwise direction). When the second casing 72 is rotated half, the top wall 95 of the second casing 72 is located on a side of the top wall 81 of the first casing 71, and the bottom wall 96 of the second casing 72 is located on a side of the bottom wall 82 of the first casing 71.

Next, the second casing 72 is moved longitudinally forward toward the first casing 71, the first casing 71 is accommodated (press-fitted) inside the casing 72 such that the top wall 81 of the first casing 71 faces the top wall 95 of the second casing 72 and the bottom wall 82 of the first casing 71 faces the bottom wall 96 of the second casing 72, and the engagement protrusion portions 102 is engaged in the engagement recess portions 87. Through simultaneous rotation of the first and second optical connector assemblies 67a and 67b half (180 degrees) in the counterclockwise direction, the polarity of the duplex optical connector plug 10C is invertable.

When the one optical connector assembly 67a or 67b among the first and second optical connector assemblies 67a and 67b is rotated half (180 degrees) about the axis of the one first or second optical connector assembly 67a or 67b from the rotation start point to the rotation end point, the polarity of the duplex optical connector plug 10C is inverted by rotating another optical connector assembly 67a or 67b half (180 degrees) about the axis of another optical connector assembly 67a or 67b in the same direction as that of the one optical connector assembly 67a or 67b from the rotation start point to the rotation end point in conjunction with the rotation.

Figure 52:
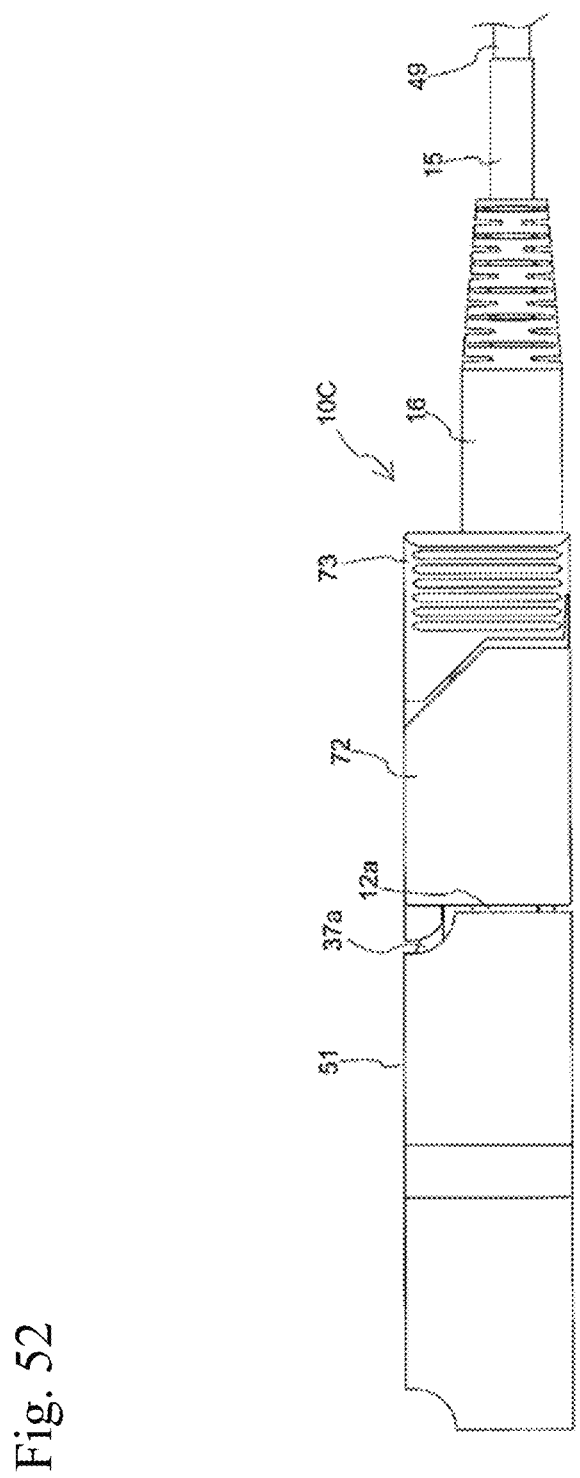
FIG. 52 is a side view of the optical connector plug in a state in which the optical connector plug is coupled to the optical connector adaptor according to at least one embodiment.
Figure 53:
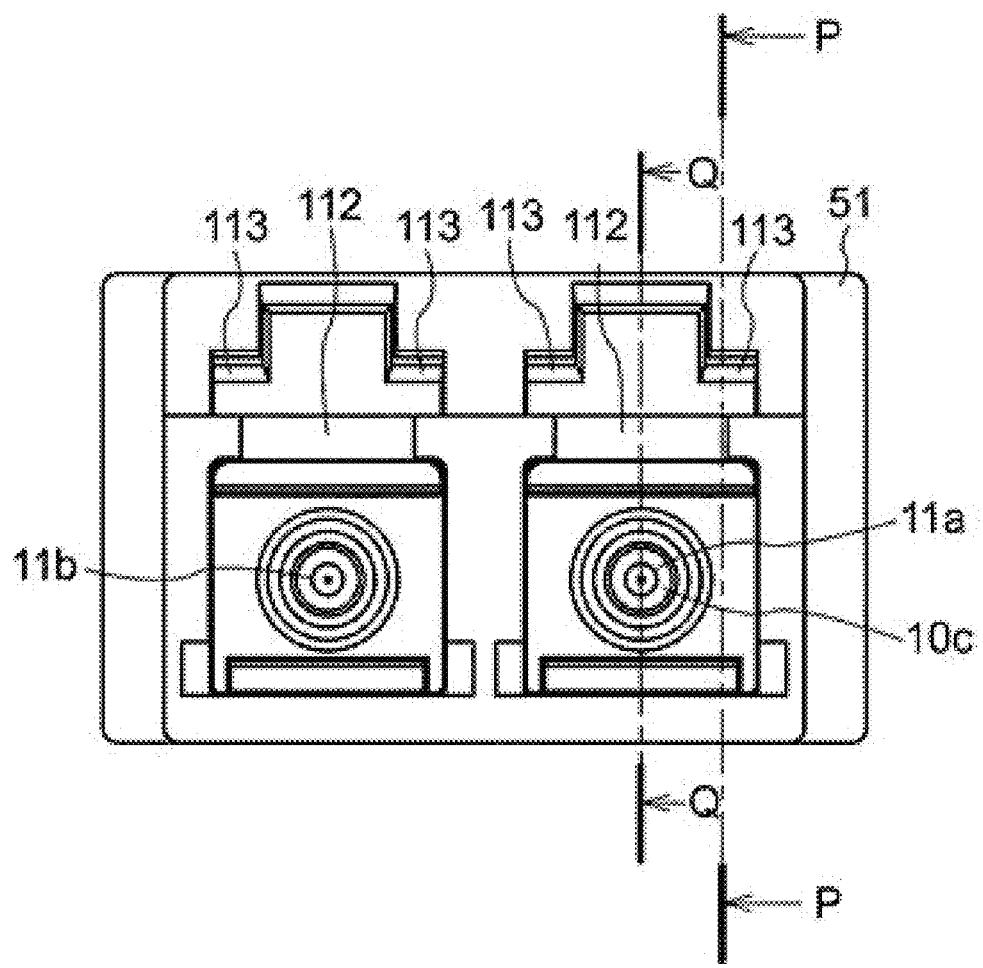
FIG. 53 is a front view of the optical connector plug in a state in which the optical connector plug is coupled to the optical connector adaptor according to at least one embodiment.
Figure 54:
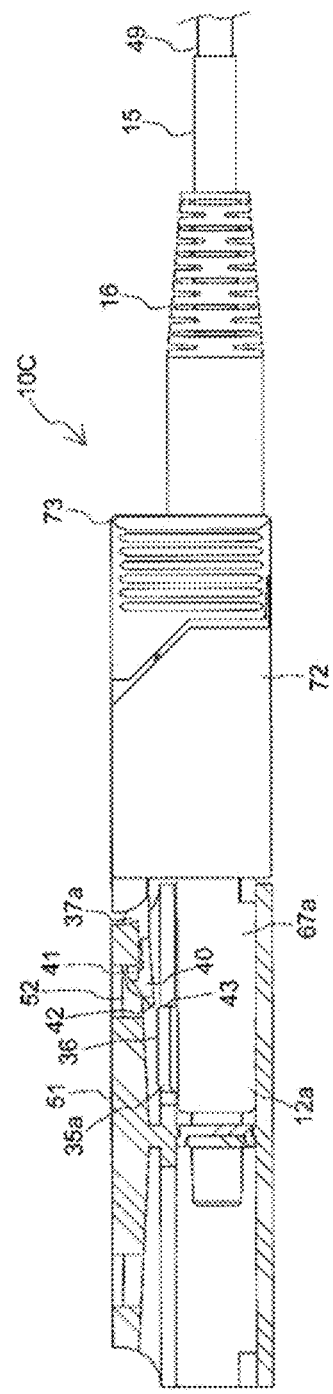
FIG. 54 is a sectional view as seen in a direction indicated by arrows of the line P-P in FIG. 53 according to at least one embodiment.
Figure 55:
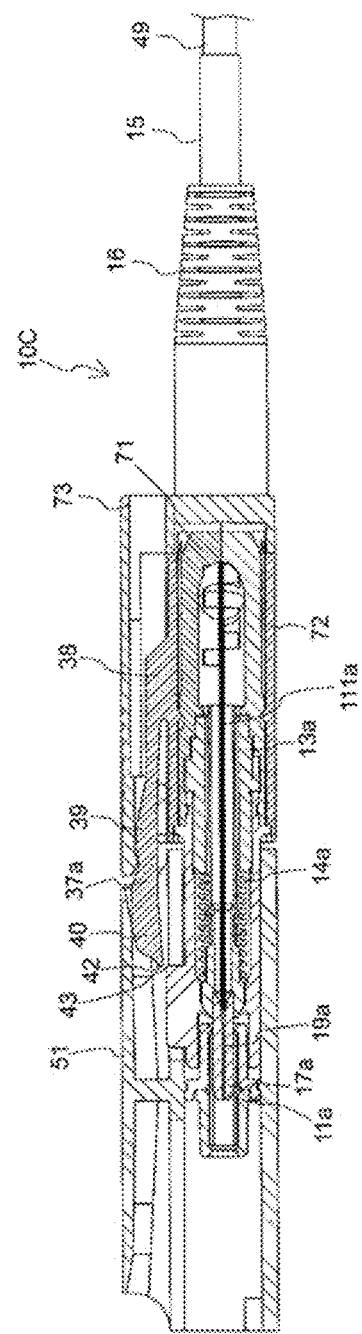
FIG. 55 is a sectional view as seen in a direction indicated by arrows of the line Q-Q in FIG. 53 according to at least one embodiment.
Figure 56:
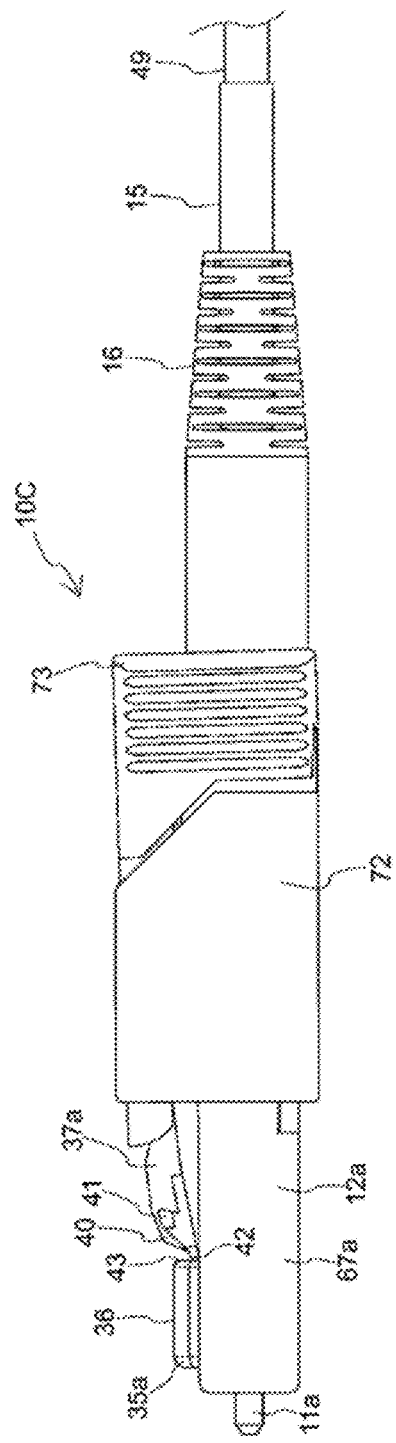
FIG. 56 is a side view of the optical connector plug in a state in which optical connector adaptor and the optical connector plug are decoupled according to at least one embodiment.
Figure 57:
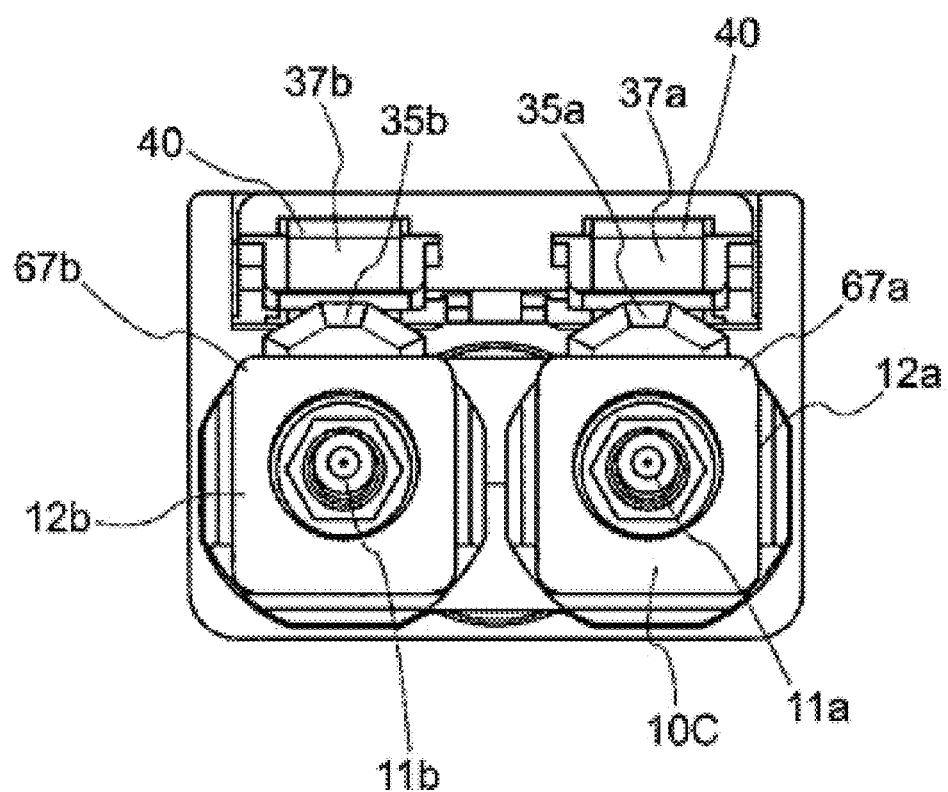
FIG. 57 is a front view of the optical connector plug in a state in which, while the optical connector adaptor and the optical connector plug are coupled, the plug frame is warped to the vertical upper side of first and second guide protrusion portions according to at least one embodiment.
Figure 58:
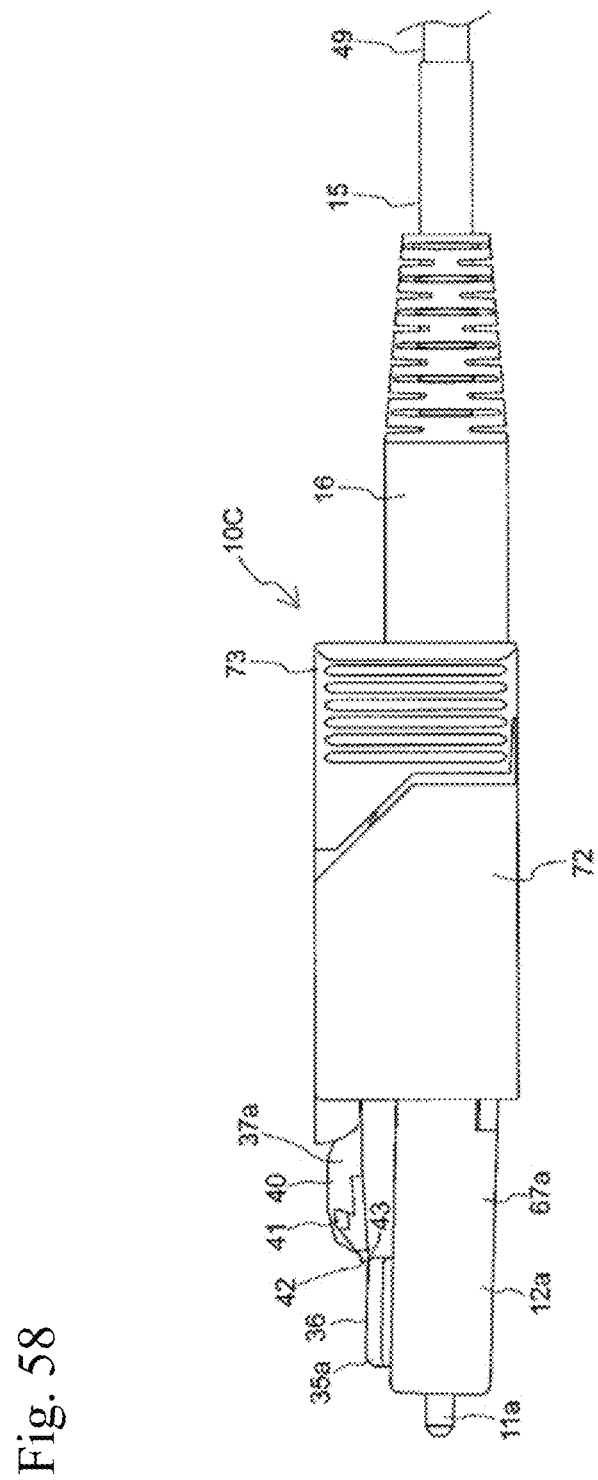
FIG. 58 is a side view of the optical connector plug in a state in which, while the optical connector adaptor and the optical connector plug are coupled, the plug frame is warped to the vertical upper side of first and second guide protrusion portions according to at least one embodiment.

FIG. 52 is a side view of the optical connector plug 10C in a state in which the optical connector plug 10C is coupled to the optical connector adaptor 51. FIG. 53 is a front view of the optical connector plug 10C in a state in which the optical connector plug 10C is coupled to the optical connector adaptor 51. FIG. 54 is a sectional view as seen in a direction indicated by arrows of the line P-P in FIG. 53. FIG. 55 is a sectional view as seen in a direction indicated by arrows of the line Q-Q in FIG. 53. FIG. 56 is a side view of the optical connector plug 10C in a case in which the optical connector adaptor 51 and the optical connector plug 10C are decoupled. FIG. 57 is a front view of the optical connector plug 10C in a state in which, while the optical connector adaptor 51 and the optical connector plug 10C are coupled, the plug frames 12a and 12b are warped to the vertical upper side of the first and second guide protrusion portions 35a and 35b. FIG. 58 is a side view of the optical connector plug 10C in a state in which, while the optical connector adaptor 51 and the optical connector plug 10C are coupled, the plug frames 12a and 12b are warped to the vertical upper side of the first and second guide protrusion portions 35a and 35b. In FIG. 56 and FIG. 58, the optical connector adaptor 51 is omitted for the sake of clarity.

The duplex optical connector plug 10C is coupled to the optical connector adaptor 51 by pinching the second casing 72 and the slider 73, making the first and second guide protrusion portions 35a and 35b of the first and second plug frames 12a and 12b face the guide rails 112 of the optical connector adaptor 51, and inserting the first and second optical connector assemblies 67a and 67b inside the optical connector adaptor 51 through the insertion opening of the optical connector adaptor 51. When the first and second optical connector assemblies 67a and 67b are moved axially forward while the first and second optical connector assemblies 67a and 67b are inserted into the optical connector adaptor 51, the arms 39 of these engagement latches 37a and 37b extending axially forward from the top wall 95 of the second casing 72 gradually enter inside the optical connector adaptor 51, the top wall 113 of the optical connector adaptor 51 presses the engagement heads 40 of these engagement latches 37a and 37b vertically downward, the arms 39 of the engagement latches 37a and 37b elastically deform vertically downward, and the engagement heads 40 are pushed down vertically downward.

When the first and second optical connector assemblies 67a and 67b are further moved axially forward and the engagement heads 40 are moved to the locking portions 52 of the optical connector adaptor 51, as in FIG. 54, the arms 39 elastically deform vertically upward, the engagement protrusion portions 41 of the engagement heads 40 engage with the locking portions 52 of the optical connector adaptor 51, and the optical connector plug 10C is coupled to the optical connector adaptor 51. When the engagement protrusion portions 41 of the engagement heads 40 engage with the locking portions 52 of the optical connector adaptor 51, an insertion state of the first and second optical connector assemblies 67a and 67b in the optical connector adaptor 51 is maintained.

In a state in which a load does not act on the optical connector plug 10C, the optical connector adaptor 51 and the optical connector plug 10C are decoupled by applying a force for pushing down the sliding plate 105 of the slider 73, and moving the slider 73 axially rearward. When the slider 73 is moved axially rearward, as in FIG. 56, the inclined surfaces 109 of the sliding plate of the slider 73 press the arms 39 of these engagement latches 37a and 37b vertically downward, the arms 39 elastically deform vertically downward, and thereby the engagement heads 40 of the engagement latches 37a and 37b move vertically downward. When the engagement heads 40 are moved vertically downward, the engagement protrusion portions 41 of the engagement heads 40 and the locking portions 52 of the optical connector adaptor 51 are disengaged, and the first and second optical connector assemblies 67a and 67b are pulled axially rearward in this state to pull out the first and second plug frames 12a and 12b from the optical connector adaptor 51.

When the optical fiber cord 49 extending axially rearward from the boot 16 is strongly pulled axially rearward under a state in which the optical connector plug 10C is coupled to the optical connector adaptor 51, and the optical fiber cord 49 is pulled vertically upward and a predetermined load acts on the first and second optical connector assemblies 67a and 67b, as in FIG. 57 and FIG. 58, the first and second plug frames 12a and 12b are warped to the vertical upper side of the first and second guide protrusion portions 35a and 35b in some cases. Furthermore, when the optical fiber cord 49 is strongly pulled axially rearward under a state in which the optical connector plug 10C is coupled to the optical connector adaptor 51, and the optical fiber cord 49 is rotated drawing an arc and a predetermined load acts on the first and second optical connector assemblies 67a and 67b, the first and second plug frames 12a and 12b are warped to the vertical upper side of the first and second guide protrusion portions 35a and 35b.

According to at least one embodiment the optical connector plug 10C, when a predetermined load is applied to the first and second optical connector assemblies 67a and 67b, and the first and second plug frames 12a and 12b are warped to the vertical upper side of the first and second guide protrusion portions 35a and 35b, the arms 39 of these engagement latches 37a and 37b are not warped and distances (separation dimensions) between the engagement heads 40 of the engagement latches 37a and 37b and the first and second guide protrusion portions 35a and 35b shorten, as in FIG. 58, the axial front ends 42 of these engagement heads 40 contact (come into contact with) the axial rear ends 43 of the top surfaces 36 of the first and second guide protrusion portions 35a and 35b, and the axial front ends 42 of the engagement heads 40 are supported by the axial rear ends 43 of the top surfaces 36 of the guide protrusion portions 35a and 35b. According to at least one embodiment the optical connector plug 10C, when these plug frames 12a and 12b are warped to the vertical upper side of the first and second guide protrusion portions 35a and 35b, the axial front ends 42 of the engagement heads 40 of the engagement latches 37a and 37b are supported by the axial rear ends 43 of the guide protrusion portions 35a and 35b. Consequently, the engagement heads 40 are prevented from moving to the vertical lower side of the guide protrusion portions 35a and 35b.

When the first and second plug frames 12a and 12b are warped to the vertical upper side of the guide protrusion portions 35a and 35b, the axial front ends 42 of the engagement heads 40 of these engagement latches 37a and 37b are not supported by the axial rear ends 43 of the first and second guide protrusion portions 35a and 35b, and the engagement heads 40 move (bow) to the vertical lower side of the guide protrusion portions 35a and 35b, the engagement protrusion portions 41 of the engagement heads 40 are removed from the locking portions 52 of the optical connector adaptor 51, and the optical connector plug 10C and the optical connector adaptor 51 are decoupled in some cases. However, according to at least one embodiment the optical connector plug 10C, the axial front ends 42 of the engagement heads 40 of the engagement latches 37a and 37b are separated axially rearward from the axial rear ends 43 of the first and second guide protrusion portions 35a and 35b and are close to the axial rear ends 43 of the guide protrusion portions 35a and 35b, and the axial front ends 42 of the engagement heads 40 of the engagement latches 37a and 37b are separated to the vertical upper side of the axial rear ends 43 of the first and second guide protrusion portions 35a and 35b and are close to the axial rear ends 43 of the guide protrusion portions 35a and 35b. Therefore, when the first and second plug frames 12a and 12b are warped to the vertical upper side of the first and second guide protrusion portions 35a and 35b, the distances between the axial front ends 42 of these engagement heads 40 and the axial rear ends 43 of the guide protrusion portions 35a and 35b shorten, the axial front ends 42 of the engagement heads 40 contact (come into contact with) the axial rear ends 43 of the top surfaces 36 of the guide protrusion portions 35a and 35b, and the axial front ends 42 of the engagement heads 40 are supported by the axial rear ends 43 of the top surfaces 36 of the guide protrusion portions 35a and 35b. Consequently, the engagement heads 40 is prevented from moving (bowing) vertically downward from the first and second guide protrusion portions 35a and 35b, the engagement protrusion portions 41 of the engagement heads 40 and the locking portions 52 of the optical connector adaptor 51 are prevented from being unintentionally disengaged, and maintain the optical connection state of the optical connector plug 10C and the optical connector adaptor 51.

Even when a predetermined load is applied to these plug frames 12a and 12b during use of the optical connector plug 10C, the optical connector plug 10C can help to prevent an accident that the engagement protrusion portions 41 of the engagement heads 40 of these engagement latches 37a and 37b and the locking portions 52 of the optical connector adaptor 51 are unintentionally disengaged, and save an effort of coupling the optical connector plug 10C and the optical connector adaptor 51 again when the optical connector plug 10C and the optical connector adaptor 51 are unintentionally decoupled.

In at least one embodiment in which the axially rearward separation dimension of the axial front ends 42 of the engagement heads 40 from the axial rear ends 43 of the first and second guide protrusion portions 35a and 35b is less than 0.01 mm, the vertically upward separation dimension of the axial front ends 42 of these engagement heads 40 from the axial rear ends 43 of the guide protrusion portions 35a and 35b is less than 0.01 mm, and, in the normal state in which the load does not act on the optical connector plug 10C (the normal state in which the plug frames 12a and 12b are nor warped), the first and second optical connector assemblies 67a and 67b (plug frames 12a and 12b) are pulled out from the optical connector adaptor 51. In at least one embodiment, when the arms 39 of these engagement latches 37a and 37b are swung vertically downward, the axial front ends 42 of the engagement heads 40 of the engagement latches 37a and 37b contact (come into contact with) the axial rear ends 43 of the top surfaces 36 of the guide protrusion portions 35a and 35b, the engagement protrusion portions 41 of the engagement heads 40 cannot be moved to the lower side of the locking portions 52 of the optical connector adaptor 51 in some cases, and the engagement protrusion portions 41 of the engagement heads 40 and the locking portions 52 of the optical connector adaptor 51 cannot be disengaged in some cases.

In at least one embodiment in which the axially rearward separation dimension of the axial front ends 42 of these engagement heads 40 from the axial rear ends 43 of the first and second guide protrusion portions 35a and 35b exceeds 0.2 mm, and the vertically upward separation dimension of the axial front ends 42 of these engagement heads 40 from the axial rear ends 43 of the guide protrusion portions 35a and 35b exceeds 0.4 mm. In at least one embodiment, when the plug frames 12a and 12b are warped to the vertical upper side of the first and second guide protrusion portions 35a and 35b, the axial front ends 42 of the engagement heads 40 of the engagement latches 37a and 37b do not contact (come into contact with) the axial rear ends 43 of the top surfaces 36 of the guide protrusion portions 35a and 35b, and therefore the axial rear ends 43 of the top surfaces 36 of the guide protrusion portions 35a and 35b cannot support the axial front ends 42 of the engagement heads 40 in some cases. The engagement heads 40 is not prevented from moving vertically downward from the first and second guide protrusion portions 35a and 35b, and therefore the engagement protrusion portions 41 of the engagement heads 40 and the locking portions 52 of the optical connector adaptor 51 are disengaged.

According to at least one embodiment the optical connector plug 10C, the axially rearward separation dimension of the axial front ends 42 of the engagement heads 40 of the engagement latches 37a and 37b from the axial rear ends 43 of the first and second guide protrusion portions 35a and 35b is in the range of from 0.01 mm to 0.2 mm, and the vertically upward separation dimension of the axial front ends 42 of the engagement heads 40 of the engagement latches 37a and 37b from the axial rear ends 43 of the first and second guide protrusion portions 35a and 35b is in the range of from 0.01 mm to 0.4 mm. Therefore, in the state in which the load does not act on the optical connector plug 10C (the normal state in which the plug frames 12a and 12b are not warped), the engagement protrusion portions 41 of the engagement heads 40 is movable to the lower side of the locking portions 52 of the optical connector adaptor 51, the engagement protrusion portions 41 of the engagement heads 40 and the locking portions 52 of the optical connector adaptor 51 are reliably disengageable. Further, when the plug frames 12a and 12b are warped to the vertical upper side of the first and second guide protrusion portions 35a and 35b, the axial front ends 42 of the engagement heads 40 of the engagement latches 37a and 37b are reliably supported by the axial rear ends 43 of the top surfaces 36 of the guide protrusion portions 35a and 35b, so the engagement heads 40 is prevented from moving vertically downward from the guide protrusion portions 35a and 35b, the engagement protrusion portions 41 of the engagement heads 40 and the locking portions 52 of the optical connector adaptor 51 are prevented from being unintentionally disengaged, and the optical connection state of the optical connector plug 10C and the optical connector adaptor 51 is reliably maintained.

According to at least one embodiment the duplex optical connector plug 10C, when one optical connector assembly 67a or 67b among the first and second optical connector assemblies 67a and 67b rotates about the one optical connector assembly 67a or 67b in the clockwise direction or the counterclockwise direction, another optical connector assembly 67a or 67b simultaneously rotates about the axis of another optical connector assembly 67a or 67b in the same clockwise direction or counterclockwise direction at the same rotation angle as those of the one optical connector assembly 67a or 67b in conjunction with the rotation. Only by rotating the one optical connector assembly 67a or 67b among the first and second optical connector assemblies 67a and 67b, simultaneously rotating another connector assembly 67a or 67b in the same direction at the same rotation angle as those of the one optical connector assembly 67a or 67b is possible.

According to at least one embodiment the duplex optical connector plug 10C, the first and second optical connector assemblies 67a and 67b simultaneously rotate in the same direction at the same rotation angle. Consequently, simultaneously rotating the first and second optical connector assemblies 67a and 67b by one rotating operation (one action) is possible, and effort and a time compared to a case in which these optical connector assemblies 67a and 67b are separately rotated is saved.

According to at least one embodiment of the duplex optical connector plug 10C, when the rotation angle regulation means (the contact protrusion portions 80 and the rotation regulation protrusion portions 92) regulate the rotation angles from the rotation start points to the rotation end points of the first and second optical connector assemblies 67a and 67b to half rotation (180 degrees), and invert the polarity of these optical connector assemblies 67a and 67b, for example, the polarity of the optical connector plug 10C is inverted reliably and accurately by stopping the rotation at a position to which the first and second optical connector assemblies 67a and 67b are rotated half (180 degrees) in the clockwise direction. Meanwhile, the polarity of the optical connector plug 10C is reliably and accurately reversed by rotating in the counterclockwise direction the first and second optical connector assemblies 67a and 67b half (180 degrees) that have been rotated half (180 degrees) in the clockwise direction.

According to the duplex optical connector plug 10C, when, for example, the polarity of the first and second optical connector assemblies 67a and 67b is inverted, the polarity of these optical connector assemblies 67a and 67b is inverted by rotating any one of the first and second optical connector assemblies 67a and 67b, and the polarity of these optical connector assemblies 67a and 67b is inverted by accommodating the first casing 71 in the second casing in the state in which the first casing 71 is turned upside down.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:
1. An optical connector plug, comprising:
   a ferrule extending in an axial direction, wherein the ferrule is configured to hold an optical fiber;
   a plug frame extending in the axial direction, wherein the plug frame is configured to accommodate the ferrule, and the plug frame includes a protrusion portion on an axial front side of the plug frame; and
   an engagement latch configured to couple the plug frame to an optical connector adaptor, wherein the engagement latch includes:
      an arm extending in the axial direction from an axial rear side of the plug frame to the protrusion portion, wherein the arm is elastically deformable in a vertical direction perpendicular to the axial direction; and
      an engagement head on an axial front side of the arm, wherein the engagement head is configured to disengageably engage with the optical connector adaptor,
   wherein an axial front end of the engagement head is separated axially rearward from an axial rear end of the protrusion portion, and
   wherein, in response to a predetermined load applied to the plug frame in the optical connector plug, the plug frame is warped to a vertical upper side of the protrusion portion, the axial front end of the engagement head is supported by the protrusion portion, and the engagement head is prevented from moving vertically downward from the protrusion portion.

2. The optical connector plug according to claim 1, wherein the axial front end of the engagement head is separated from the axial rear end of the protrusion portion by a distance ranging from 0.01 millimeters (mm) to 0.2 mm.

3. The optical connector plug according to claim 1, wherein the axial front end of the engagement head is separated to the vertical upper side of the axial rear end of the protrusion portion.

4. The optical connector plug according to claim 3, wherein the axial front end of the engagement head is vertically separated from the axial rear end of the protrusion portion by a distance ranging from 0.01 mm to 0.4 mm.

5. The optical connector plug according to claim 1,
   wherein the protrusion portion includes a flat top surface, and
   wherein, in response to the predetermined load applied to the plug frame in the optical connector plug the axial front end of the engagement head is supported by the protrusion portion.

6. The optical connector plug according to claim 1, wherein the arm of the engagement latch is axially rearward of the plug frame, and extends from the axial rear side of the plug frame to the protrusion portion in the axial direction.

7. The optical connector plug according to claim 1, further comprising a casing, wherein the arm of the engagement latch is on a top wall of the casing, the arm extends axially forward from the top wall of the casing, and the arm is exposed axially forward from a front end opening of the casing.

8. The optical connector plug according to claim 1, wherein the protrusion portion is a guide protrusion portion, the protrusion portion is on the axial front side of the plug frame and the protrusion portion is configured to position the plug frame for insertion into the optical connector plug.

9. A duplex optical connector plug, comprising:
a first ferrule extending in an axial direction, wherein the first ferrule is configured to hold a first optical fiber;
a first plug frame extending in the axial direction, wherein the first plug frame is configured to accommodate the first ferrule;
a first engagement latch configured to couple the first plug frame to an optical connector adaptor;
a first optical connector assembly including a first protrusion portion, wherein the first protrusion portion is adjacent an axial front side of the first plug frame;
a second ferrule extending in the axial direction, wherein the second ferrule is configured to hold a second optical fiber;
a second plug frame extending in the axial direction, wherein the second plug frame is configured to accommodate the second ferrule;
a second engagement latch configured to couple the second plug frame to the optical connector adaptor; and
a second optical connector assembly including a second protrusion portion on an axial front side of the second plug frame, wherein the second optical connector assembly extends parallel to the first connector assembly,
the first engagement latch comprising:
a first arm extending in the axial direction from an axial rear side of the first plug frame to the first protrusion portion, wherein the first arm is elastically deformable in a vertical direction perpendicular to the axial direction; and
a first engagement head on an axial front side of the first arm, wherein the first engagement head is configured to disengageably engage with the optical connector adaptor,
the second engagement latch including:
a second arm extending in the axial direction from an axial rear side of the second plug frame to the second protrusion portion, wherein the second arm is elastically deformable in the vertical direction; and
a second engagement head on an axial front side of the second arm, wherein the second engagement head is configured to disengageably engage with the optical connector adaptor,
wherein an axial front end of the first engagement head is separated axially rearward from an axial rear end of the first protrusion portion,
wherein an axial front end of the second engagement head is separated axially rearward from an axial rear end of the second protrusion portion,
wherein, in response to a predetermined load applied to the first plug frame in the optical connector plug, the first plug frame is warped to a vertical upper side of the first protrusion portion, the axial front end of the first engagement head is supported by the first protrusion portion, and the first engagement head is prevented from moving vertically downward from the first protrusion portion, and
wherein, in response to the predetermined load applied to the second plug frame, the second plug frame is warped to a vertical upper side of the second protrusion portion, the axial front end of the second engagement head is supported by the second protrusion portion, and the second engagement head is prevented from moving vertically downward from the second protrusion portion.

10. The duplex optical connector plug according to claim 9, wherein the axial front end of the first engagement head is separated from the axial rear end of the first protrusion portion by a distance ranging from 0.01 millimeters (mm) to 0.2 mm.

11. The duplex optical connector plug according to claim 9, wherein the axial front end of the second engagement head is separated from the axial rear end of the second protrusion portion by a distance ranging from 0.01 mm to 0.2 mm.

12. The duplex optical connector plug according to claim 9, wherein the axial front end of the first engagement head is vertically above of the axial rear end of the first protrusion portion.

13. The duplex optical connector plug according to claim 12, wherein the axial front end of the first engagement head is vertically separated from the axial rear end of the first protrusion portion by a distance ranging from 0.01 mm to 0.4 mm.

14. The duplex optical connector plug according to claim 9, wherein the axial front end of the second engagement head is vertically above the second protrusion portion.

15. The duplex optical connector plug according to claim 14, wherein the axial front end of the second engagement head is vertically separated from the axial rear end of the second protrusion portion by a distance ranging from 0.01 mm to 0.4 mm.

16. The duplex optical connector plug according to claim 9, wherein the first protrusion portion is a first guide protrusion portion, the first protrusion portion is on the axial front side of the first plug frame, and the first protrusion portion is configured to position the first plug frame for insertion into the optical connector plug.

17. The duplex optical connector plug according to claim 9, wherein the second protrusion portion is a second guide protrusion portion, the second protrusion portion is on the axial front side of the second plug frame, and the second protrusion portion is configured to position the second plug frame for insertion into the optical connector plug.

18. A duplex optical connector plug, comprising:
a first ferrule extending in an axial direction, wherein the first ferrule is configured to hold a first optical fiber;
a first plug frame extending in the axial direction, wherein the first plug frame is configured to accommodate the first ferrule;
a first gear axially rearward of the first ferrule, wherein the first gear is configured to rotate the first ferrule;
a first engagement latch configured to couple the first plug frame to the optical connector adaptor;
a first optical connector assembly including a first protrusion portion, wherein the first protrusion portion is on an axial front side of the first plug frame;
a second ferrule extending in the axial direction, wherein the second ferrule is configured to hold a second optical fiber;
a second plug frame extending in the axial direction, wherein the second plug frame is configured to accommodate the second ferrule;
a second gear axially rearward of the second ferrule, wherein the second gear is configured to rotate the second ferrule;

a second engagement latch configured to couple the second plug frame to the optical connector adaptor;

a second optical connector assembly including a second protrusion portion on an axial front side of the second plug frame, wherein the second optical connector assembly extends parallel to the first connector assembly; and an intermediate gear configured to transfer rotation of the first gear to the second gear, the first engagement latch comprising:

a first arm extending in the axial direction from an axial rear side of the first plug frame to the first protrusion portion, wherein the first arm is elastically deformable in a vertical direction perpendicular to the axial direction; and a first engagement head on an axial front side of the first arm, wherein the first engagement head is configured to disengageably engage with the optical connector adaptor, the second engagement latch including:

a second arm extending in the axial direction from an axial rear side of the second plug frame to the second protrusion portion, wherein the second arm is elastically deformable in the vertical direction; and a second engagement head on an axial front side of the second arm, wherein the second engagement head is configured to disengageably engage with the optical connector adaptor, wherein the axial front end of the first engagement head is separated axially rearward from an axial rear end of the first protrusion portion, wherein an axial front end of the second engagement head is separated axially rearward from an axial rear end of the second protrusion portion, wherein, in response to a predetermined load applied to the first plug frame in the optical connector plug, the first plug frame is warped to a vertical upper side of the first protrusion portion, the axial front end of the first engagement head is supported by the first protrusion portion, and the first engagement head is prevented from moving vertically downward from the first protrusion portion, and wherein, in response to the predetermined load applied to the second plug frame, the second plug frame is warped to a vertical upper side of the second protrusion portion, the axial front end of the second engagement head is supported by the second protrusion portion, and the second engagement head is prevented from moving vertically downward from the second protrusion portion.

* * * * *